June 22, 1965 M. E. KROM 3,190,968

UNIVERSAL REMOTE TELEPHONE LINE CONCENTRATOR

Filed Oct. 31, 1960 29 Sheets-Sheet 1

INVENTOR
M. E. KROM
BY
S E Hollander
ATTORNEY

UNIVERSAL REMOTE TELEPHONE LINE CONCENTRATOR

Filed Oct. 31, 1960 29 Sheets-Sheet 2

INVENTOR
M. E. KROM
BY
S E Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 3

INVENTOR
M. E. KROM
BY SE Hollander
ATTORNEY

INVENTOR
M. E. KROM
BY S E Hollander
ATTORNEY

UNIVERSAL REMOTE TELEPHONE LINE CONCENTRATOR

Filed Oct. 31, 1960 29 Sheets-Sheet 5

INVENTOR
M. E. KROM
BY
S E Hollander
ATTORNEY

UNIVERSAL REMOTE TELEPHONE LINE CONCENTRATOR

Filed Oct. 31, 1960 29 Sheets-Sheet 6

INVENTOR
M. E. KROM
BY S F Hollander
ATTORNEY

UNIVERSAL REMOTE TELEPHONE LINE CONCENTRATOR

INVENTOR
M. E. KROM
BY S E Hollander
ATTORNEY

UNIVERSAL REMOTE TELEPHONE LINE CONCENTRATOR

Filed Oct. 31, 1960 29 Sheets-Sheet 8

INVENTOR
M. E. KROM
BY
S E Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 9

INVENTOR
M. E. KROM
BY
S E Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 10

INVENTOR
M. E. KROM
BY S E Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 11

INVENTOR
M. E. KROM
BY S E Hollander
ATTORNEY

INVENTOR
M. E. KROM
BY
S E Hollander
ATTORNEY

INVENTOR
M. E. KROM
BY
S E Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 14

INVENTOR
M. E. KROM
BY S. E. Hollander
ATTORNEY

INVENTOR
M. E. KROM
BY S E Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 16

INVENTOR
M. E. KROM
BY
S E Hollander
ATTORNEY

UNIVERSAL REMOTE TELEPHONE LINE CONCENTRATOR

Filed Oct. 31, 1960 29 Sheets-Sheet 17

INVENTOR
M. E. KROM
BY S. E. Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 18

INVENTOR
M. E. KROM
BY
S F Hollander
ATTORNEY

UNIVERSAL REMOTE TELEPHONE LINE CONCENTRATOR

INVENTOR
M. E. KROM
BY S E Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 20

INVENTOR
M. E. KROM
BY S E Wolfarder
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 21

INVENTOR
M. E. KROM
BY
S E Hollander
ATTORNEY

UNIVERSAL REMOTE TELEPHONE LINE CONCENTRATOR

Filed Oct. 31, 1960 29 Sheets-Sheet 22

INVENTOR
M. E. KROM
BY S E Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 23

INVENTOR
M. E. KROM
BY
S E Hollander
ATTORNEY

INVENTOR
M. E. KROM
BY S E Hollander
ATTORNEY

UNIVERSAL REMOTE TELEPHONE LINE CONCENTRATOR

INVENTOR
M. E. KROM
BY
S E Hollander
ATTORNEY

June 22, 1965 M. E. KROM 3,190,968

UNIVERSAL REMOTE TELEPHONE LINE CONCENTRATOR

Filed Oct. 31, 1960 29 Sheets-Sheet 26

INVENTOR
M. E. KROM
BY S F Hollander
ATTORNEY

INVENTOR
M. E. KROM
BY S E Hollander
ATTORNEY

INVENTOR
M. E. KROM
BY S E Hollander
ATTORNEY

FIG. 31

TABLE I

ASSOCIATION OF LINE NO WITH LA AND LB RELAYS (REMOTE UNIT)

| | GO | | | | | | G1 | | | | | |
|---|---|---|---|---|---|---|---|---|---|---|---|---|
| | 3LA00 | 01 | 02 | 03 | 04 | 05 | 06 | 07 | 08 | 09 | 10 | 3LA11 |
| 3LB08 | 08 | 17 | 26 | 35 | 44 | | 58 | 67 | 76 | 85 | 94 | |
| 07 | 07 | 16 | 25 | 34 | 43 | | 57 | 66 | 75 | 84 | 93 | |
| 06 | 06 | 15 | 24 | 33 | 42 | | 56 | 65 | 74 | 83 | 92 | |
| 05 | 05 | 14 | 23 | 32 | 41 | | 55 | 64 | 73 | 82 | 91 | |
| 04 | 04 | 13 | 22 | 31 | 40 | 49 | 54 | 63 | 72 | 81 | 90 | 99 |
| 03 | 03 | 12 | 21 | 30 | 39 | 48 | 53 | 62 | 71 | 80 | 89 | 98 |
| 02 | 02 | 11 | 20 | 29 | 38 | 47 | 52 | 61 | 70 | 79 | 88 | 97 |
| 01 | 01 | 10 | 19 | 28 | 37 | 46 | 51 | 60 | 69 | 78 | 87 | 96 |
| 3LB00 | 00 | 09 | 18 | 27 | 36 | 45 | 50 | 59 | 68 | 77 | 86 | 95 |
| | LINE NUMBER | | | | | | | | | | | |

FIG. 32

TABLE 2

ASSOCIATION OF LINE NO. WITH LA AND LB RELAYS (CONTROL UNIT)

| | GO | | | | | | G1 | | | | | | |
|---|---|---|---|---|---|---|---|---|---|---|---|---|---|
| | 9LA00 | 01 | 02 | 03 | 04 | 05 | 06 | 07 | 08 | 09 | 10 | 9LA11 | |
| 9LB08 | 08 | 17 | 26 | 35 | 44 | | 58 | 67 | 76 | 85 | 94 | | 9LB17 |
| 07 | 07 | 16 | 25 | 34 | 43 | | 57 | 66 | 75 | 84 | 93 | | 16 |
| 06 | 06 | 15 | 24 | 33 | 42 | | 56 | 65 | 74 | 83 | 92 | | 15 |
| 05 | 05 | 14 | 23 | 32 | 41 | | 55 | 64 | 73 | 82 | 91 | | 14 |
| 04 | 04 | 13 | 22 | 31 | 40 | 49 | 54 | 63 | 72 | 81 | 90 | 99 | 13 |
| 03 | 03 | 12 | 21 | 30 | 39 | 48 | 53 | 62 | 71 | 80 | 89 | 98 | 12 |
| 02 | 02 | 11 | 20 | 29 | 38 | 47 | 52 | 61 | 70 | 79 | 88 | 97 | 11 |
| 01 | 01 | 10 | 19 | 28 | 37 | 46 | 51 | 60 | 69 | 78 | 87 | 96 | 10 |
| 9LB00 | 00 | 09 | 18 | 27 | 36 | 45 | 50 | 59 | 68 | 77 | 86 | 95 | 9LB09 |
| | LINE NUMBER | | | | | | | | | | | | |

FIG. 33

TABLE 3

| SIGNAL RELAYS OPERATED | SEQUENCE CONTROL RELAYS OPERATED | | | | | | | |
|---|---|---|---|---|---|---|---|---|
| | | -W1 | -Z1 | -W2 | -Z2 | -W3 | -Z3 | -W4 |
| | CLASS OF CALL AND GROUP REG. | | B INFORMATION REGISTRATION | | A INFORMATION REGISTRATION | | TRUNK REGISTRATION | |
| | | | -LB | -B | -LA | -A | 16HS | 6TK |
| NONE | | | 00,09 | 0 | | | 00,10 | 0 |
| -S4 | 16D1S14 | 6DG1 | 01,10 | 1 | 00,06 | 0 | 01,11 | 1 |
| -S3,S4 | | | 02,11 | 2 | 01,07 | 1 | 02,12 | 2 |
| -S2 | 16D1S04 | 6DG0 | 03,12 | 3 | 02,08 | 2 | 03,13 | 3 |
| -S2,S4 | KEY 10T1 | -T1 | 04,13 | 4 | 03,09 | 3 | 04,14 | 4 |
| -S2,S3,S4 | -LA 06,16 | -CG1 | 05,14 | 5 | 04,10 | 4 | 05,15 | 5 |
| -S1,S2 | | | 06,15 | 6 | 05,11 | 5 | 06,16 | 6 |
| -S1,S2,S4 | -LA 00,05 | -CG0 | 07,16 | 7 | | | 07,17 | 7 |
| -S1,S2,S3,S4 | KEY 10T0 | -T0 | 08,17 | 8 | | | 08 18 | 8 |
| NONE & 7TR | | | | | | | 09,19 | 9 |

INVENTOR
M. E. KROM
BY S E Hollander
ATTORNEY

United States Patent Office 3,190,968
Patented June 22, 1965

3,190,968
UNIVERSAL REMOTE TELEPHONE LINE CONCENTRATOR

Myron E. Krom, Columbus, Ohio, assignor to Bell Telephone Laboratories, Incorporated, New York, N.Y., a corporation of New York Filed Oct. 31, 1960, Ser. No. 65,975
9 Claims. (Cl. 179—27)

This invention relates to line concentrators and more particularly to remote telephone line concentrators of the universal type.

Recent telephone switching developments have reflected a marked resurgence in the exploitation of remote telephone line "concentrators." Essentially, a "concentrator" of telephone lines is a facility for grouping a relatively larger number of lines at a remote location and providing coupling facilities for these lines to a relatively smaller number of trunks to the central office. The lines have access to the trunks on a shared basis and the ratio of lines to trunks is determined by traffic and other statistical data. However, the key attribute of line concentration is the fact that the individual lines are not directly connected to the central office but in lieu thereof are connected merely through a lesser number of concentrator trunks. The most immediate benefit thereof is obvious—a reduction in the cabling requirements required to couple a fixed number of subscribers to the central office. In applications of this nature a ratio of one trunk for five lines is not unusual. In view of the immense capital outlay for "outside plant" equipment and in further view of the relatively sizable percentage of the total telephone plant investment represented by outside plant expenditures, a savings in the latter is of vital economic and technological significance in telephone communications.

In the past, certain concentrators which has been proposed, although operative and satisfactory, have been lacking in a number of significant aspects. Thus certain of these concentrators were of the "special purpose" type imlying that they were designed specifically for use with particular telephone switching systems and the intimacy of the design relationship was such that the concentrator was rendered incompatible with any other telephone switching system—an obvious limitation on the flexibility of utilization.

An ideal telephone concentrator system in this regard is one which may be connected at the central office to substantially any conventional telephone system without the necessity of invading or substantially modifying the existing telephone office switching system. In view of the heavy financial outlay involved in telephone central office equipment, modifications thereto in a substantial degree could prove prohibitive. Instead, the incroachment on the internal central office equipment in an ideal telephone concentrator should be restricted to an absolute minimum. In fact, carried to its optimum realization of non-intervention in existing central office equipment, connection of the line concentrator to the central office should be such that the central office equipment is wholly unaware of the existence of the concentrator and that the line is not itself extended to the central office termination. Under these conditions the central office will attempt to service calls at the respective central office line termination as though the concentrator were not interposed between the central office and the line. This represents the height of "universality" of telephone line concentration since the office equipment need not have any special structural relation to the concentrator equipment.

It is therefore an object of this invention to provide for concentrator equipment having universality of application with regard to existing conventional telephone switching systems.

A further object of this invention is to provide for line concentration at a remote locale without substantial modification of existing telephone central office equipment.

Still another object of this invention is to provide line concentrator facilities for coupling substation lines to a central office in which the central office equipment need not be aware of the fact of concentration and instead may continue to operate in completely conventional fashion.

Perhaps one of the most striking departures inherent in telephone line concentration is the divorcement of the substation line from its traditional bond or physical connection to the central office. Instead, a new device—the concentrator—is interposed between the two ends, i.e., the remote end or substation end of the circuit and the central office end of the circuit, in a manner which ordinarily precludes the central office from electrically observing the signal condition of the line, i.e., line off-hook—service request, line on-hook—disconnect, dialing, etc.

The impact of this type of operation in which the line has been completely severed from the central office has fostered the emergence of an entire peripheral technology related to the delivery of information from the substation line to the central office reflecting the condition of the line. This latter development has been necessary to literally bridge the gap created by the interposition of the line concentrators between the line and its historical connection to the central office. Although completely operative, these scanning and signaling arrangments have in certain instances developed into remarkably complex and sophisticated devices with a proportionately costly financial outlay. Often these devices were predicated on hypercritical time division relationships between "scanners" at the remote location and counters at the control unit. Indeed, in view of the criticality of the time relationship, a still further technology which in turn is subsidiary to the peripheral technology has been necessary to insure synchronization between the central office and remote units. Since the complexity of the latter equipment itself renders it vulnerable to malfunction, a cycle has been begun in which the equipment and checking facilities are necessarily increasingly complex.

The disadvantages inherent in this type of an arrangement are manifest even omitting the vast signaling burden imposed on the limited transmission facilities between the concentrator and the central office for carrying the complex data generated at both locations. It will suffice to point out in this regard that the addition of a large number of channels specifically reserved for signaling purposes is utterly defeative of the very purpose of line concentration which is to reduce the number of channels between the substations and the central office. It will be remembered that in the direct line situation, i.e., a direct connection between each subscriber line and the central office, no signaling channels were required.

It is therefore an object of this invention to obviate the necessity for time multiplexed scanning and counting signals and transmission thereof over the concentrator trunks.

Still another object of this invention is to preclude the necessity for continuous signal transmission between the remote location and the control unit which was predicated on continuous scanning of the subscriber lines.

Still another object of this invention is to provide a signaling system which utilizes a minimum of channels between the remote unit and the central office.

A further object of this invention is to provide a signaling system characterized by its simplicity, economy and freedom from maintenance conditions.

Heretofore in certain signaling systems the type of signaling transmission was such, e.g., alternating-current signals, etc. that interference on conventional speech paths was frequently encountered. Thus the signaling which took place in control conductors could interefere with a conversation then extant in a connection through a concentrator speech trunk which had previously been established.

Under these circumstances it was sometimes necessary to dispose the control or signaling paths in a physical environment which was divorced from electrically, or otherwise separated from, the speech communication paths. The expense of such a procedure is manifest.

It is therefore an object of this invention to provide a signaling system which does not cause interference in adjacent speech paths when transmitted over signal conductors.

Still another object of this invention is to provide an all direct-current signal system which is rapid, efficient and economical.

In the case of telephone line concentrators a particularly urgent problem exists with regard to the treatment of what has been traditionally referred to as "permanent" line conditions. These result from malfunction of the line circuit as a result of low insulation resistance, short circuits between the line conductors, or between the line conductors and ground, and the ubiquitous line off-hook condition.

A permanent line condition is a serious situation in an automatic telephone switching system since to the central office it simulates a service request condition, i.e., the loop is apparently closed. In consequence, the central office equipment acting as though a service request had been legitimately initiated seeks to effect a connection to the subscriber's line. Since the service request is a spurious one, no further information regarding the called line and no dialing will take place. Instead the common equipment at certain prior art central offices will remain seized and both unable to complete the call and unable to detach itself and serve other equipment.

In the case of a line which is connected to concentrator facilities and then to the subscriber's office, a permanent line condition is an even more aggravated situation than in the case of a direct line. When a direct line exhibits a permanent condition it may affect common equipment at the central office but when a concentrated line exhibits a permanent condition, seizure of a communication trunk by the faulted line presents a graver threat since the trunks are shared by other lines which are immediately precluded access to the trunk seized by the faulted line.

Another factor which results in a permanent condition on a concentrated line posing a greater service disruption than that of a direct line is the fact that ultimately a maintenance man in the central office may isolate the faulted line at its termination in the central office and thereby prevent its illegitimate seizure of the common control equipment. This is possible since the termination equipment for the direct line circuit is physically located in the central office.

In the case of a concentrated line, however, the equipment for terminating the subscriber's line is at the remote unit and physically inaccessible to the maintenance man. Thus in order to isolate the faulted concentrated line from service the maintenance man in certain prior art arrangements was required to actually travel to the specific location of the remote unit and to operate upon the equipment at the remote location. The disadvantages of such a requirement are outstanding. Since the remote unit by definition is located at a distance from the central office and since in many instances the remote unit is actually difficult to approach physically, e.g., pole mounted units, vault enclosed units, etc., the physical task alone of isolating the line from service is time consuming and expensive and presents substantial physiological demands.

And, in fact, the disadvantages thus inherent in this type of prior art procedure are literally compounded since the service employee or maintenance man after having traveled to the remote location to perform the necessary physical tasks required for isolation, must then ultimately double back over the same path to subsequently restore the line to service when the permanent line condition or fault has been remedied.

It is therefore an object of this invention to provide facilities for isolating lines having permanent conditions thereon in a concentrator system.

Another object of this invention is to provide facilities for isolating permanent lines, by which isolation may be achieved by operations exclusively at the central office location.

Still another object of this invention is to provide facilities for isolating lines having permanent conditions thereon without the necessity of physically approaching the remote line concentrator unit.

A further object of this invention is to provide facilities for isolating faulted concentrator lines and to restore said lines to service without the necessity of departing from the central office location.

Although the ratio of concentration in remote concentrator units is in general designed to permit operation without any reduction in the quality of service accorded to subscribers, it is of course possible during certain instances for all of the trunks to a remote line concentrator unit to be occupied. This condition has its parallel in the direct line situation when, for example, a calling party is denied access to common equipment in the central office which is shared with other lines when all of the available common equipments are occupied.

It should be remembered that a universal type of line concentrator presents unique problems in this regard. Since the central office equipment as indicated above is optimally arranged with respect to the concentrator equipment so that the central office equipment is unaware of the fact that the called line is a concentrated line rather than a direct line certain incongruous results may occur. For example, since the central office is literally unaware that the line to which it believes it is effecting a connection is not physically and directly connected to the line termination having once connected to the line termination, it can only assume that the called line is off-hook. Consequently the central office ringing equipment is mobilized to apply ringing tone to the called line termination. If indeed all of the trunks to the remote unit are occupied the called line cannot be connected to the central office and obviously the ringing tone applied to the line termination is not heard. But even more serious is the fact that the calling subscriber who hears the usual audible tone signifying ringing is being applied naturally assumes that the called subscriber's line does not answer and that presumably the called subscriber is not available at his substation. As a result the calling subscriber will not attempt to effect another connection to the called subscriber until some substantial time interval has elapsed during which the called subscriber may "return home."

Ultimately when a connection is established between the two subscribers and the circumstances relating to the previous unsuccessful call are imparted to the called subscriber the latter will suspect the efficacy of his terminating equipment since he personally was aware of his presence near the substation during the all-trunks-occupied period. Regrettably, he may even call the telephone company to report what apparently was a service failure.

All of this difficulty and inconvenience arises from the fact that the calling subscriber receives false information which indicates ringing is being performed when all the concentrator trunks are occupied.

It is therefore an object of this invention to provide for the application of a busy tone to a calling subscriber's line when the called subscriber's line is unavailable because of an all-trunks-busy condition.

Still another object of this invention is to connect a calling subscriber to the next available line after an all-trunks-busy condition.

These and other objects and features of the invention are outlined as explained in the following qualitative description.

These and other objects and features of the invention may be realized by a universal line concentrator employing crossbar switches having magnetically latched hold magnets and line and cut-off relays which are also of the magnetically latching type.

Illustratively the concentrator will accommodate a maximum of 100 lines in two groups of 50 lines each. Each group of lines has access to ten trunks each which connect the concentrator to the central office. Two additional signal pairs are used to transmit control signals between the concentrator and the central office. Viewed in broad outline, the concentrator so far as the switching network is concerned resembles a converging network, i.e., a larger number of lines connectable to a smaller number of trunks at the remote unit. One hundred subscribers' substations are connected to the crossbar switches at the remote unit and have access to twenty trunks thereat. These twenty trunks are extended to a complementary crosspoint network at the control unit which is located at the central office. Here, the trunks are deconcentrated or re-expanded, i.e., a smaller number of trunks are connectable to a larger number of lines. At the control unit the subscriber's line terminations at the central office are connected to the crossbar network.

Thus the universality of the concentrator is manifest. So far as the central office line circuit is concerned, it cannot perceive that the line termination at the central office does not, in fact, directly extend to the calling subscriber's line. More specifically, it is unaware of the interposition of the line concentrator between the central office line circuit termination and the subscriber's substation. In addition, it is apparent that no modification of the central office line circuit equipment is required.

The instant concentrator provides for a highly efficient line identification facility which prevents ambiguity of identification on simultaneous calls. As will be indicated herein it is wholly unnecessary to dynamically or continuously scan the lines in the remote unit. Instead, a line circuit individual to each of the calling lines is energized at the switchhook contacts of the calling subscriber to initiate operation of identification relays unique to the calling subscriber's line. Since as yet there is no connection between the control unit and the remote unit, it is necessary to indicate to the control unit what the identification of the calling substation line is, in order that the unique line termination at the central office associated with the calling subscriber's line may be selected in preparation for connection of the calling substation thereto.

This involves very basically the energization of a signal circuit in response to the operation of the identification relays to transmit signals from the remote unit to the control unit indicative of the calling substation line.

In the instant invention the signal circuit includes an efficient, simple, and interference-free direct-current signaling system in which the basic element includes a sensitive relay and a marginal relay at both the control unit and the remote unit. These relays are interconnected over signal conductors.

The operation of the signal relays is such that a ternary signaling system is provided by merely providing (1) no current to the signal conductor resulting in none of the relays operating, (2) low current to the signal conductor resulting in the operation of only the sensitive relays and, (3) high current to the signal conductor resulting in the operation of all of the signal relays. Since the signal arrangement includes two separate signal elements of the type described, each including a marginal and sensitive relay at the remote unit and at the control unit, it may be observed that the four relays provide a total of 54 possible combinations for each major group. This is extended to 108 combinations by preliminary signals indicating group "0" (lines 0 to 49) or group "1" (lines 50 to 99).

In the instant embodiment each line is provided with a line relay at the remote unit and a cut-off relay at the remote unit. Similarly, each line includes at the control unit a sleeve relay and cut-off relay individual to the line. All of these relays are independent of the conventional line and cut-off relay at the line termination in the central office.

Typically, when a receiver goes off-hook on an originating call, the line relay is operated at the remote unit and a pair of identification relays are in turn actuated. The latter relays uniquely identify the line and serve to initiate the functioning of the signal relays.

When the signal relays at both ends of the trunk are operated in four successive cycles in accordance with the information on the identification relays the identification is stored in appropriate registers at the control unit and the remote unit.

After the information is completely stored and checked appropriate select and hold magnets are operated in the crossbar networks at the remote unit and the control unit to connect the line through the concentrator to its corresponding line termination in the central office.

As indicated above the signal circuitry includes basically a sensitive relay and a marginal relay at both the control unit and the remote unit. These four relays are connected in serial fashion over signal conductors. Also, as indicated rapid signaling between the remote and control units of the concentrator is accomplished by transmitting high current, low current and no current over the signal conductors.

Two control pairs are utilized. The first control or signal pair transmits a series of four signal pulses in either direction depending on the type of call as explained further herein. The first pulse or signal information establishes which of the two 50 line groups of the particular line is included in. Arbitrarily lines 1–49 are assigned to group "0" and lines 51–99 are assigned to group "1." This first signal will be referred to consistently hereinafter as the group information.

The second signal selects one of the nine groups into which the 49 individual line circuits are divided. This information is determined in the case of an originating call by the line relay at the remote unit and in the case of a terminating call by the sleeve relay at the control unit but in either event, the second burst of signal information is hereinafter referred to as the "B" information.

The third signal determines which of the six lines withing the line group is involved in the call. This information is derived in a manner similar to that described for the "B" information. Hereinafter the third signal transmission will be referred to as the "A" information.

Thus far, information has been outlined concerning the line group, the "B" information and the "A" information. Collectively, these three groups of signals completely and uniquely identify the line.

It now remains to transfer information relating to the trunk. This is accomplished in the fourth burst of signal information which selects one of the first nine trunks assigned to each 50 line unit.

All of the above information is transmitted over the first control pair. The second control pair is used as will be described in detail herein for sequence control, i.e., programming of the concentrator functions, circuit checking, release of the concentrator common equipment and selection of the tenth trunk in each group of 50 lines.

It will be of value in comprehending the instant invention to briefly outline the operation of the circuitry on a typical type of call. Thus, in the case of an originating call by a subscriber, physically, the first action is the removal of the receiver which in turn includes closing the switchhook contacts and completes a circuit over the subscriber's line to operate the line relay at the remote unit. This relay is unique to the subscriber's line and resembles the line relay conventionally used in telephone circuits with the exception that this relay together with the cut-off relay therefor is magnetically latching.

An abbreviated functional description would then include the operation of a pair of identification relays in response to the operation of the line relay in a line lockout circuit. The purpose of the latter circuit is to prevent invalid or ambiguous identifications in the event of a plurality of simultaneous originating calls. The information stored in the identification relays is operative upon the signal circuit to actuate the signal relays and, in particular, code combinations reflecting the particular group in which the line appears, the "B" part of the line number and the "A" part of the line number. This information is transmitted from the identification relays to the signal relays in the sequence referred to above, the operation in its entirety being regulated by the sequence control circuits. As each item of information is stored in the signal relays at the remote unit, it is of course simultaneously stored in the signal relays at the control unit. After each individual operation of the signal relays, the register circuits are operated in response to the operation of the signal relays.

When information designating a line identification is complete, a trunk selection of an idle trunk is made at the control unit and this information is used to operate the signal relays thereby transmitting the trunk information to the remote unit where it is stored in the register circuit.

When this item of information is thus forwarded, all of the necessary intelligence to complete the call is available in the register circuits of both units. Thus, the complete line identification has been stored and the trunk over which the line is to be connected is also available.

At the control unit and at the remote unit the information in the register circuit is utilized to select appropriate select magnets to which a line is connected and the appropriate hold or vertical magnets to which a trunk is connected thereby to complete a connection between the line and the trunk at the crossbar switch, crosspoint networks at the remote unit and at the control (central office) unit. The latter hold magnets are magnetically latching and will remain operated indefinitely after they are actuated. Thus, when a path has been completed through the crossbar switch networks it may be traced from the calling subscriber's substation over the subscriber's line through the appropriate crosspoints in the remote unit network over the concentration trunk through the selected crosspoint in the control unit crossbar network and ultimately to the central office line termination. The latter termination is the same termination to which the calling subscriber's line would be connected if, in fact, a direct connection existed to the subscriber instead of a concentrator connection if the line were not concentrated. Under these circumstances, the cut-off relays at the remote unit and at the control unit are both in the released condition in order that the contacts on said relays remain open to divorce the line conductors from the line relays. In short, when a connection is established through the concentrator unit, the line conductors have "clean" tip and ring leads which are free of all series and shunt impedances which may have been introduced by the concentrator.

In the case of a terminating call, assuming that the call traverses the central office switching equipment in the conventional manner; ultimately a ground condition will appear on the sleeve of the subscriber's line at the central office. A group of sleeve relays in the control unit individual to the subscribers' lines are operated in accordance with the specific sleeve relay which has been operated. The information necessary to identify the called line on a terminating call originates in this manner. Thus a group of line lockout and identification relays similar to the identification relays at the remote unit are operated in conjunction with the particular sleeve relay which has been operated. The preference control circuit then assigns preference to the terminating call and all other simultaneous calls are locked out.

A preliminary pulse is transmitted over one of the signal conductors to the remote unit to prepare it for reception of signal information. In doing so the line lockout circuit at the remote unit is disabled to prevent any originating calls from competing for use of the signal circuit.

Thereafter, the sequence of operations so far as transmitting the group number "B" information, "A" information and the trunk number are similar in nature and in sequence to that described for an originating call above with the exception of course that the signals now all originate at the control unit since the information concerning the called line originates at the control unit.

As indicated above in general fashion in the instant invention, trunks are not automatically released when a call or conversation is terminated.

Instead, trunks are released according to a predetermined order when they are unoccupied only if five or more trunks in the group are cut through. However, only sufficient trunks will be released as are required to allow four trunks in the group to remain in the cut-through condition.

A disconnect request for a particular trunk is initiated when the associated hold magnet is operated and the trunk busy relay is normal and, moreover, a trunk load control relay is operated. As a result of this procedure the trunk selection circuit will select one of the trunks to be disconnected.

After selecting a trunk the trunk selection circuit will ground the trunk sleeve thereby operating the sleeve relay of the line to which the trunk is connected. This information is used to identify the line by means of the associated identification relays in the line and lockout circuit.

Thereafter, the line and trunk number together with a disconnect indication are transmitted to the remote unit and the operations are largely in accordance with that for a terminating call with the exception that the disconnect indication causes a reversal of polarity in the voltage applied to the cut-off relay and to the trunk hold magnets. This reversal produces a magnetic field in opposition to the field holding the apparatus in the operated position which thereby causes the release of the operated hold magnet. Since the cut-off relay was being held in the released condition the reversal causes operation of the cut-off relay.

A particularly advantageous feature of this invention includes facilities which prevent faulted or lines having "permanent" conditions thereon, such as line off-hook, etc. to hold trunks out of service to working lines. Provisions have been made for utilizing vacant signal codes to identify a "service denial" call. The purpose of the service denial call is to actuate equipment at the remote unit which divorces the line from the concentrator and prevents it from making an unwarranted and protracted seizure of a trunk thereby denying access to other lines attempting to originate legitimate calls. In this sense the service denial "call" is not literally a call since it involves the actuation of selection equipment by a maintenance man at the central office with no actual conversation taking place.

Essentially, a service denial call involves the operation of the cut-off relay in the remote circuit to isolate the faulted line from access to the concentrator. This arrangement is under direct control of a maintenance man at the central office who can initiate a service denial call by operation of an appropriate key as shown herein.

A line disabled as a result of the service denial call may be restored to service by the maintenance man also without physically approaching the remote unit.

A feature of this invention includes signaling means predicated on an all-direct-current signaling system which minimizes interference with adjacent speech channels.

Still another feature of this invention is a signaling system which provides for rapid and accurate signaling between the remote unit and the control unit by transmitting relatively high current, relatively low current and no current over the signal conductors.

Another feature of this invention is a signaling system which is symmetrical and bidirectional in operation.

A further feature of this invention is a signaling system which enables the remote unit and the control unit to initiate the signaling sequence.

Another feature of this invention includes facilities for transmitting nine distinct signal codes using two pairs of sensitive and marginal relays.

Still another feature of this invention includes signaling facilities for supplementing the number of combinations of signal codes by providing a preliminary identifying pulse to mark the succeeding signal pulses as indicative of one of two possible identifications.

Still another feature of this invention includes facilities for isolating faulted lines or lines having permanent conditions thereon.

Yet another feature of this invention includes arrangements for divorcing faulted lines and lines having permanent conditions thereon from access to the concentrator equipment without physically approaching the remote concentrator equipment.

Still another feature of this invention includes equipment for "locking out" lines having permanent conditions thereon and denying them access to concentrator usage by actions exclusively within the central office location.

Still another feature of this invention includes structural facilities for maintaining lines which have fault or permanent conditions thereon locked out indefinitely without continuous energy drain.

A still further feature of this invention includes equipment for restoring lines which have been locked out to normal service and providing access by said lines to the concentrator equipment.

An additional feature of this invention includes arrangements for performing the restoration of service to lines which have previously been locked out by signaling functions exclusively within the central office location.

A further feature of this invention includes facilities for providing lockout of or service denial to lines which have fault conditions or permanent conditions thereon without the necessity of dispatching maintenance personnel to the remote equipment location.

Yet another feature of this invention involves structural facilities for providing an overflow tone or busy tone on a terminating call to a concentrator line when all concentrator trunks are occupied.

Still another feature of this invention includes facilities for providing equipment for selectively connecting waiting callers on terminating calls to a concentrator line when the first idle trunk is available for an all-trunks-occupied condition.

These and other objects and features of the invention may be more readily comprehended from the following detailed description, appended claims and attached drawing in which:

Figure 3:
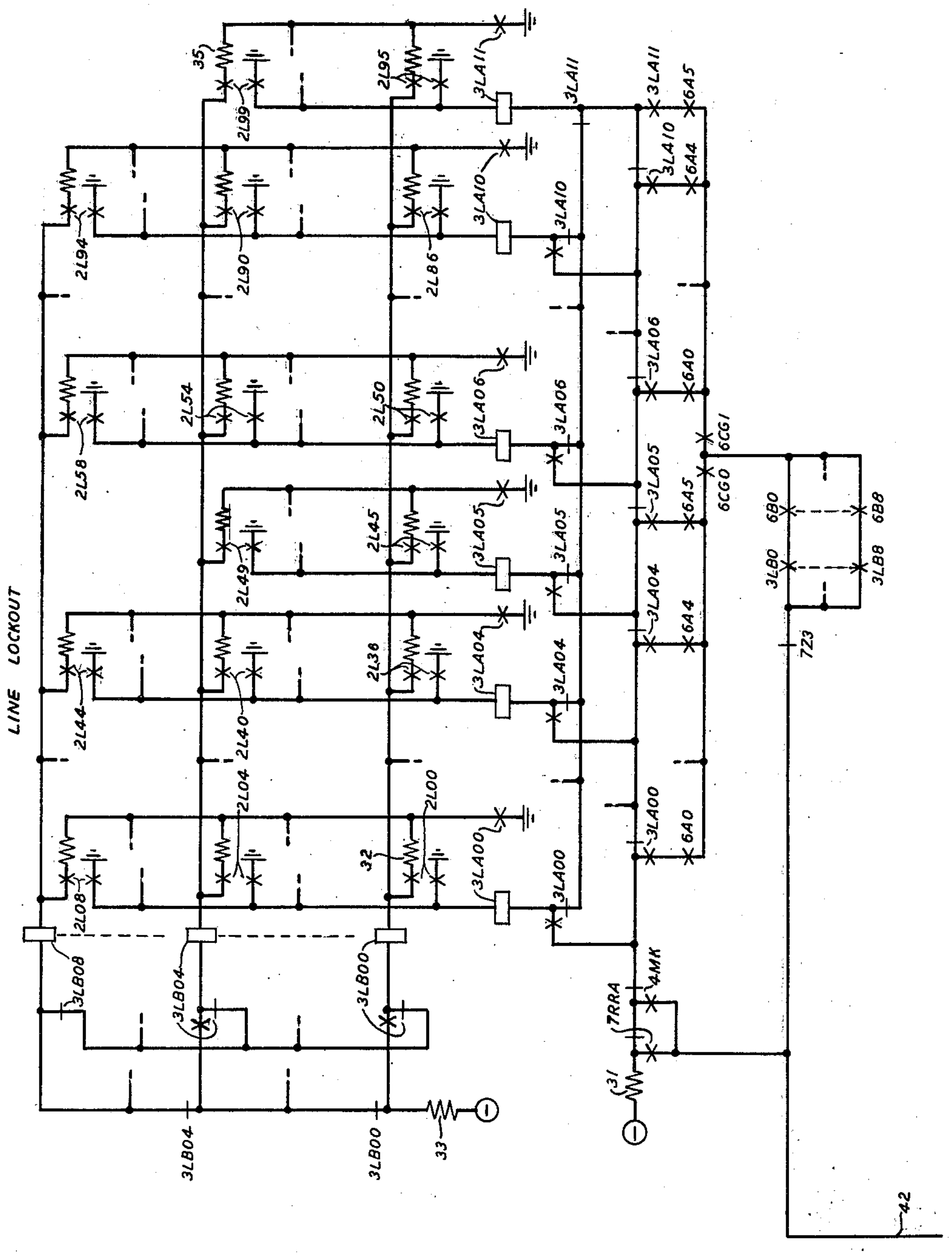
Figure 4:
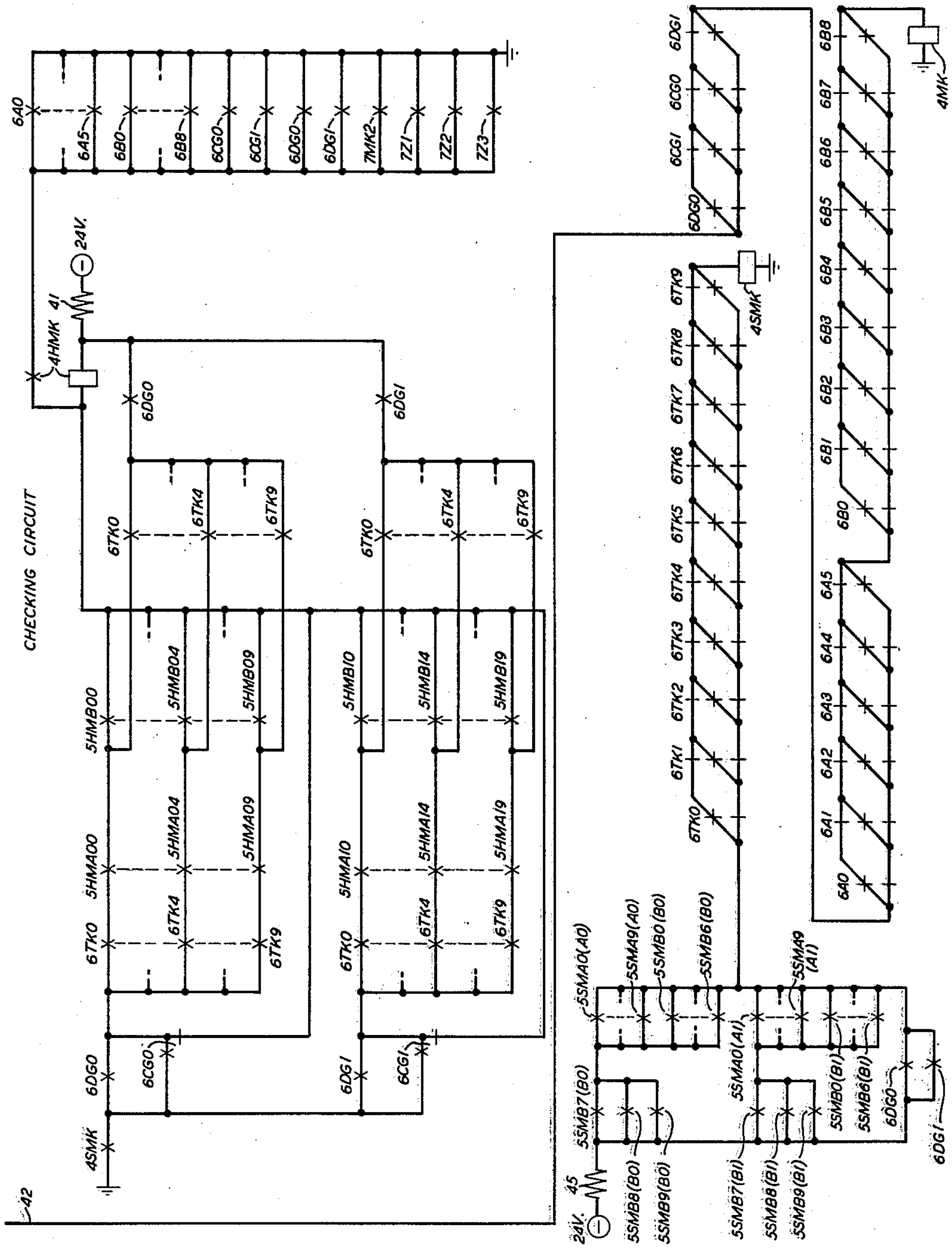
Figure 5:
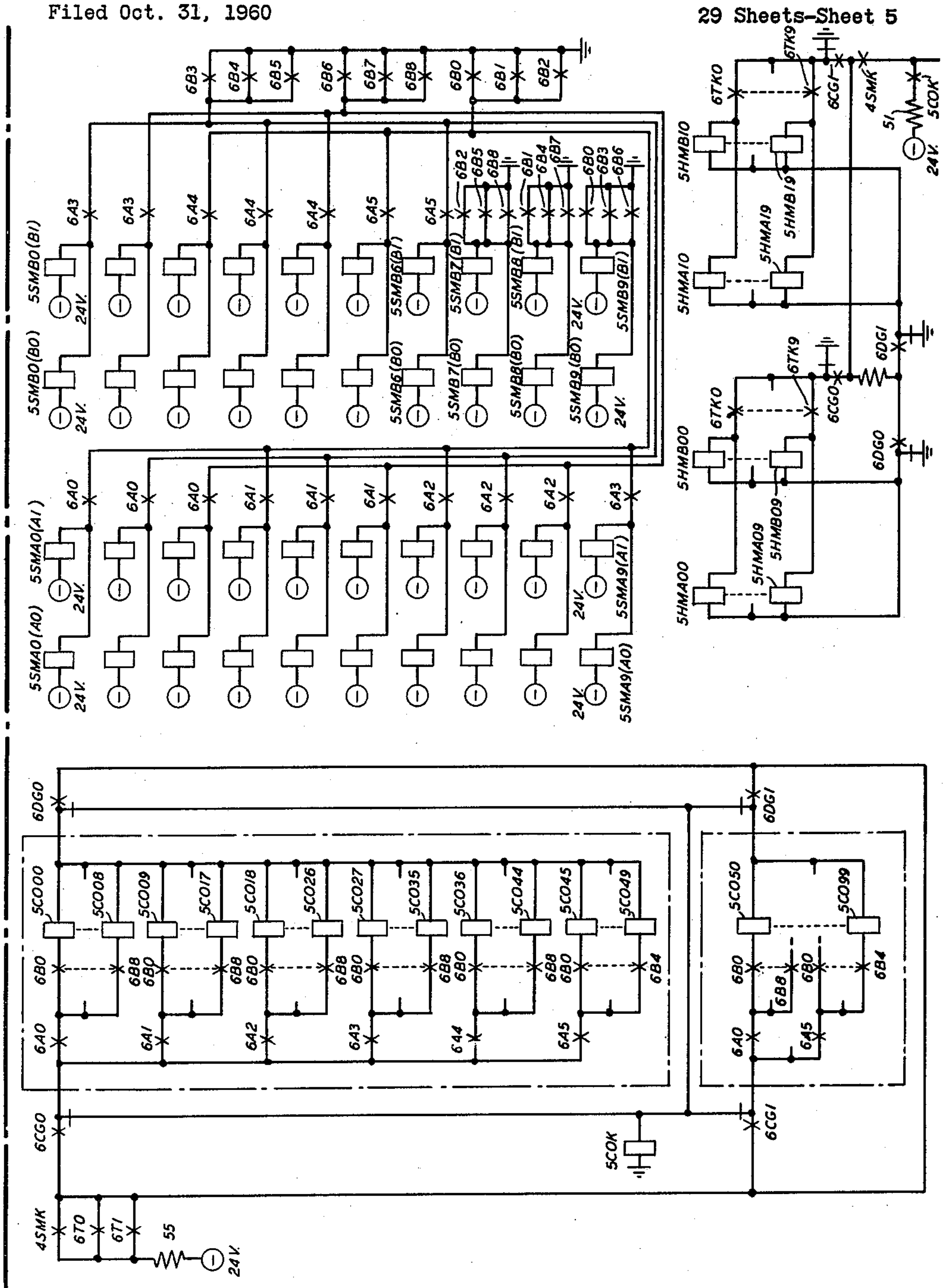
Figure 6:
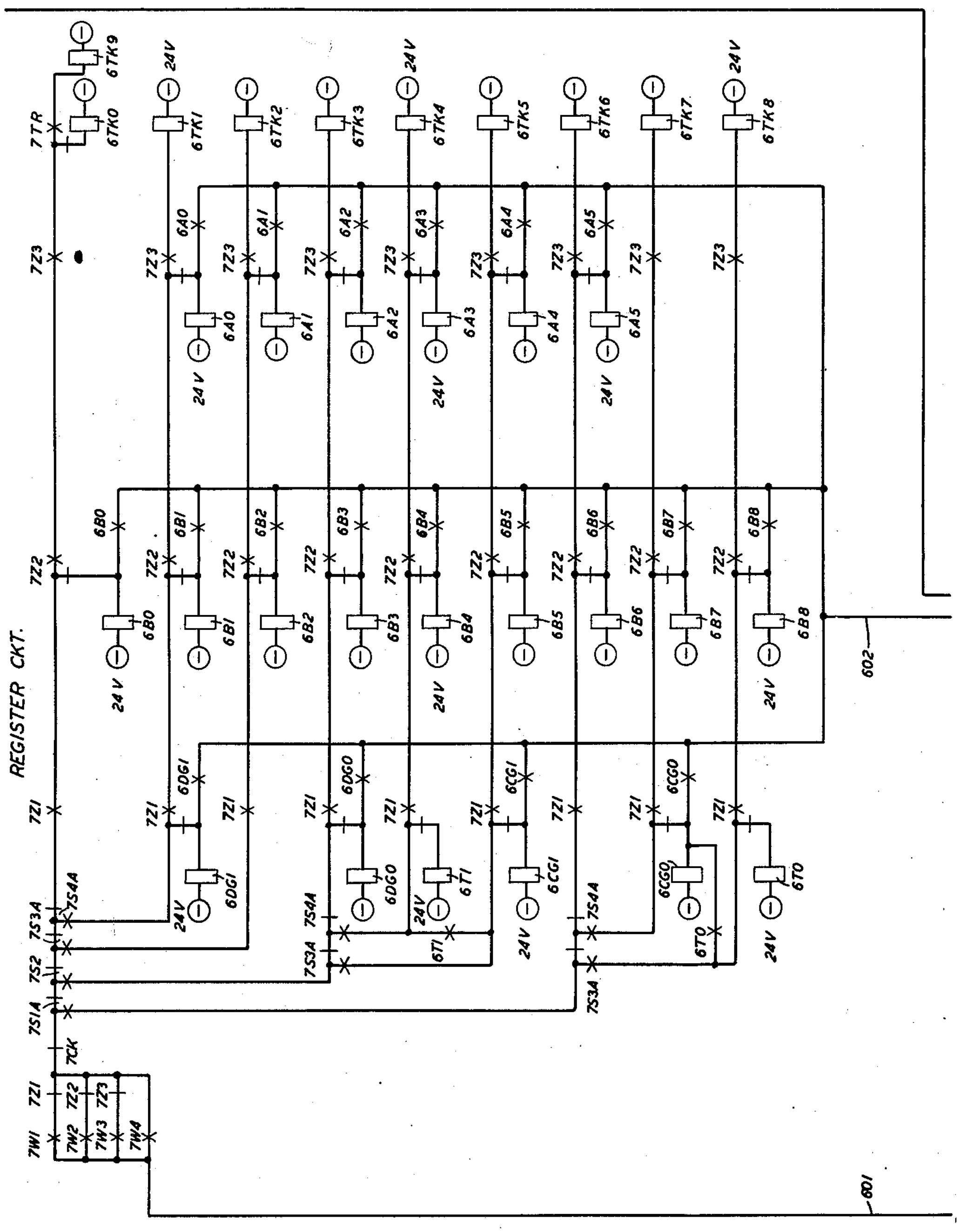
Figure 7:
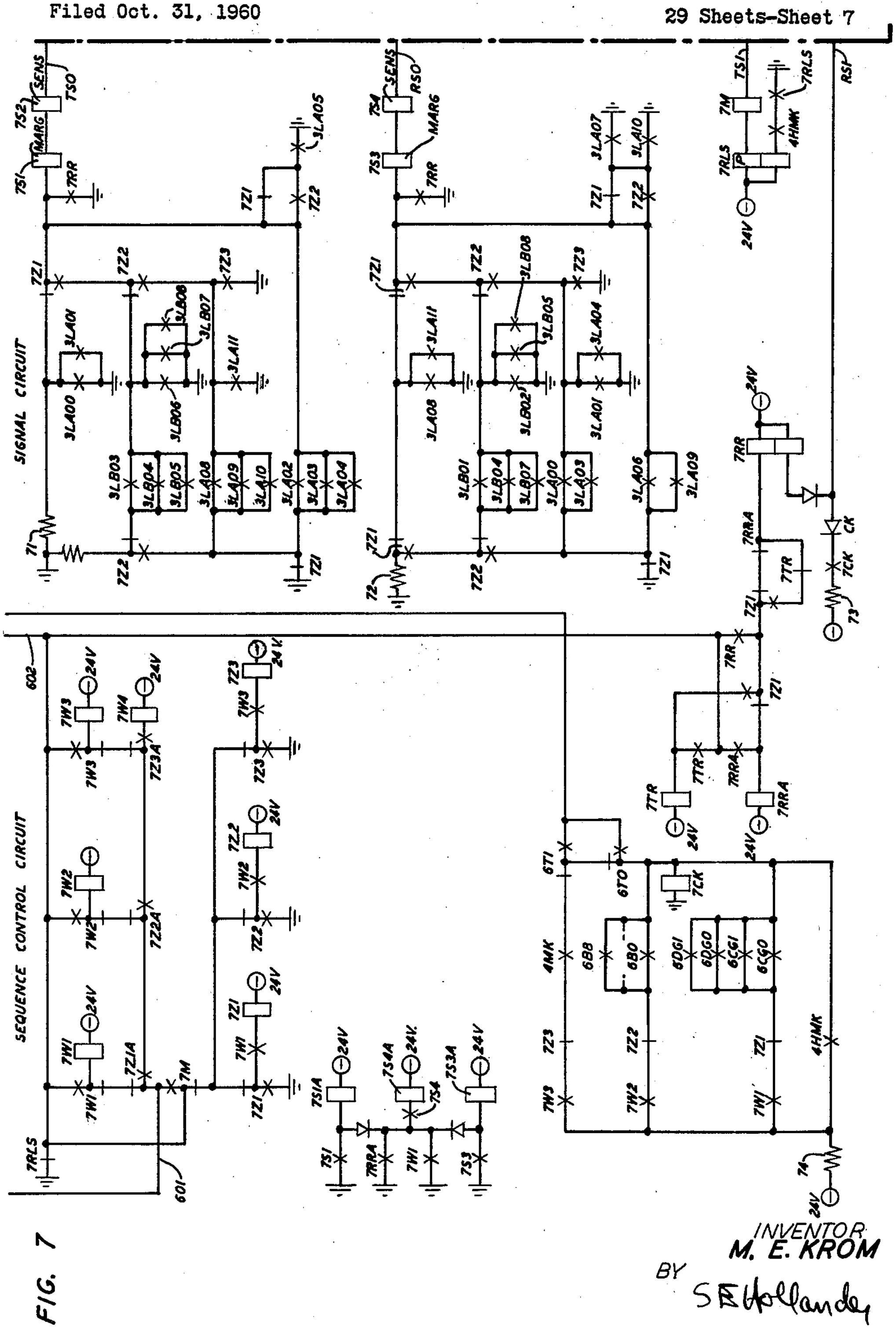
Figure 8:
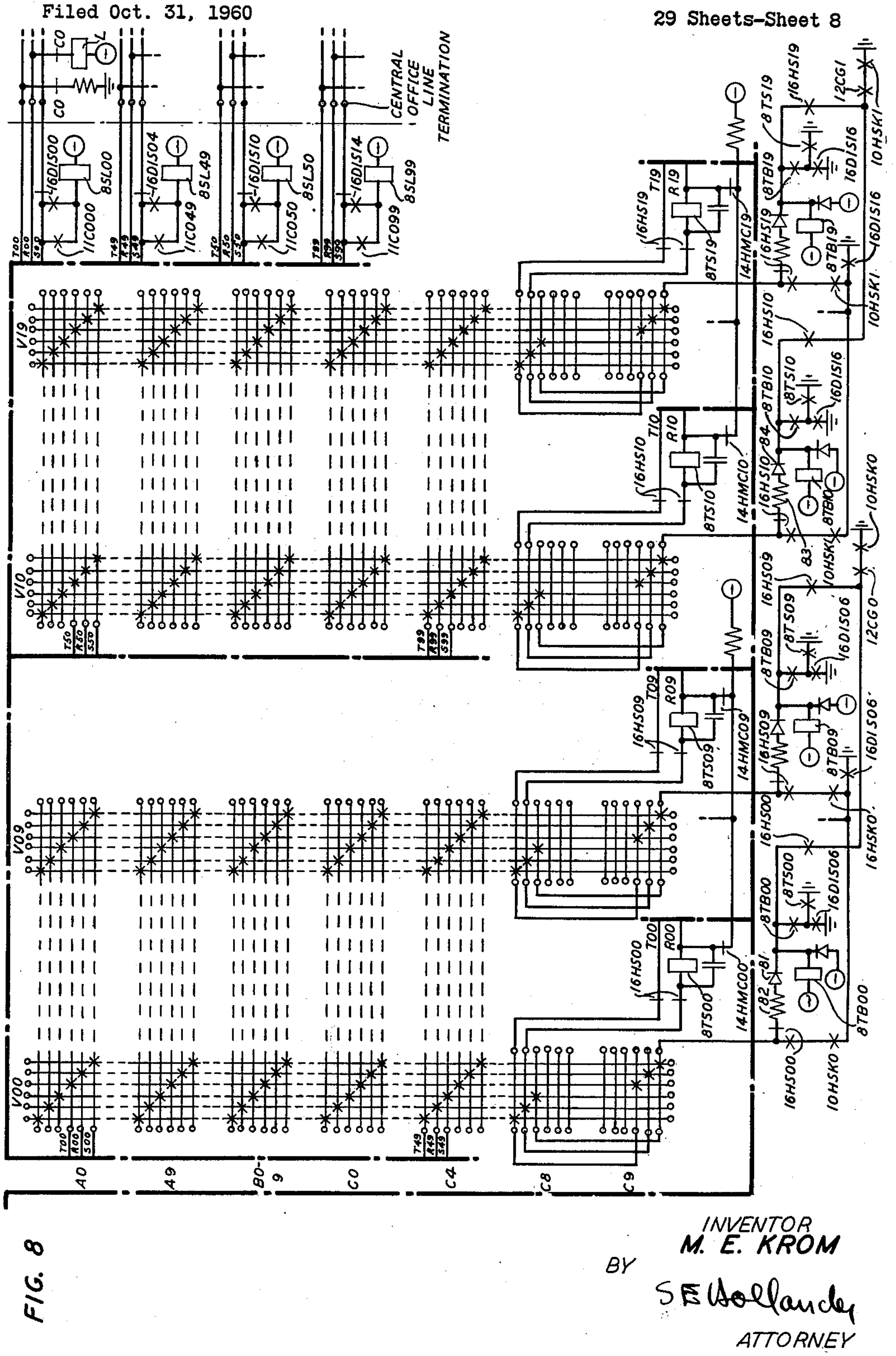
Figure 9:
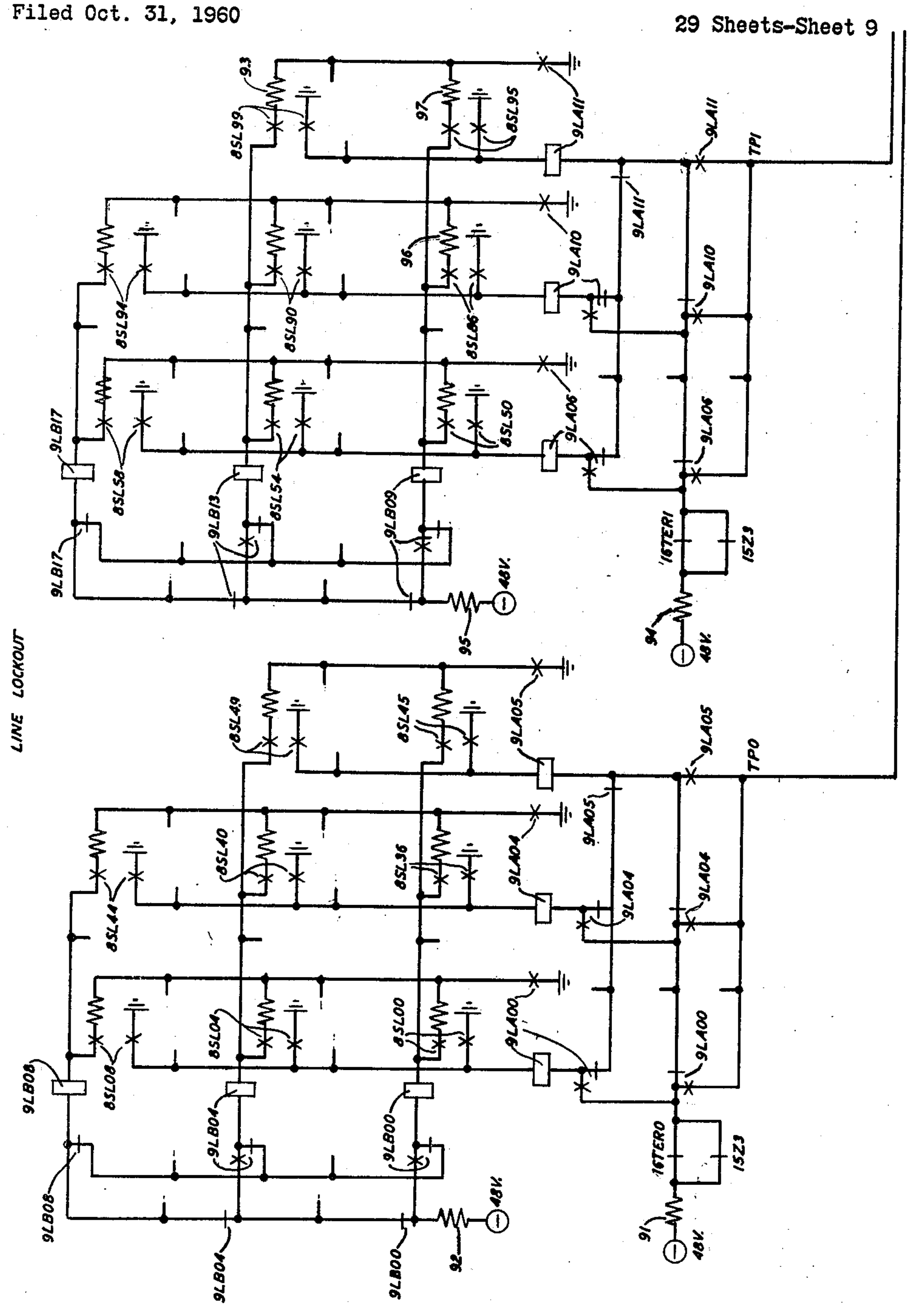
Figure 10:
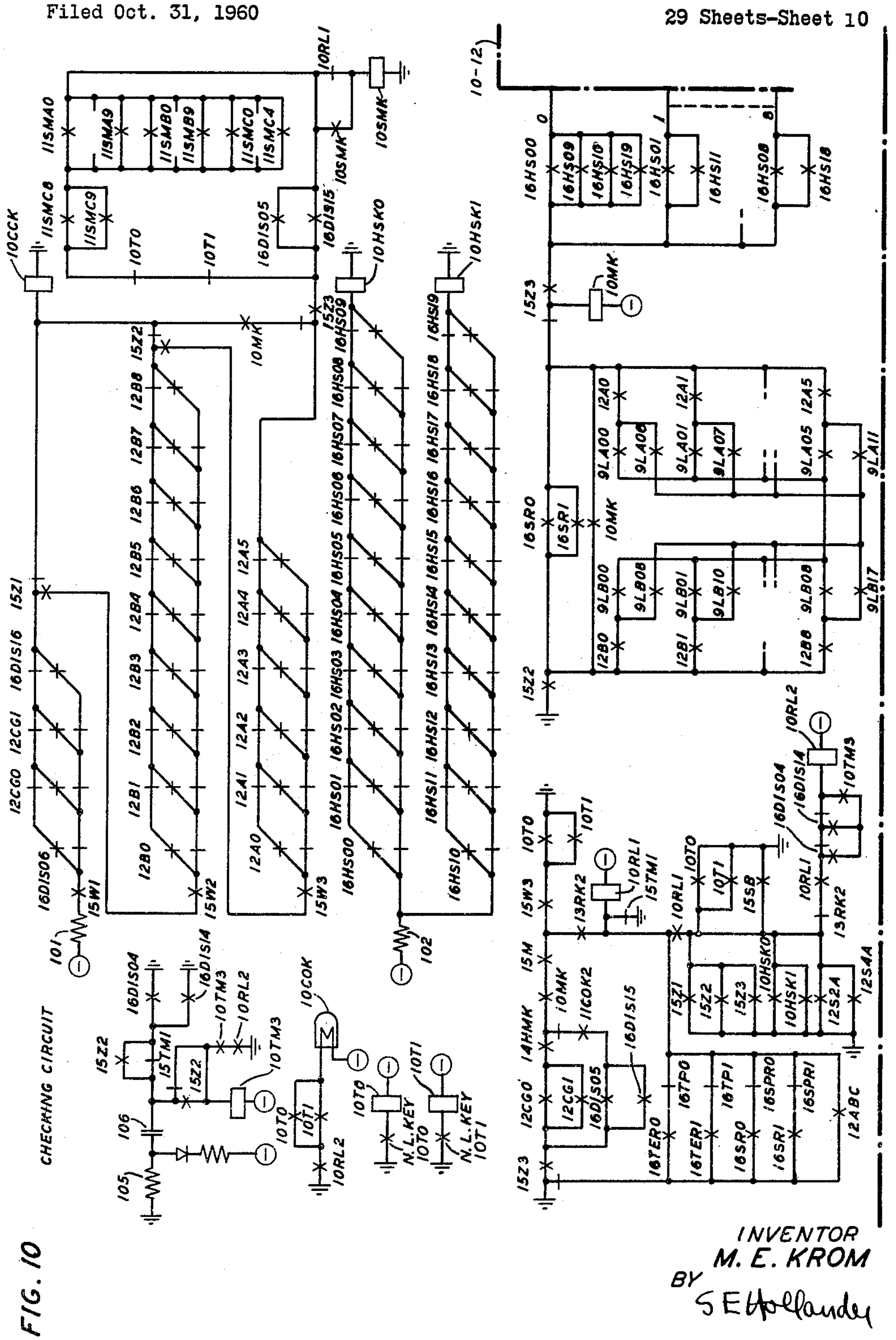
Figure 11:
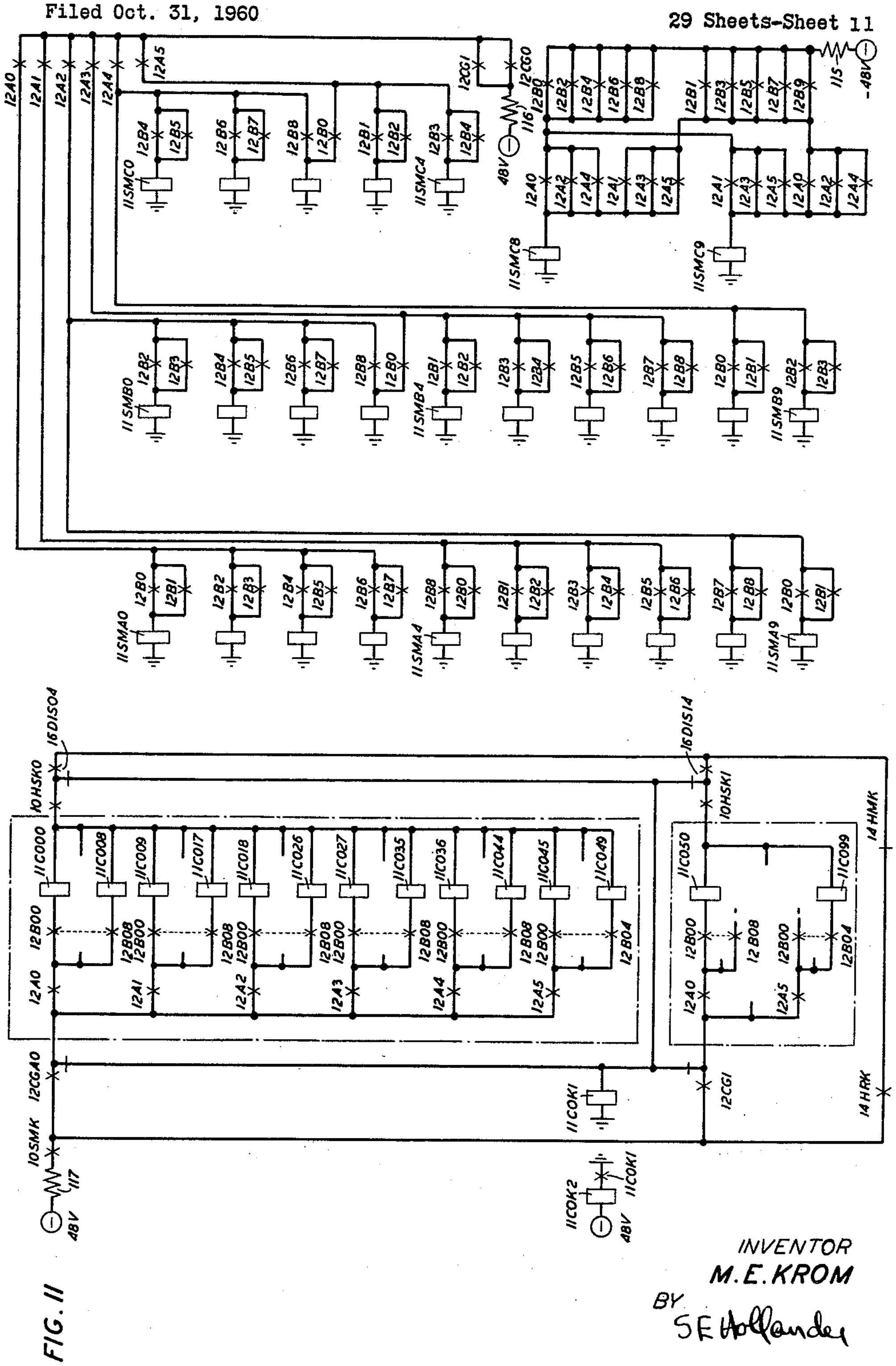
Figure 12:
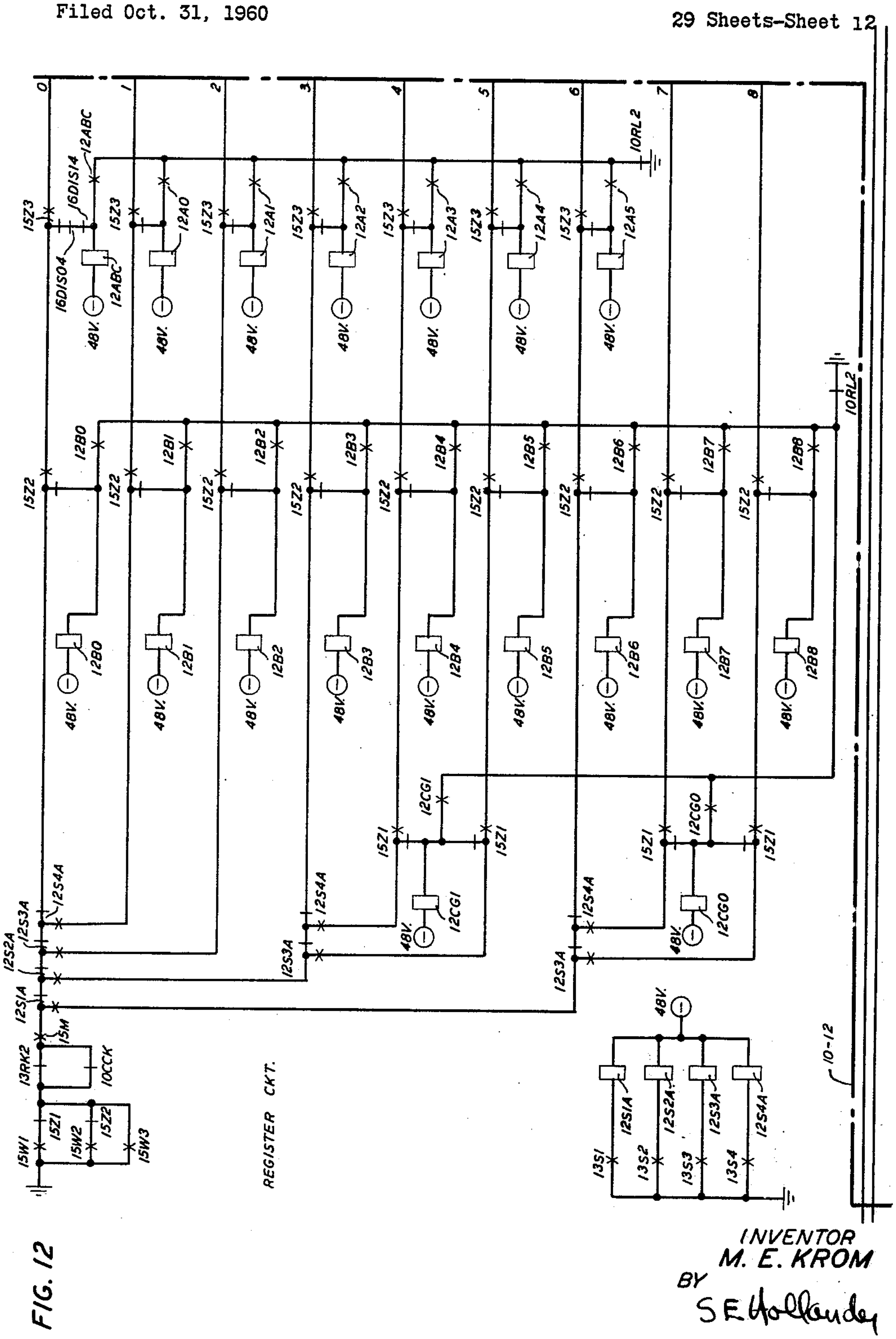
Figure 13:
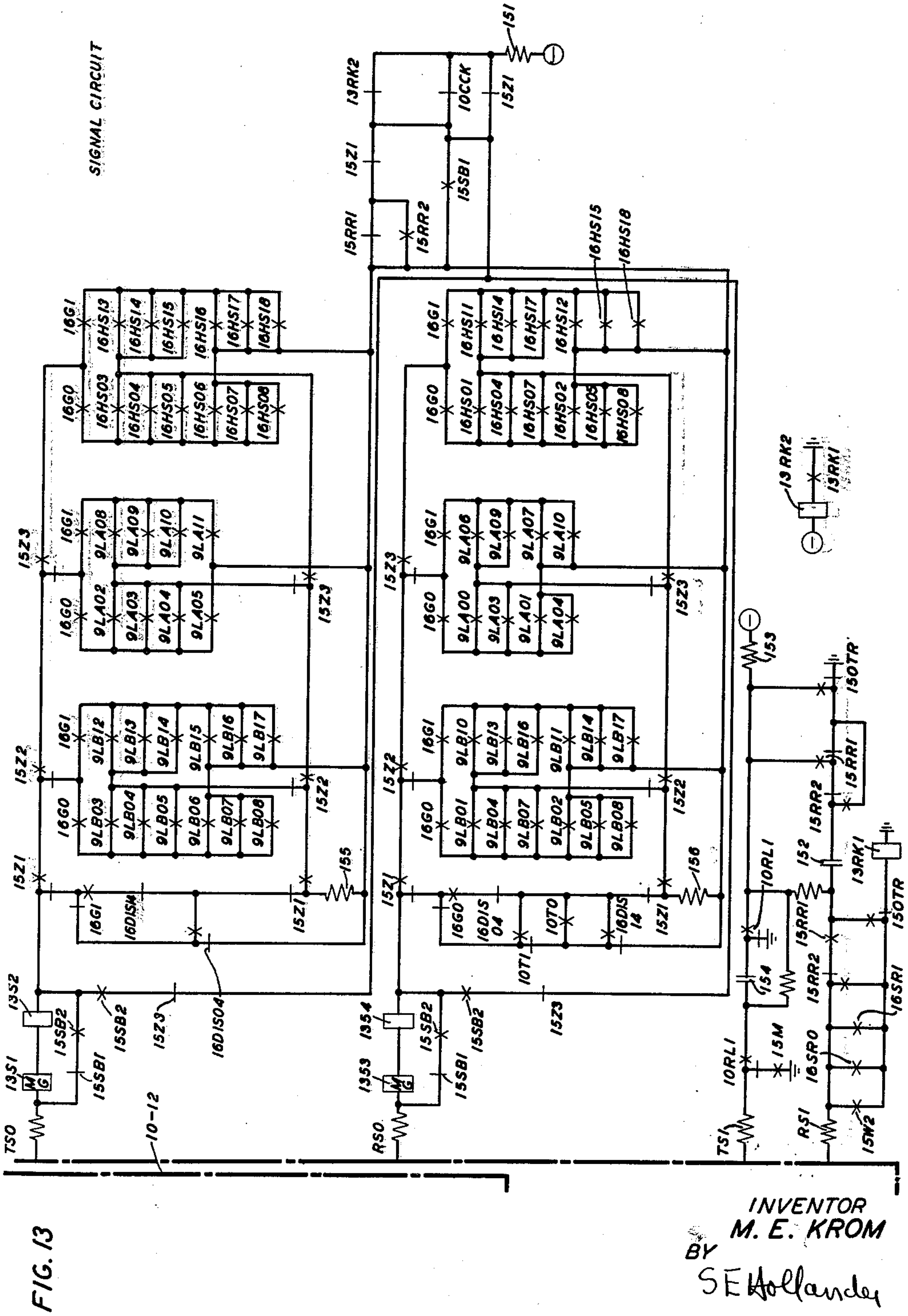
Figure 14:
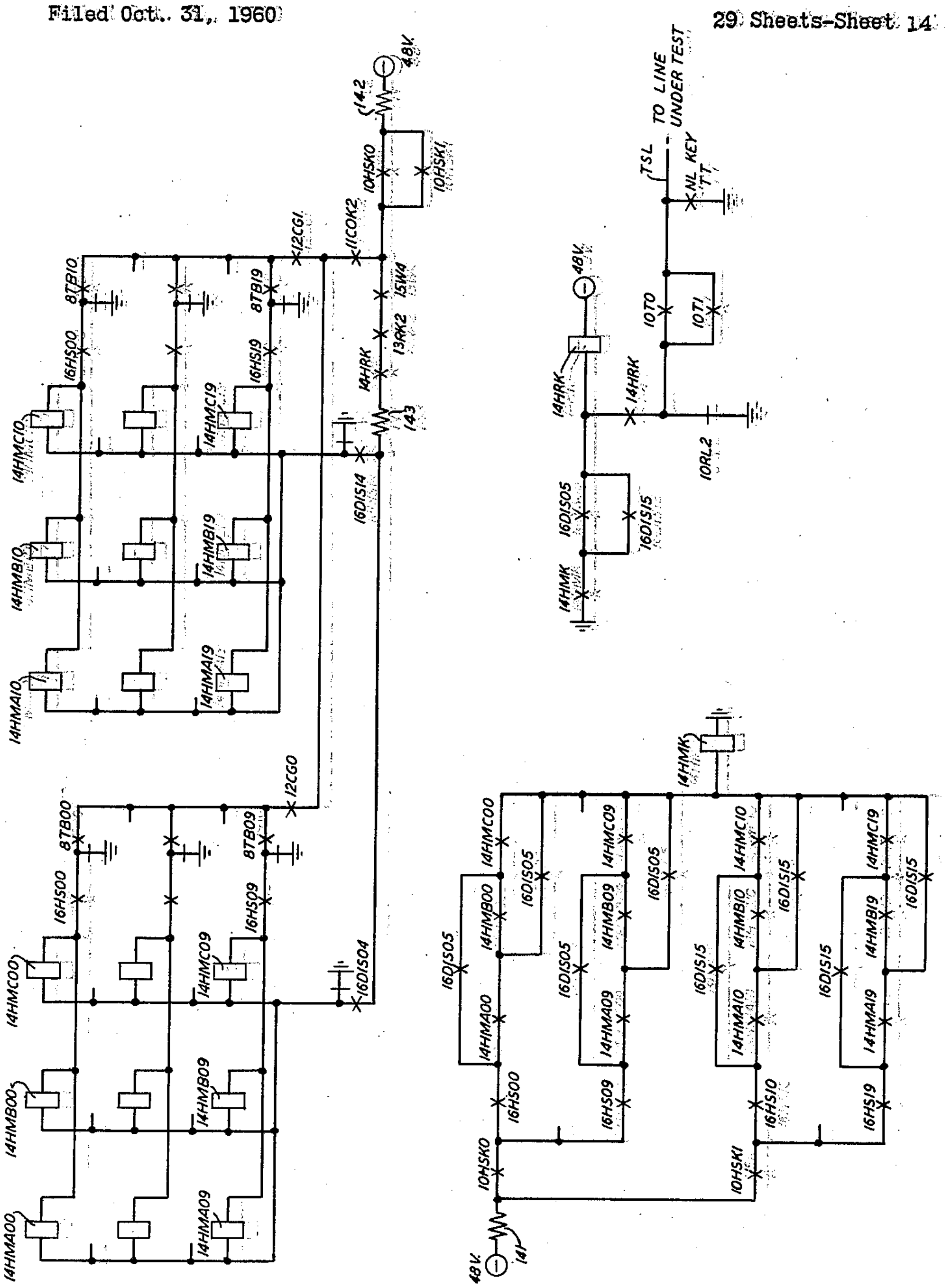
Figure 15:
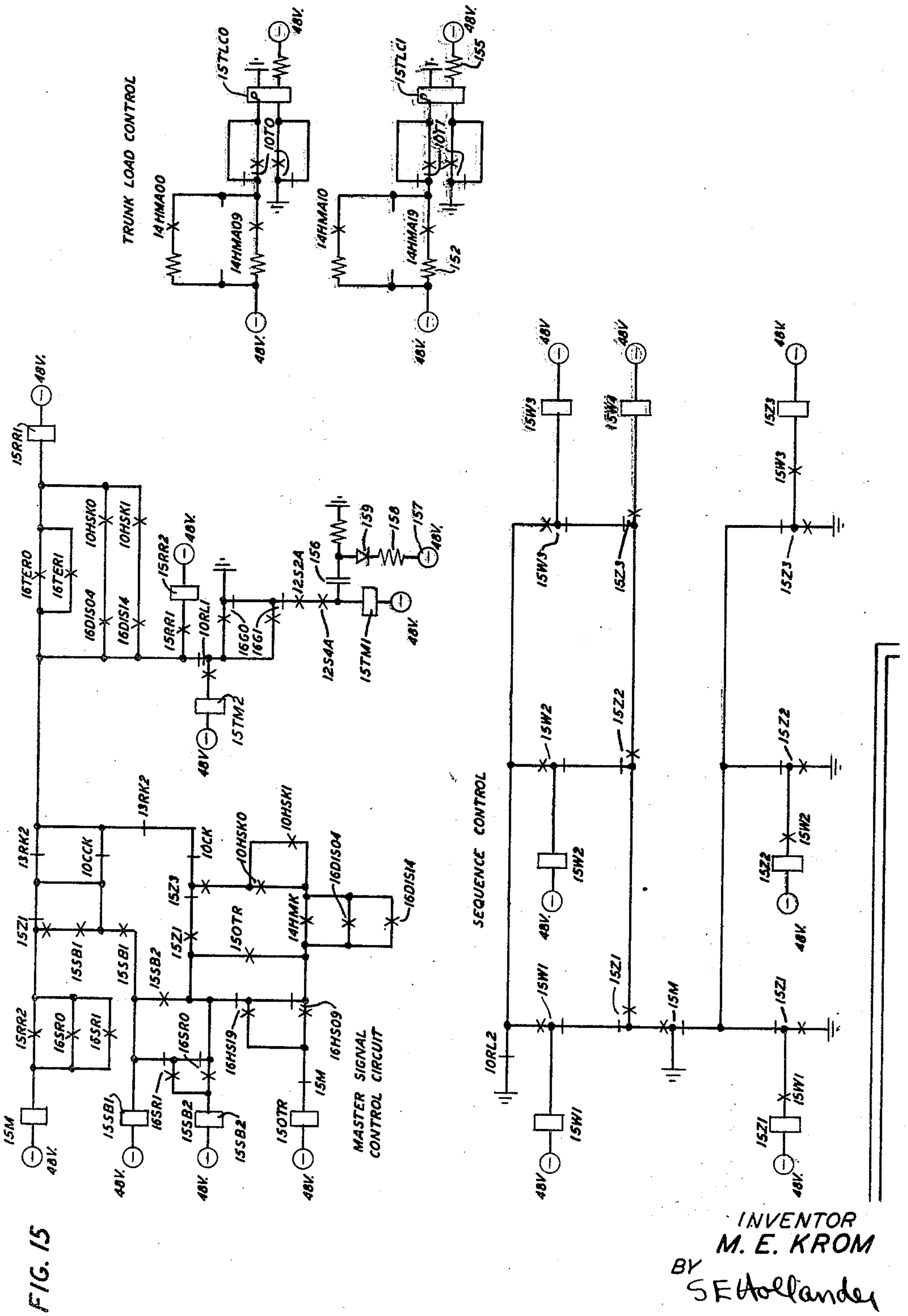
Figures 16, 17:
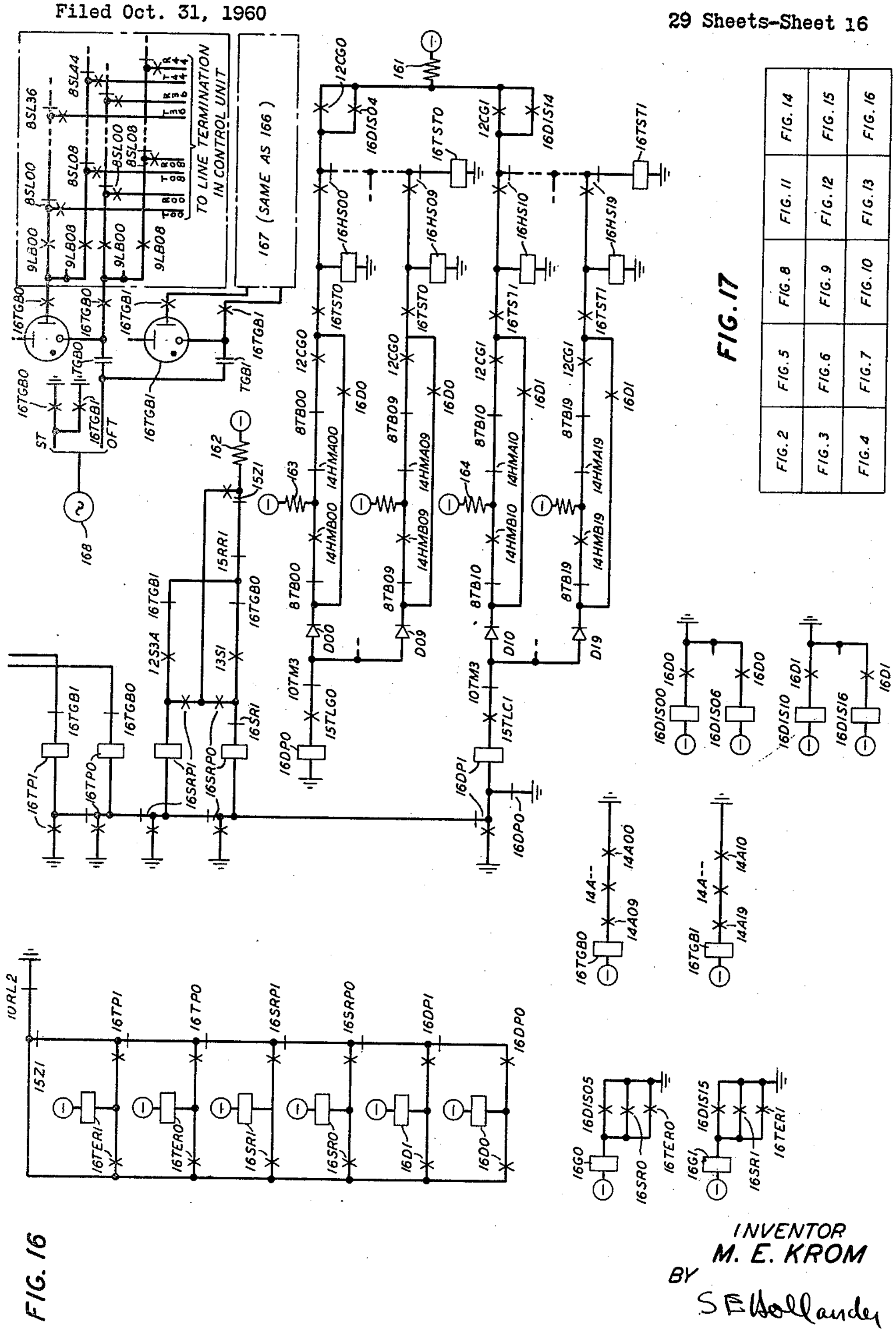
Figure 18:
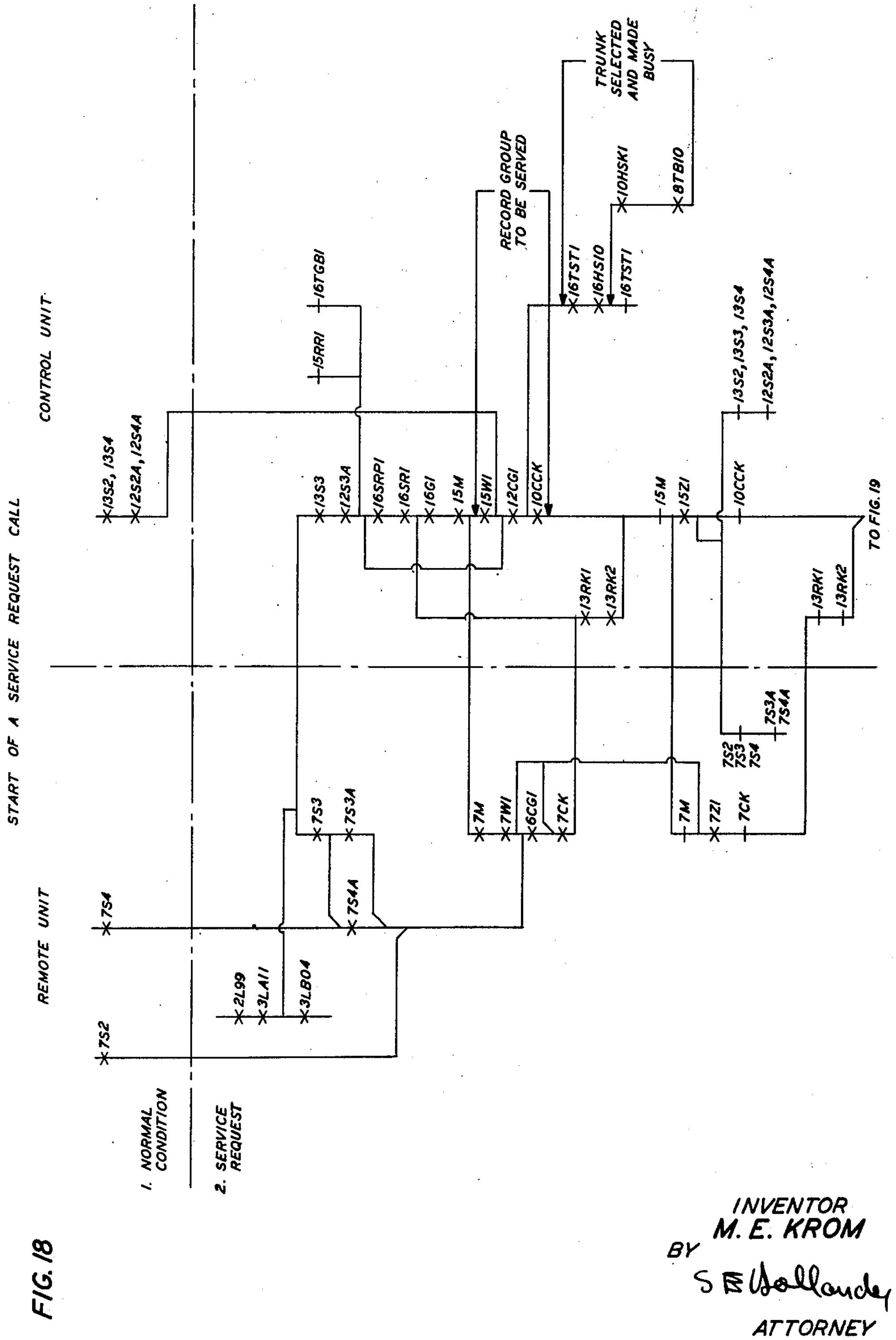
Figure 19:
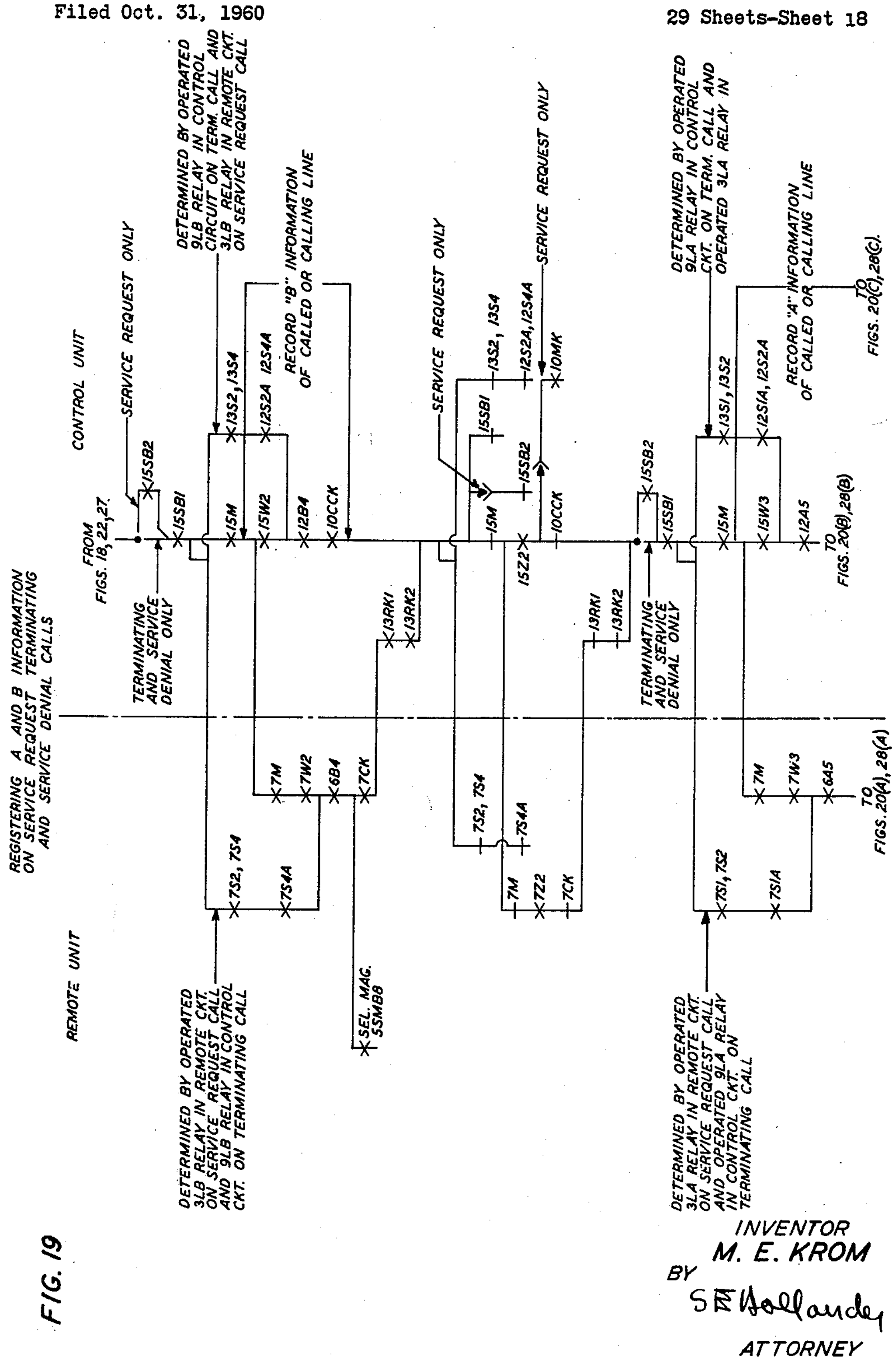
Figure 20:
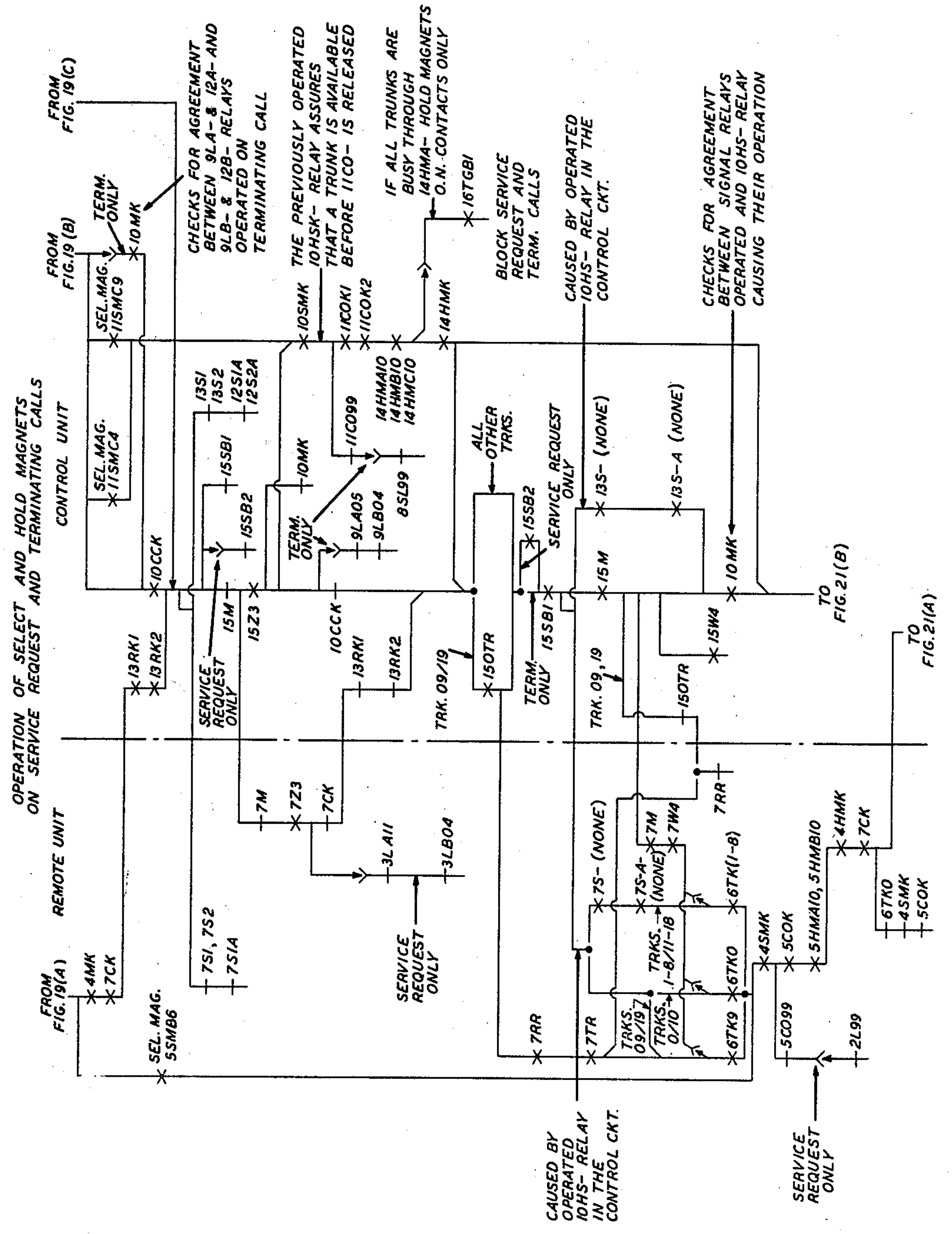
Figure 21:
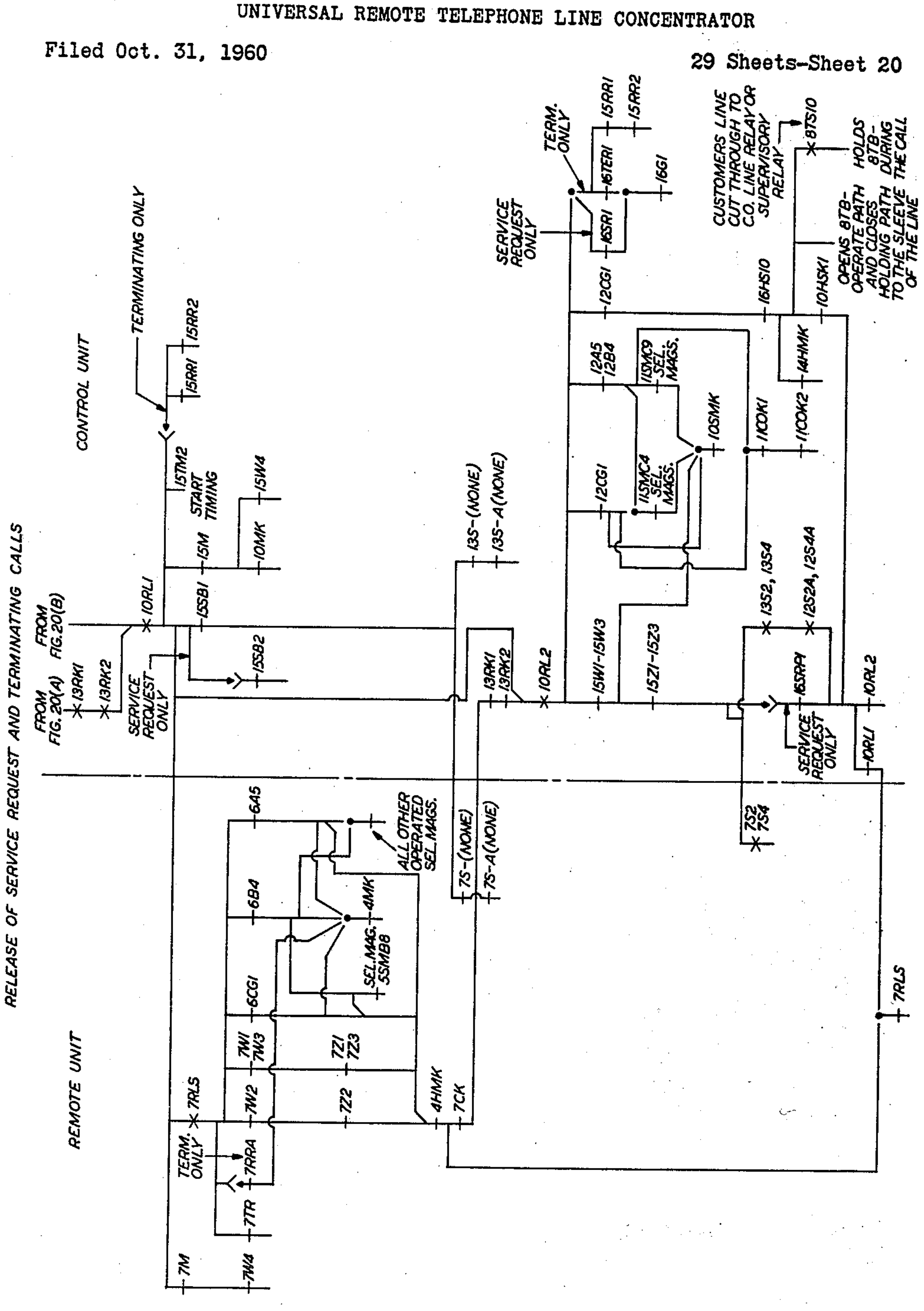
Figure 22:
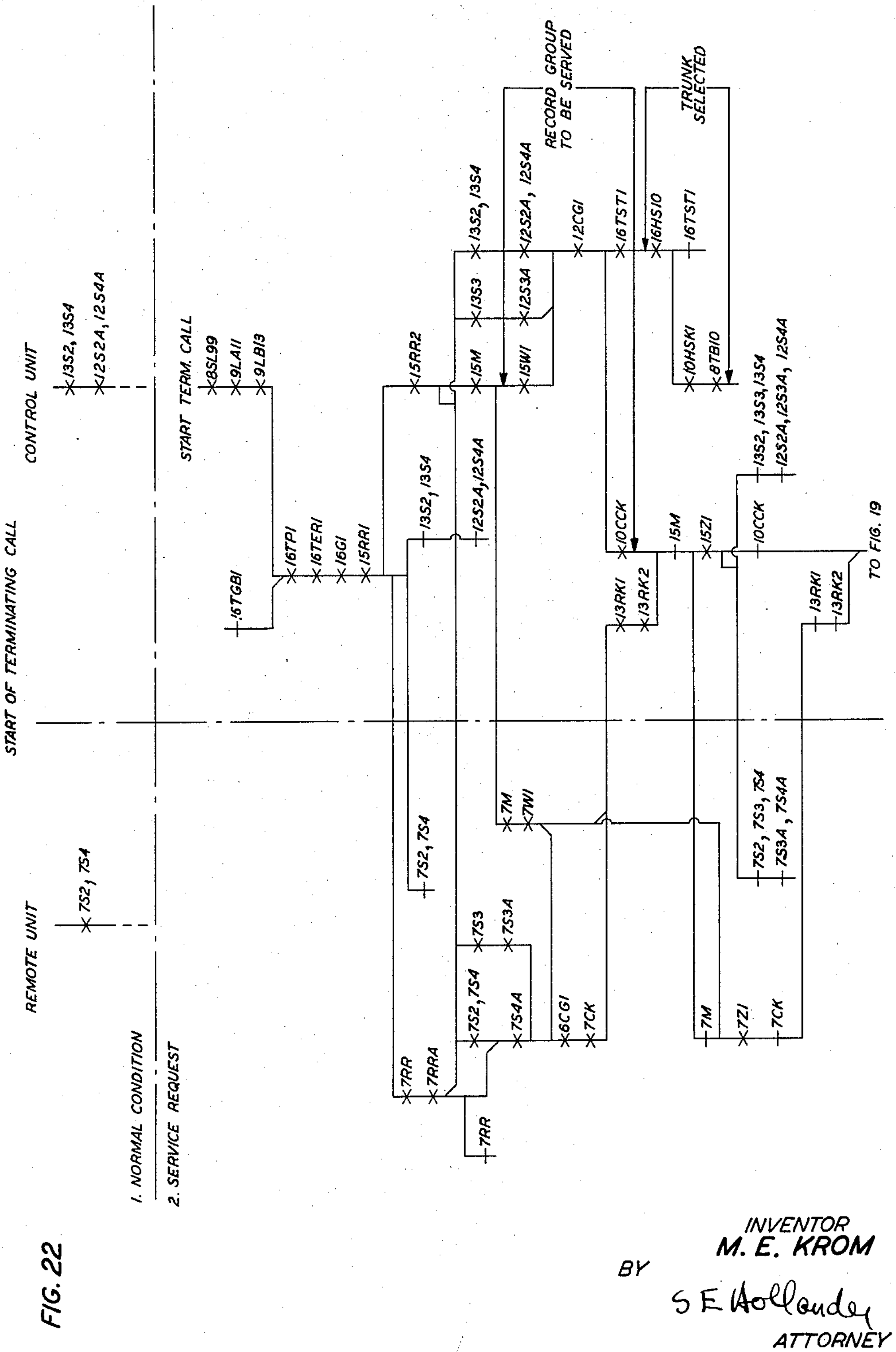
Figure 23:
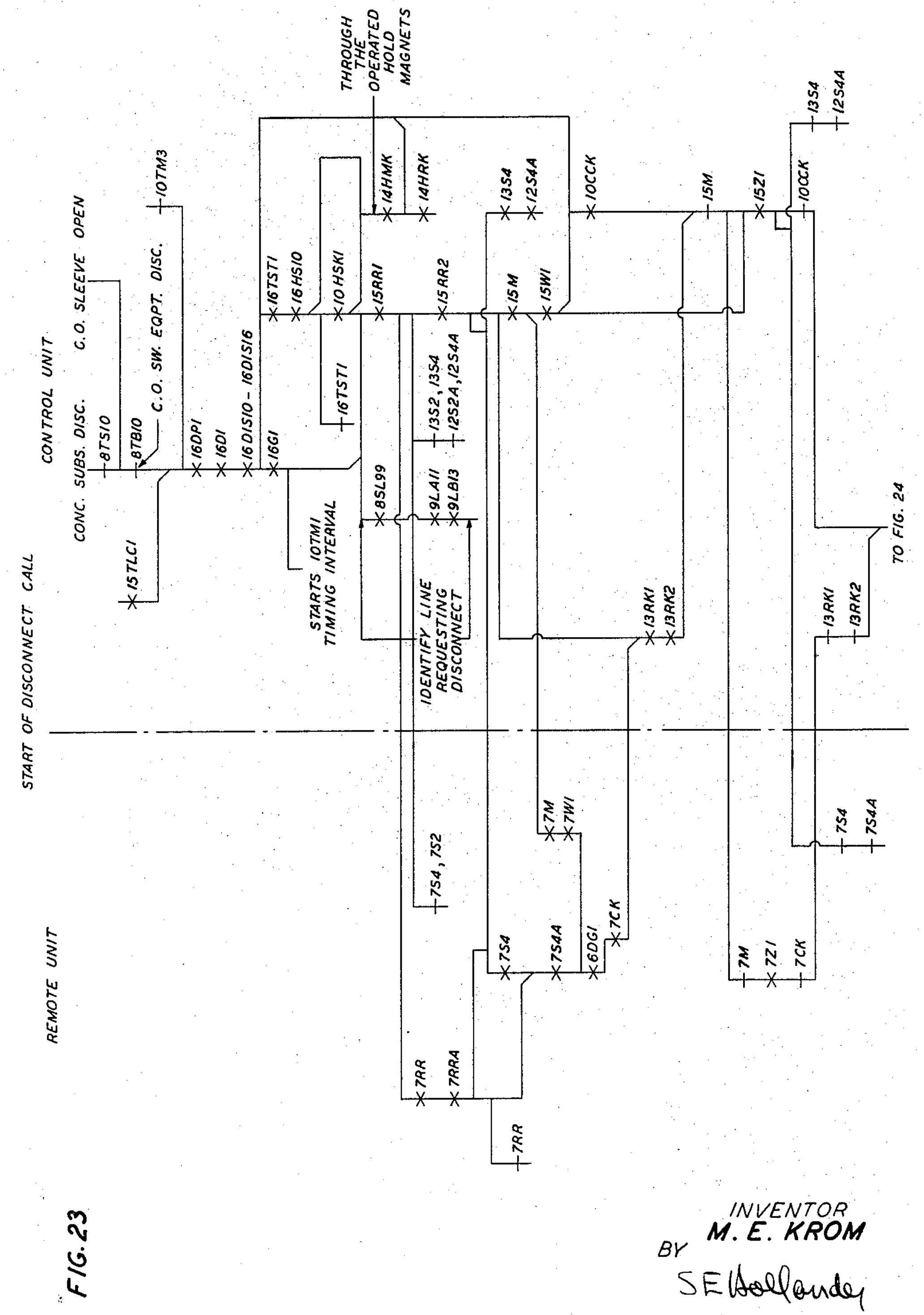
Figure 24:
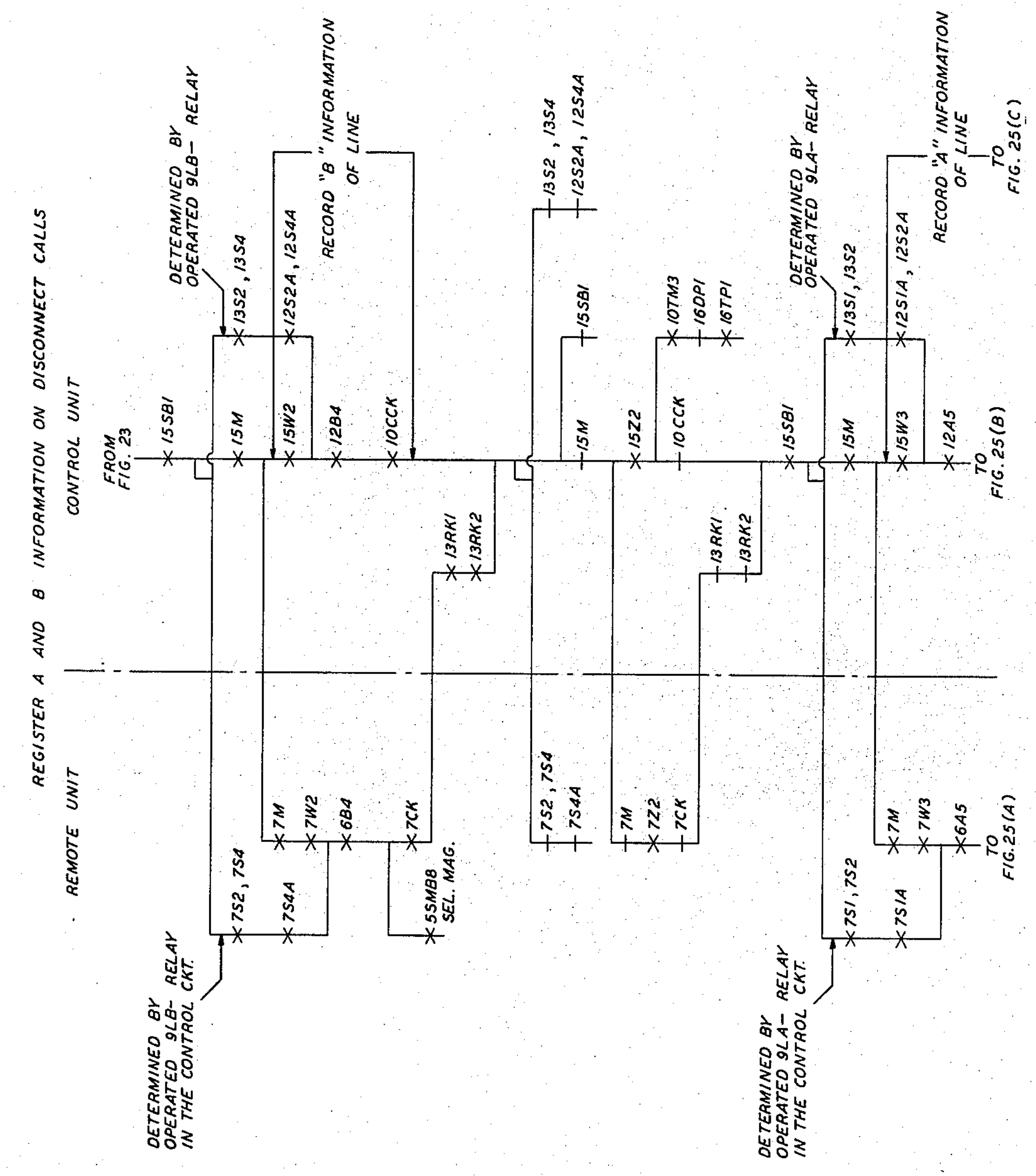
Figure 25:
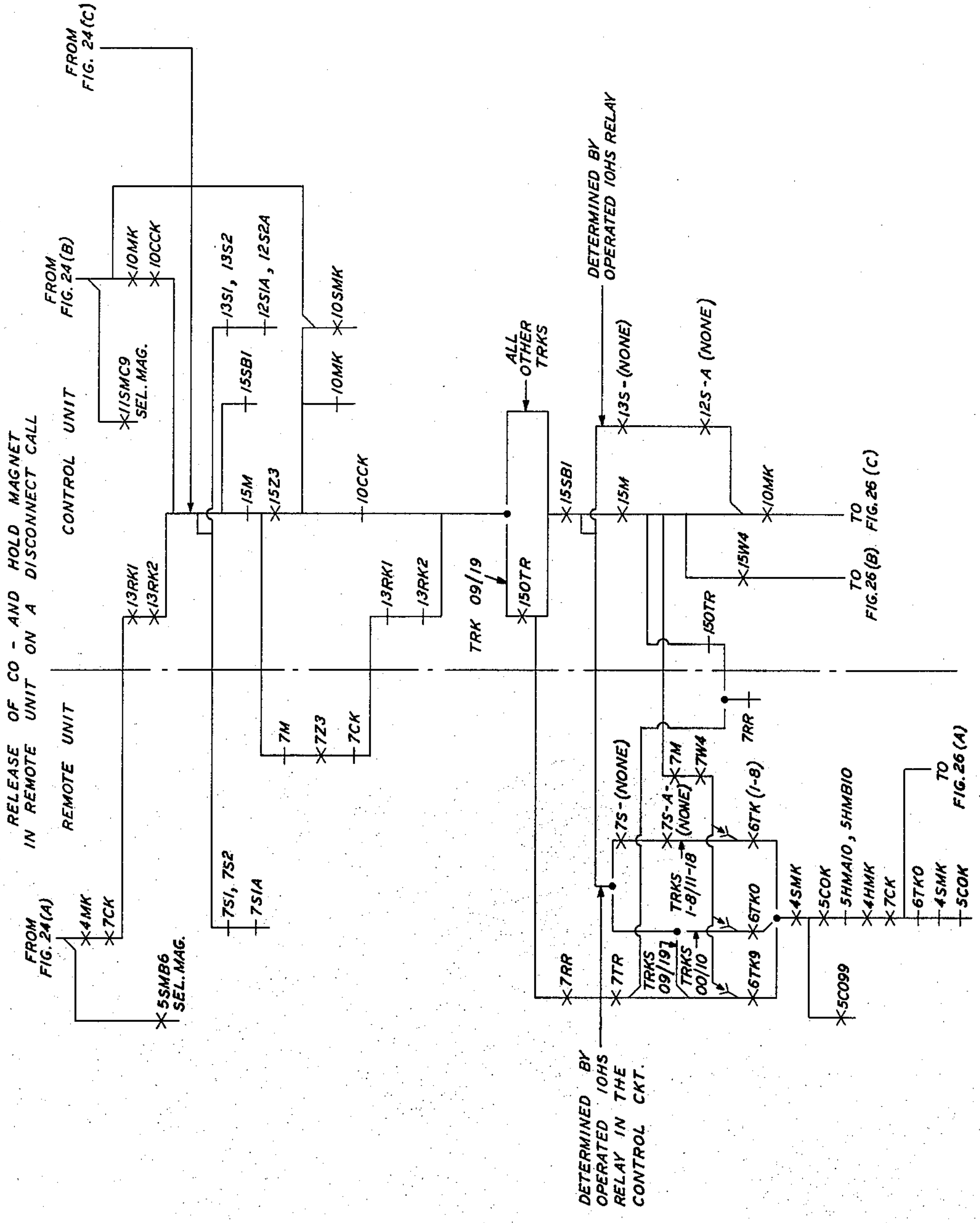
Figure 26:
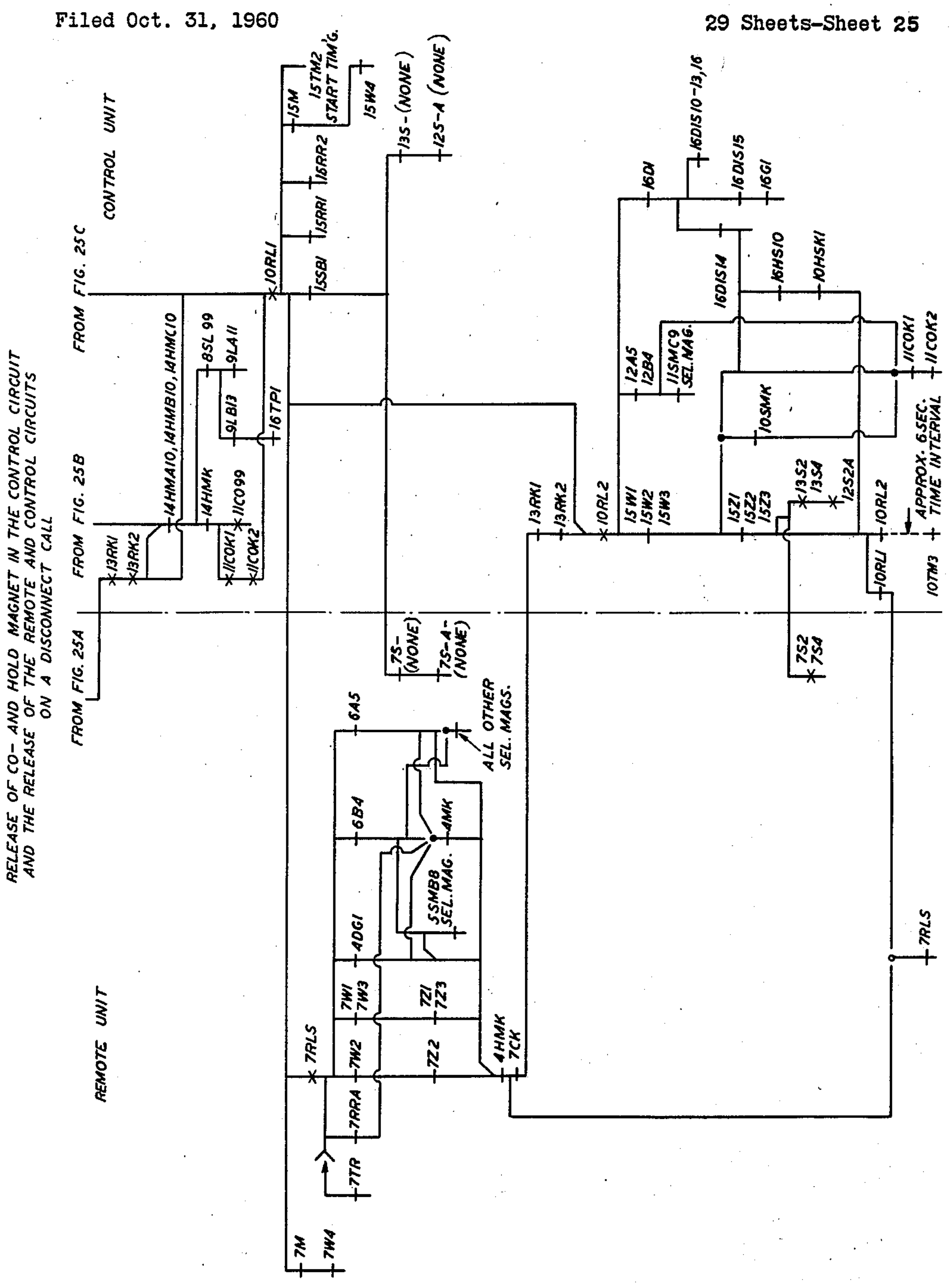
Figure 27:
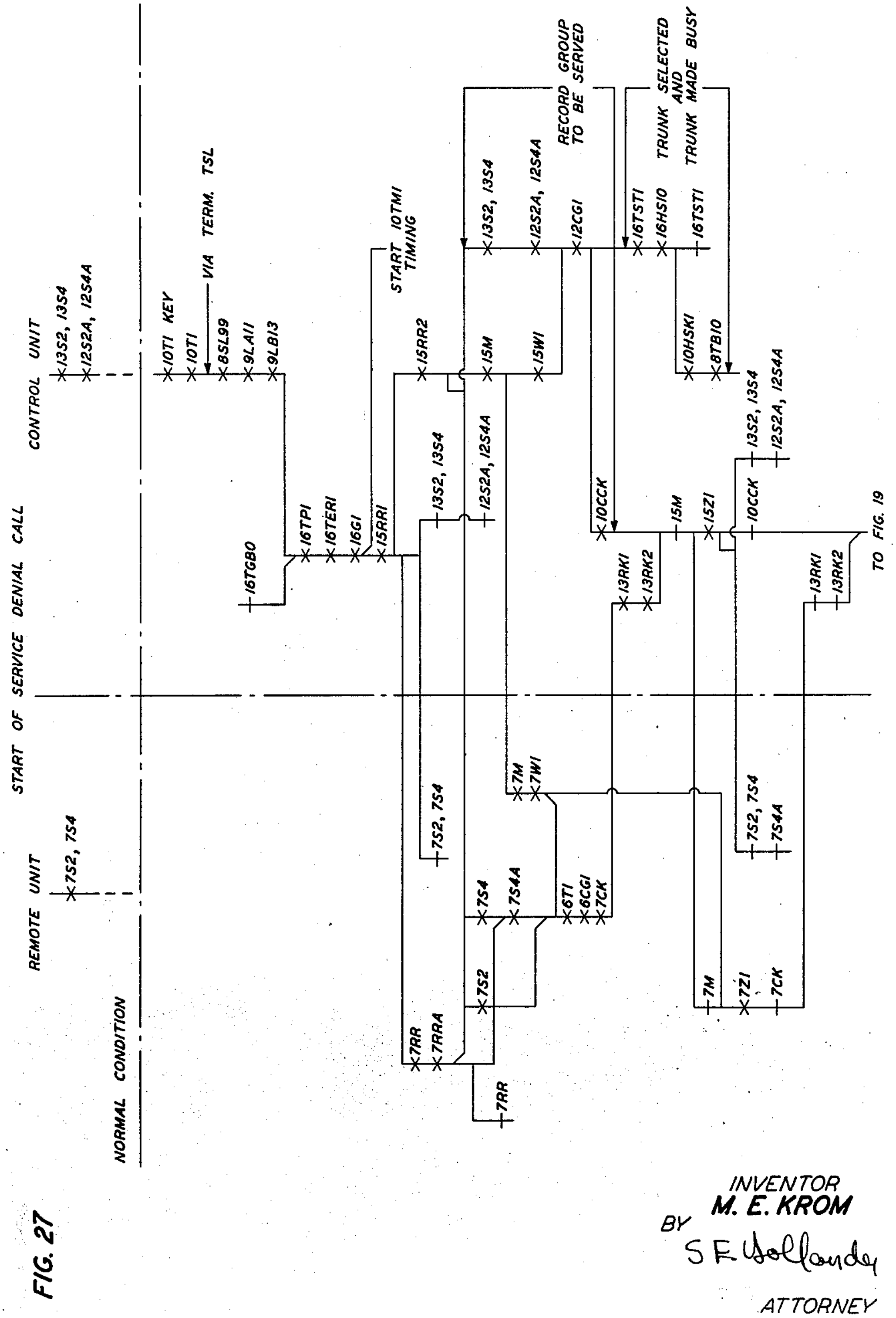
Figure 28:
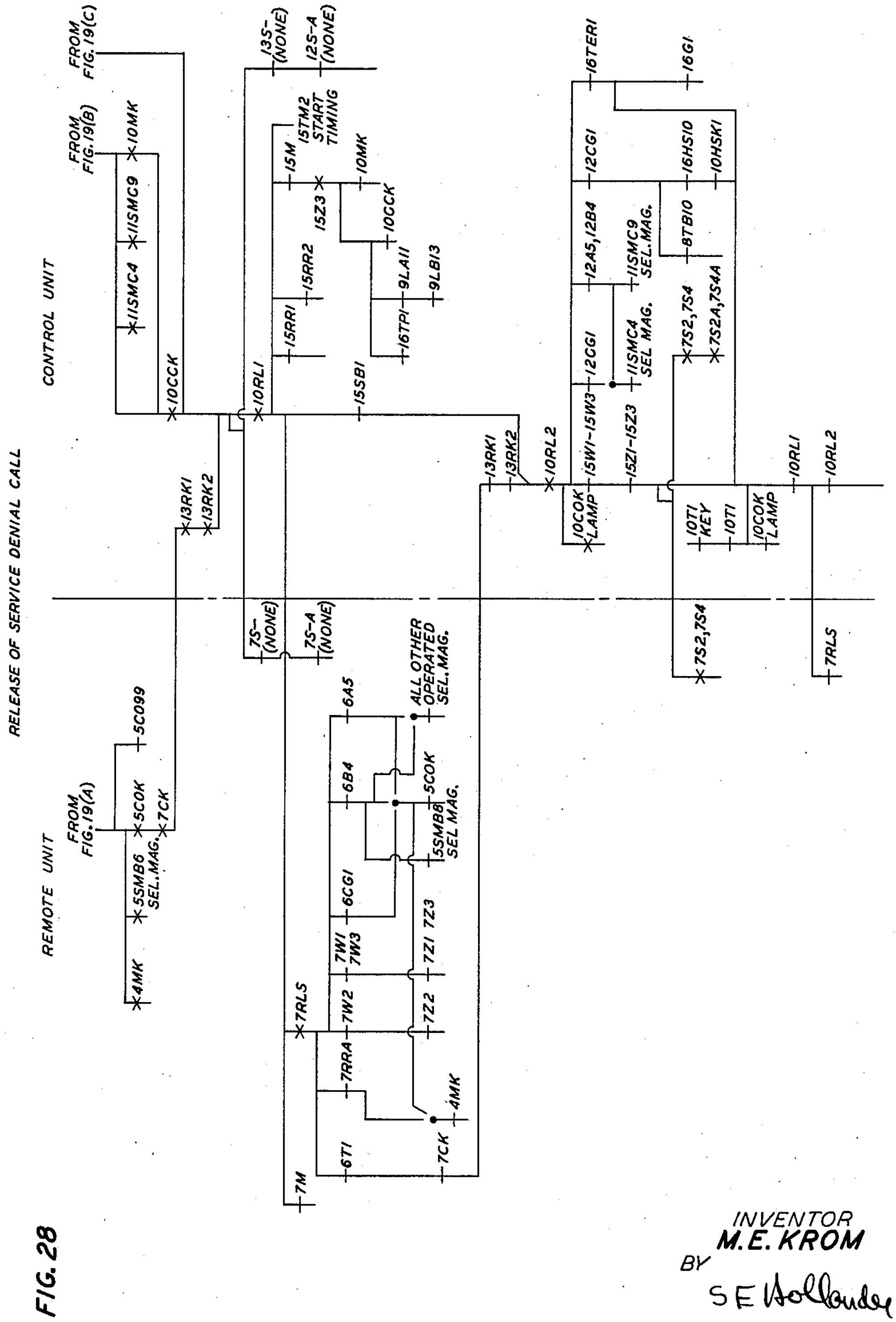
Figure 30:
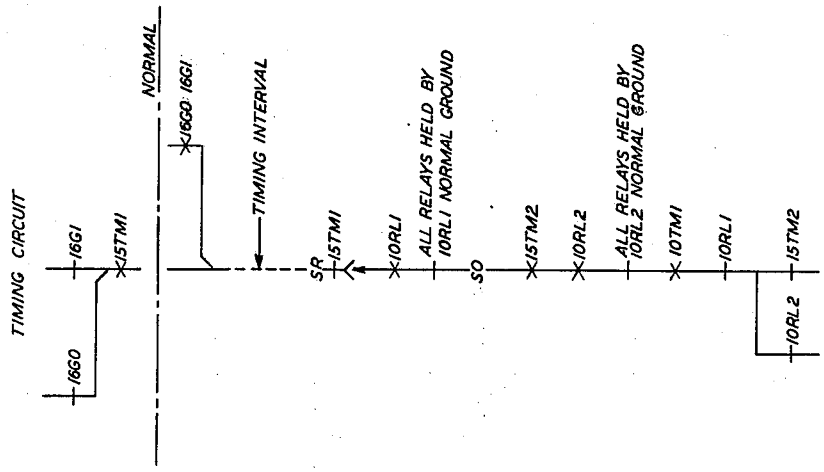
Figure 29:
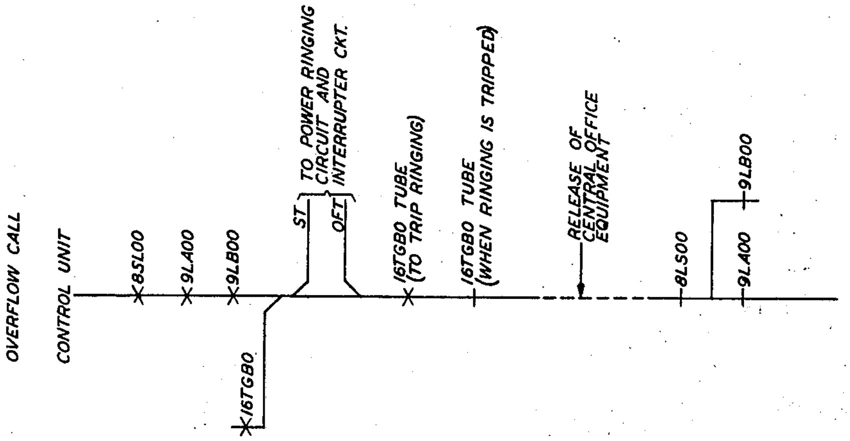

FIG. 3 includes the line lockout and identification circuits at the remote location;

FIG. 4 indicates the checking circuit at the remote location;

FIG. 5 includes the cut-off relays and the select and hold magnets for the crossbar network at the remote location;

FIG. 6 shows the remote unit register circuit;

FIG. 7 includes the remote unit sequence control circuit and the remote unit signal circuit;

FIG. 8 includes the crossbar network at the control unit;

FIG. 9 shows the identification and lockout relays at the central office control unit;

FIG. 10 indicates the checking circuit at the central office;

FIG. 11 shows the cut-off relays and the select magnets for the crossbar network at the control unit;

FIG. 12 includes the register circuit at the control unit;

FIG. 13 shows the signal circuit at the control unit;

FIG. 14 includes the hold magnets associated with the crossbar network at the control unit;

FIG. 15 includes the master signal control circuit and the trunk load control circuit and the sequence control circuit at the control unit;

FIG. 16 includes the preference control circuit at the remote unit;

FIG. 17 shows the disposition of FIGS. 2–16 to disclose the illustrative embodiment of the instant invention;

FIGS. 18 through 30 show the sequence charts for relay operation on the various types of calls;

FIG. 31 shows Table 1 which includes the relationship between the line lockout relays and the register relays at the remote unit;

FIG. 32 shows Table 2 which includes the relationship between the line lockout relays and the register relays at the control unit; and FIG. 33 shows Table 3 which includes the relationship between the signal relays and line lockout relays.

For facilitating clarity of presentation the following General Description and Detailed Description have been arranged to first generally describe the apparatus and operation and to subsequently describe the operation in detail as follows:

INDEX

I. General Description
- IA. General Description of Major Components
  - IA–1. Crosspoint Networks
  - IA–2. Register Circuits
  - IA–3. Sequence Control Circuits
  - IA–4. Signaling Circuits
  - IA–5. Master Signal Control Circuit
  - IA–6. Preference Control Circuit
  - IA–7. Line Lockout and Line and Cut-Off Circuits
  - IA–8. Trunk Selection
  - IA–9. Checking Circuits
  - IA–10. Disconnect Control
- IB. General Description of Operation
  - IB–1. General Description of Signaling Sequence
  - IB–2. Service Request Call
    - IB–2*a*. Registration of Group Information
    - IB–2*b*. Registration of "B" Information
    - IB–2*c*. Registration of "A" Information
    - IB–2*d*. Registration and Transmission of Trunk Information
    - IB–2*e*. Closure of Channel Through Networks
  - IB–3. Terminating Call
  - IB–4. Disconnecting an Established Connection
  - IB–5. Release of Concentrator Circuit
  - IB–6. Signal Circuit Monitoring Facility
  - IB–7. Trunk Overflow
  - IB–8. Service Denial
  - IB–9. Alarms II. Detailed Description
- IIA. Detailed Description of Originating Call
  - IIA–1. Seizure of the Control Circuit IIA–2. Signal Relays—Group Information
IIA–3. Seizure of the Preference Control Circuit
IIA–4. Remote Unit—Group Information Registration
IIA–5. Control Unit—Group Information Registration
IIA–6. Trunk Selection
IIA–7. Remote Unit—"B" Information
IIA–8. Control Unit—"B" Information Registration
IIA–9. Remote Unit—"B" Information Registration
IIA–10. "A" Information
IIA–11. Registration of "A" Information at the Remote Unit
IIA–12. Registration of "A" Information at the Control Unit
IIA–13. Match Check Operation
IIA–14. Steering Level Select Magnet Operation
IIA–15. Transmitting Trunk Information
IIA–16. Selection of Trunk 09 or 19
IIA–17. Release of Line Relay at Remote Unit
IIA–18. Hold Magnet Check at Remote Unit
IIA–19. Release of Control and Remote Units
IIB. Detailed Description of Terminating Call
IIB–1. Seizure of Control Circuit
IIB–2. Registration of Group Information at the Control Unit
IIB–3. Trunk Selection at Control Unit
IIC. Disconnect Call
IIC–1. Trunk Hold Control
IIC–2. Identification of Line On Disconnect Call
IIC–3. Transmitting Group and Class of Call Information
IIC–4. Registration of "B" and "A" Information
IIC–5. Release
IIC–6. Timing Circuit 10TM3
IID. Service Denial Call
IID–1. Seizure of Control Unit
IID–2. Release of a Service Denial Call
IIE. Preference Control
IIF. Alarm Circuit
IIG. Line Lockout Circuit Operation on Simultaneous Calls
IIH. Trunk Overflow Indication Appropriate reference may be made to the sequence charts to facilitate comprehension of the detailed description.

I. GENERAL DESCRIPTION

IA. *General description of major components*

Figure 1:
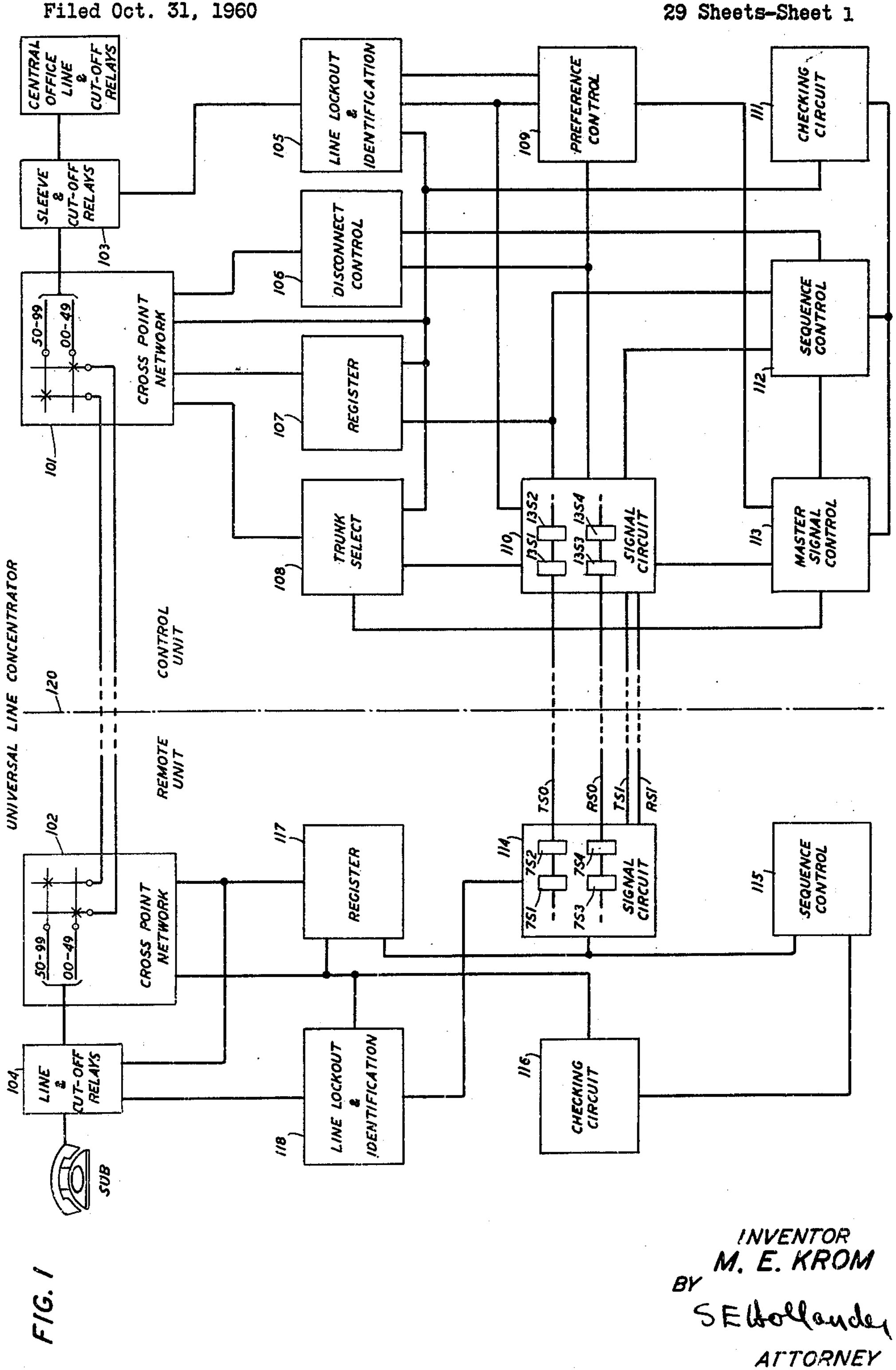
FIG. 1 shows a block diagram of the major components at the remote and central office locations.
Figure 2:
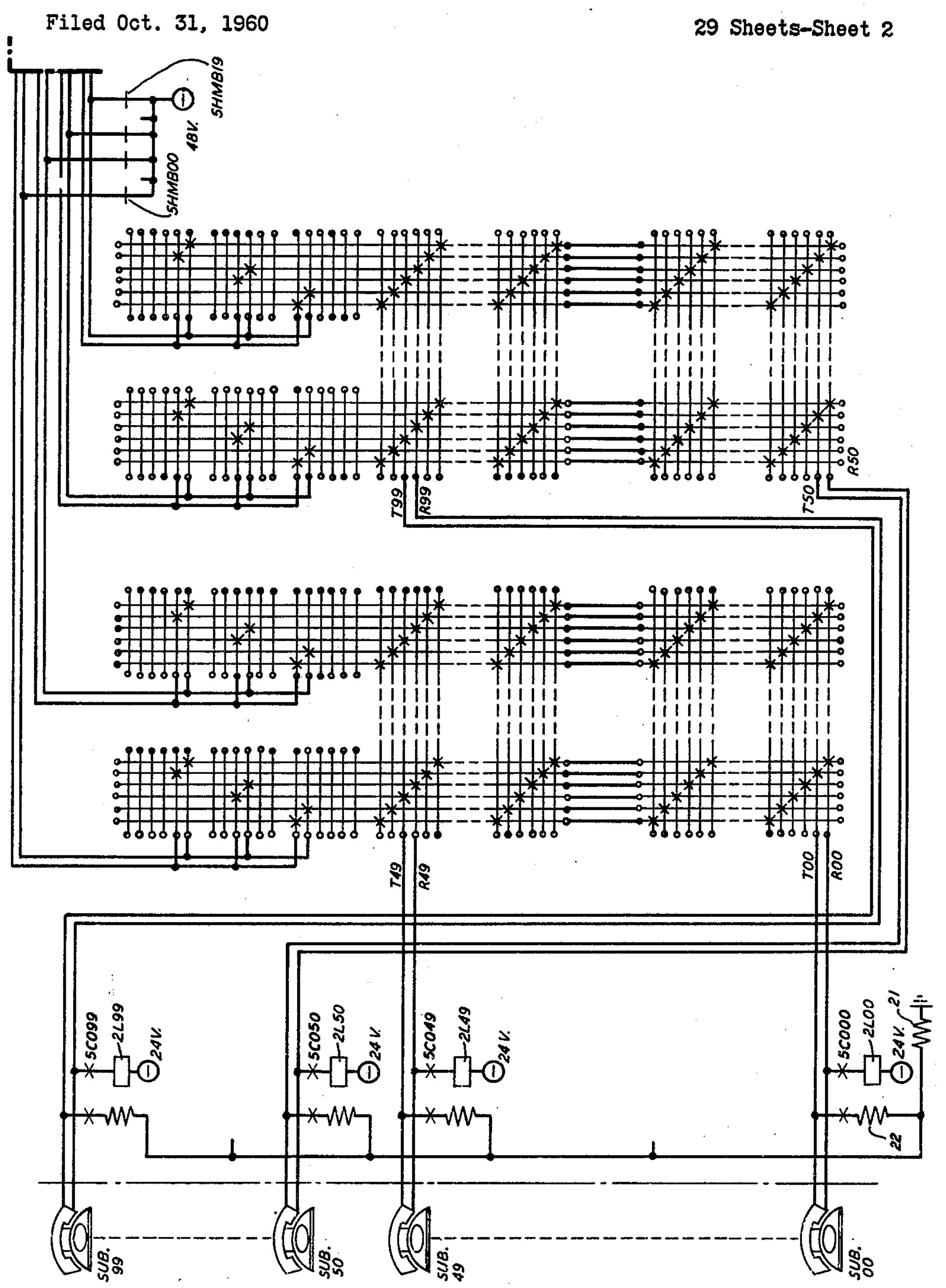
FIG. 2 shows the crossbar network at the remote location.

As indicated in FIG. 1 the control unit is located at the central office and is coupled to the remote unit by twenty speech trunks and two signal pairs. It is apparent from FIG. 1 that all of the components to the left of line 120 are remotely located and all equipment to the right is located at the central office.

IA–1. CROSSPOINT NETWORKS

A crosspoint network 102 is utilized at the remote unit to associate lines and trunks and includes four six-wire crossbar switches having three lines per crosspoint. Lines appear on the switch horizontals and trunks on the verticals. Two steering levels (not shown in FIG. 1, but shown in detail in FIG. 8) serve to select one of the two lines in a crosspoint. The lines are divided into two groups of 49 lines each, with each group having full access to an individual group (0 or 1) of ten trunks. A similar network 101 at the central office includes three six-wire switches having two lines per crosspoint.

The hold magnets utilized in both units are of the magnetic latching type in order to reduce power consumption. Reference may be made to an article entitled "Magnetic Latching Crossbar Switches," Bell System Technical Journal September 1960, p. 135, for a description of suitable apparatus.

IA–2. REGISTER CIRCUITS

A register circuit at the control unit includes groups of relays adapted to register the line group (0 or 1) and connect or disconnect indications. The register also stores the "B" part of the line number, the "A" part of the line number and the trunk number.

These registrations are stored in corresponding groups of relays in the register circuit 107 of the control unit shown in detail at FIG. 12.

Similar registration facilities are available in the register circuit 117 of the remote unit, the latter being shown in detail at FIG. 6.

IA–3. SEQUENCE CONTROL CIRCUITS

Groups of "W–Z" relays are utilized in a manner analogous of that of a program arrangement for dictating the order of operation of particular signal functions. Physically the sequence control 112 at the control unit comprises three groups of W–Z relay combinations adapted to be sequentially operated in the order W1, Z1, W2, Z2, etc. Operation of these relays modifies contact paths in the signaling and other circuits to permit gradual progression of the control unit and remote unit through the various steps necessary to complete a connection or disconnection.

The sequence control circuit 115 at the remote unit is completely analogous to that described for the control unit 112. Both are shown in detail at FIGS. 7 and 15, respectively.

IA–4. SIGNALING CIRCUITS

A signal circuit 110 at the control unit includes two pairs of sensitive and marginal relays 13S1–13S4. The sensitive relays are operated when a minimum current is supplied to the signal circuit but the marginal relays are designed to present a sufficient threshold or margin before operating to insure that a current flow greater than that merely necessary to operate the sensitive relay has been supplied. The signal circuit for the control unit is shown in detail at FIG. 13. Similar facilities are available for the remote unit 115. In fact, the remote unit is fully complementary to the control unit signaling circuit and also includes two pairs of sensitive and marginal relays 7S1–7S4.

Thus a sensitive and marginal relay at the control unit is adapted to operate in conjunction with acomplementary sensitive and marginal relay at the remote unit. The four relays are coupled by a single conductor and are adapted for bidirectional operation. Thus the signals may originate at the control unit signal circuit 110 in the case of a terminating call to convey information to the remote unit signal circuit 114 relating to the called line. The same combinations of relays at the remote and control units are operated in view of the serial arrangement of the operating winding, e.g., 7S1, 7S3, 13S1 and 13S3.

Alternatively on an originating call the signals may emanate from the remote unit 114 to forward information relating to the identity of the calling line to the signal circuit 110. Again the same relay combinations would be operated.

Thus both signal circuits may be operated simultaneously under control of either unit. After the signal relays are operated the information stored thereon is delivered to the register circuits 107 and 117 as discussed above.

IA–5. MASTER SIGNAL CONTROL CIRCUIT

To prevent competition between the remote unit and the control unit on simultaneous originating and terminating calls and to preclude mutual lockout between the two units on such calls when both units are attempting to initiate signaling concurrently a master signal control circuit 113 shown in detail at FIG. 15 dictates the order in which the signal circuits of the two units may operate.

IA–6. PREFERENCE CONTROL CIRCUIT

Equipment having a related function is shown generally as the preference control circuit 109 and in detail in FIG. 16. In the event of simultaneous calls the preference circuit, which includes a number of relay chains, selects the type of call to be served and locks out other calls until the preferred call has been served. The preference circuit in addition indicates the line group number (0 or 1). The types of calls among which preference control selects include (1) service request or dial tone, (2) terminating calls, and (3) disconnect calls.

IA–7. LINE LOCKOUT AND LINE AND CUT-OFF CIRCUITS

These circuits are shown generally at 103 and 105 for the control circuit and 104 and 118 for the remote unit. The line and cut-off relays in circuit 104 are used to recognize service requests and to disconnect the line relay circuit when the line is connected through the concentrator to the central office equipment. The line and cut-off relays for the remote unit are shown in detail at FIGS. 2 and 5, respectively, and are both of the magnetically latching type to insure that they will be held in the desired condition indefinitely without additional power drain.

Identification of a calling line on a service request call is obtained at the remote unit through two separate lockout chains in circuit 118 under control of the line relay in circuit 104. A first chain identifies one of twelve groups. The second chain selects one of nine lines within the groups. Resistors in series with the relays in the second chain preclude the possibility of obtaining an ambiguous number due to simultaneous requests on a plurality of lines as will be explained in detail herein.

At the control unit identification circuit 105, a terminating call is recognized by a change in the sleeve condition in the central office which operates a sleeve relay in equipment 103 shown in detail at FIG. 8. The latter relay is individual to the line and initiates identification of the call through two lockout chains in unit 105 in a manner analogous to those discussed for the remote unit. In addition, a cut-off relay in circuit 103 shown in detail at FIG. 11, is used in the control unit to disconnect the sleeve relay while the line is cut through the concentrator. The cut-off relay at the control unit is also magnetically latching. As a result of the operation of the cut-off relays at the remote unit and at the control unit the line is provided with a "clean" tip and ring when cut through, i.e., there are no bridging or shunting connections on the line. It will be noted that the line terminations at the circuit 103 are individually extended to the line and cut-off relays 123 in the central office. The latter relays represent the conventional line circuits in the central office.

IA–8. TRUNK SELECTION

A selection circuit 108 shown in detail at FIG. 16 determines which idle trunk is to be selected. The circuit includes a plurality of relays individual to the trunks and is arranged in a chain. The selection circuit 108 is used both for selection of a trunk for connection and for disconnection as explained in detail herein.

IA–9. CHECKING CIRCUITS

Comprehensive checking arrangements to insure the validity of operation of the remote and control units are shown in outline at circuits 116 and 111, respectively, and in further detail at FIGS. 4 and 10, respectively.

Various types of checks are performed sequentially during the operation of the concentrator and include the checking of registration of one and only one unit of information for the group "A" identification, "B" identification, etc. Checks are also undertaken to insure that only valid identifications have been established in the event of simultaneous calls. Moreover, a check is undertaken to insure that the information in the register circuits 117, 107 accurately reflects the information which appeared on the signal relays in signal circuits 114 and 110.

Still further checking operations are undertaken to ascertain that the correct hold magnets and trunk relays, etc., are operated.

IA–10. DISCONNECT CONTROL

A disconnect control circuit 106 shown in detail at FIG. 16 insures that a minimum of eight lines will always be cut through to the central office. The disconnect circuit is disabled when four or less lines per group are cut through to trunk circuits. As a result of this feature the lines will remain cut through even though not in use if fewer than four lines in the group are cut through.

IB. *General description of operation*

For facility, in comprehending the detailed description which follows herein, a brief description of each major type of operation omitting detail and emphasizing substance follows.

IB–1. GENERAL DESCRIPTION OF SIGNALING SEQUENCE

As indicated above, the signaling arrangement is ternary in form. The two combinations of sensitive and marginal relays and the application of the three current levels to the signal conductors yield a total of nine individual signals for transmitting the digital information.

The direction of transmission of the signal information is related to the type of call being serviced. Manifestly, in the case of an originating call at the remote unit—a service request call—the information regarding the calling subscriber's line is available at the remote unit. As a result, the direction of transmission of the information regarding the line identification is from the remote unit to the control unit. Alternatively, in the event of a terminating call, the information designating called lines emanates from the control unit at the central office.

In the case of an originating call, the signal relays are operated in accordance with the information stored in the line lockout circuit 118 which in turn is responsive to the operation of the line relays in circuit 104. Since the signal relays are bidirectional in operation, signal circuits 110 and 114 are energized simultaneously to reflect the appropiate information. As indicated above, this information is then stored in the corresponding register circuits 117 and 107.

In the case of a terminating call the information respecting the called line derives from relay combinations in the line lockout circuit 105 which in turn is responsive to the operation of a particular sleeve relay. Again, signal circuits 110 and 114 are energized simultaneously and the information is ultimately stored in the registers 107 and 117. However, it is apparent that in this instance the information is transmitted in a direction from the control unit to the remote unit.

In either event, however, the information is transmitted sequentially in the following order:

| Digit No.: | Information |
|---|---|
| 1st | Line group (0 or 1) and connect or disconnect indication. |
| 2nd | "B" part of line number (one of 9 combinations). |
| 3rd | "A" part of line number (one of 6 combinations). |
| 4th | Trunk number (one of 9 combinations). |

Although the two groups of signal relays at both ends of conductors TSO and RSO are symmetrical and bidirectional in operation, as indicated above, they are capable collectively of furnishing only nine digit indications. Since twenty trunks are used in two groups of ten trunks each, it is apparent that a separate signal must be rendered to indicate the tenth trunk. This information is transmitted over the second signal pair TS1 and RS1.

Moreover, the second signal pair is utilized for a number of additional signaling functions including advancing the sequence control at both units, checking indications and concentrator release indications.

IB–2. SERVICE REQUEST CALL

When a call is originated, a line relay in circuit 104 individual to the calling substation is operated and in turn results in the operation of two unique identifying relays in the line lockout circuit 118 as discussed above. Operation of the latter identification relays supplies a low resistance ground connection to signal lead TSO if the call is in group "0" or to signal lead RSO if the call is in group "1." This indicates to the control circuit that a service request is present and identifies the group (lines 0–49 are in group "0," 50–99 in group "1") by operating a relay in the preference control circuit 109. When the service request call obtains preference the control unit operates a relay in the master signal control circuit 113 to initiate a mark signal and to operate a similar relay in the remote unit. This results in the operation of specific signal relays (7S1–7S4 and 13S1–13S4) at both the remote unit and the control unit to reflect the particular group in which the calling line is located and also the class of call to be served. Thus the signal relays in the signal circuits 114 and 110 are simultaneously operated in accordance with a particular code arrangement given in detail herein and if the calling line is illustratively assumed to be line 99 the call will be in group "1."

IB–2*a*. *Registration of group information.*—After the operation of the signal relays, the register relays in registers 107 and 117 are operated in accordance with the information stored in the signal relays. Thus the group number has been stored in the register circuits 117 and 107 of the remote and control units.

When the registration has been completed and checked, the checking circuits 116 and 111 release the mark and signal relays and by means of W–Z relay combinations, as described above, the sequence control circuits 115 and 112 in the remote and control units are simultaneously advanced.

IB–2*b*. *Registration of "B" information.*—When the sequence control relays have operated and the check relays have released, the signal circuits 110 and 114 are again energized. This time they are operated in response to the particular relay in the line lockout circuit 118 which indicates the "B" portion of the line number. As before, the signal relays are operated in unique combinations simultaneously to store and transmit the "B" portion of the line number under control of the line lockout circuit 118. Again, this information is registered in registers 117 and 107 simultaneously and checked by the checking circuits 116 and 111.

When the information has been checked, the sequence control circuits are again stepped in a manner similar to that described above to prepare for transmitting the "A" portion of the line number. The signal circuits are reactivated under control of the relays in the line lockout circuit 118 indicative of the "A" portion of the line number. The signal relays 7S1–7S4 and 13S1–13S4 are once more operated in a code arrangement which reflects the "A" information.

IB–2*c*. *Registration of "A" information.*—Register circuits 107 and 117 are simultaneously loaded with the indications stored in the signal relays of circuits 110 and 114. When the "A" information has been completely registered and checked by checking circuit 116 and 111, the mark signal is again removed and the sequence control circuits 112 and 115 are advanced to the next and last position by the operation of the final group of "Z" relays.

Thus far the information transmission has been in a direction from the remote unit to the control unit to indicate the identity of the calling line. Since the last item of information to be transmitted relates to the trunk selection and since this information must emanate from the control unit, a direct ground potential is now applied to the signal relays in the remote circuit 114 to place the signal circuits 110, 114 under control of the trunk selection relays of circuit 108 to transmit to and register the trunk number in the remote unit. Thus the signal relays are again operated, this time in a direction from the control unit and in response to the trunk selection circuit 108, in a unique code which indicates the selected trunk.

IB–2*d*. *Registration and transmission of trunk information.*—Trunk numbers between 0 and 8 are registered directly on the register relays. However, since only nine codes are available a special signal is required when trunk "9" is to be used. This signal is a preliminary signal which precedes the trunk signal and causes operation of a transfer relay in the register circuits 117, 107, to convert a trunk "0" indication into a trunk "9" indication thus providing for the selection of trunk "0" or trunk "9" from the trunk "0" code. This process will be explained in further detail herein.

Registration of the "A" information as described above, without more, signifies completion of transmission and registration of the line information and prepares paths for operating appropriate select magnets in the crossbar networks 101, 102. Also a matching circuit is completed in the remote unit for verifying that the information stored in the register 117 is the same as the information recorded in the line lockout circuit 118. This match check is performed in circuit 116 and a mismatch prevents further progress of the call.

Before transmitting information relating to the trunk number from the control unit to the remote unit, the control circuit initiates a connection of the selected trunk to the proper line terminals in the central office and releases the cut-off relay at the control unit. This is a useful arrangement—i.e., first establishing the central office end of the connection—since it provides a record in the central office of the attempt to complete a connection at the remote unit and to provide a means for disconnecting in the event of failure to complete.

When the group and line registrations and the select magnet operation have been checked in the checking circuits 116 and 111 a circuit is completed for releasing the cut-off relay. Again this operation is individually checked and if the attempt to release the cut-off relay is successful the hold magnets are operated at the control unit in network 101 and also checked. Subsequently the trunk number is transmitted to the remote unit by appropriate operation of the signal relays and the trunk information is registered simultaneously in both registers 107 and 117.

IB–2*e*. *Closure of channel through networks.*—When the trunk information has been recorded and the appropriate matching operations have been completed in the checking circuits 116 and 111 and additional checks have been made that only one relay in each register stage is operated and also that the select magnets in the network 102 at the remote unit have operated, a circuit is completed for releasing the cut-off relay at the line and cut-off circuit 104 and for operating the trunk hold magnets in the remote unit network 102. Again the operation is checked at the remote unit in circuit 116 and a signal is transmitted to the control unit indicating a successful completion of the connection in the remote unit. This completes the process of setting up the call and causes the control unit and the remote unit to prepare for release. When the release of both units is accomplished the line is connected to the trunk at both units through magnetically latched hold magnets. The only other relays which remain operated are the cut-off relays in both units which are also magnetically latched. Ultimately a "clean" tip and ring connection is available through the concentrator.

IB–3. TERMINATING CALL

The terminating call emanates from the central office and is directed to the called party initially by the operation of the sleeve relay individual to the line of the called party in the control unit.

Cross-connections from the sleeve relay to lockout chains in circuit 105 identify the line group and the particular line within the group. When the terminating call obtains preference from circuit 109, lockout is achieved in the preference control circuit 109 to serve a terminating call.

Significantly, a signal is transmitted to the remote unit which operates certain release relays in the line lockout circuit 118 while a terminating call is in progress to disable the line lockout circuit. This action prevents competition by the line lockout circuit 118 at the remote unit (which may in the interim attempt to operate to identify an originating calling line) and the line lockout relays in circuit 105 of the control unit. In addition, a direct ground is applied at the remote signal unit 114 to the signal leads to prepare the remote circuit to receive signals from the control circuit in the central office.

Subsequently the sequence of operations is generally similar to that described above for a service request call, with the exception, in this instance, that the signals indicating line numbers all originate at the control unit.

Thus the W–Z relays in the sequence control circuit will govern the signaling facilities to transmit the group number, the "B" part of the line number, the "A" part of the line number, and the trunk number. Also as discussed above, the signal relays will in each instance be operated in accordance with a unique code which defines the information to be transmitted and the register circuits 107 and 117 will operate as before to register the appropriate information which is then checked by circuits 116 and 111. Here again, when all information is complete the crosspoint networks 102 and 101 are operated to complete the connection.

IB–4. DISCONNECTING AN ESTABLISHED CONNECTION

Trunks are released in the preference control circuit 109, shown in detail in FIG. 16, in order of preference when unoccupied, provided that five or more in the group are cut through. However, only as many trunks will be released as is required to leave four in a group to remain in the cut-through condition. In short, this type of operation includes a facility which "delays" disconnecting the subscriber's line from the trunk used in the connection if fewer than four trunks are cut through.

A disconnect request for an individual trunk is initiated, if the trunk hold magnet is operated (indicating that the line is still cut through), that the trunk busy relay is normal (indicating that the line is idle) and that the trunk load control relay, not shown in circuit 106 but shown in detail in FIG. 15, is operated (indicating that more than four or more hold magnets are operated). Under these circumstances appropriate relays are operated in the disconnect control circuit 106 (explained further herein) which will ultimately open the circuits of all sleeve relays toward the central office and connect them to the associated control circuit sleeve leads to prepare for identifying the line to which the trunk is connected. In addition, the trunk selection circuit 108 selects one of the trunks to be disconnected.

It is interesting at this juncture to briefly examine why the line identification is required. This is necessary in view of the fact that merely releasing the hold magnets in the crossbar networks 101 and 102 will not release the magnetically latched cut-off relay unique to the subscriber's line in the line and cut-off circuit 104. Since there is no centralized memory in the central office which can be resorted to for determination of which lines are connected to which trunks, an entirely separate identification procedure to ascertain which line has been connected to the trunk to be disconnected is necessary. Additional details regarding this disconnect identification procedure follow herein.

After selecting a trunk to be disconnected the trunk selection circuit 108 grounds the trunk sleeve thereby operating the sleeve relay of the line to which the trunk is connected. When the sleeve relay is operated the line is then identified by operation of the associated lockout relays in circuit 105 in the manner described above for a terminating call (which incidentally is also similar to that described above for an originating call).

Prior to transmission of any line or trunk information to the remote unit a preliminary pulse is directed over one of the signaling leads to prepare the remote unit for receiving information from the control unit. Essentially this relates to the provision of a direct ground connection to the signal relays at the remote unit. Subsequently the line and trunk number together with a disconnect indication are transmitted to the remote unit in a manner similar to that of a terminating call. The disconnect indication causes a reversal of polarity in the voltage applied to the cut-off relay in circuit 104 and to the trunk hold magnet in networks 102 and 101. This reversal produces a magnetic field in opposition to the field holding the apparatus in the operated position (released for the cut-off relay) thereby causing the release of the operated hold magnet and operation of the cut-off relay.

In releasing the connection on a disconnect call the remote circuit end of the established connection is released and checked before the control circuit end. This arrangement serves to keep the trunk "busy" in the event that trouble prevents its release. Moreover, leaving the control unit end of the connection established provides a record of the line to trunk connection and permits repeated attempts thereafter to disestablish the connection.

IB–5. RELEASE OF CONCENTRATOR CIRCUIT

When the checking circuits 111 and 116 indicate that the desired functions have been performed at both ends of the connection, a release relay is operated at the control unit and transmits a release signal to the remote unit. When the control relays in the remote unit have released, a second release relay is operated in the control unit which prevents any other calls from being originated until all relays in the control unit have been released.

IB–6. SIGNAL CIRCUIT MONITORING FACILITY

At the initiation of each call, the two sensitive relays 7S2, 7S4, 13S2, 13S4 must be operated. This insures continuity of the signal circuit leads over which a service request can originate.

IB–7. TRUNK OVERFLOW

When all trunks available to a particular line group are busy, all service requests in that group are canceled and determining calls receive an overflow signal. This feature will be explained in further detail herein.

IB–8. SERVICE DENIAL

A particularly advantageous faculty of the instant invention includes a provision for preventing a line which has a permanent condition thereon, i.e., receiver off-hook, tip to ring short, etc., from holding a trunk out of service to working lines. In the following description this type of arrangement is designated as a "service denial" call or "lockout" operation. When a service denial call is made, the remote unit cut-off relay associated with the line in trouble is operated thereby denying service and completely isolating the line from the concentrator. The desirable feature here is that the entire operation may be controlled from the central office. A line thus disabled may be fully restored to service also from the central office by placing a terminating call to the line.

IB–9. ALARMS

An over-all timer of approximately one second provides an alarm if for any reason a call is not completed within this time. This alarm indicates within defined limits whether the trouble is in the control unit, the remote unit, or the signal circuit.

Another timer is actuated when a disconnect call is made. This latter timer prevents another disconnect call from starting for approximately six seconds.

Having now considered the major components of the concentrator embodiment and the various operative functions in general outlined, the concentrator system apparatus and its varied operations will now be considered in depth.

II. DETAILED DESCRIPTION

IIA. *Detailed description of originating call*

Reference may be made appropriately to the sequence charts as an aid in following the detailed circuit operation. In the idle condition of the control unit, relays 13S2 and 13S4 are operated. As a result of the operation of these relays, relays 12S2A and 12S4A are operated over obvious circuits. The corresponding relays 7S2 and 7S4 are likewise operated. For example, in the case of relay 13S2, a path may be traced from negative battery, resistance 151, contacts of relays 13RK2, 15Z1, 15RR1, 16DIS04, 16G1, 15Z1, winding of relay 13S2, winding of relay 13S1, conductor TSO, winding of relay 7S2, winding of relay 7S1, contacts of relay 7Z1, resistance 71 to ground. Although current traverses relays 7S1 and 13S1 these relays do not operate in view of the marginal threshold included in their design which precludes their operation when resistance 71 is in series with the operating path.

A similar circuit may be traced for relay 13S4 from negative battery, resistance 151, contacts of relays 13RK2, 15Z1, 15RR1, 16DIS14, 10T1, 16G0, 15Z1, winding of relay 13S4, winding of relay 13S3, conductor RSO, winding of relay 7S4, winding of relay 7S3, contacts of relay 7Z1, resistance 72 to ground.

IIA-1. SEIZURE OF THE CONTROL CIRCUIT

When a service request is made at the remote unit the resistance ground on conductor TSO or RSO is changed to a direct ground connection. More specifically, when a customer, illustratively the customer assigned to substation 99, lifts his receiver an appropriate line relay 2L99 is operated over the loop, the switchhook contacts, not shown, and the closed contacts of the corresponding cut-off relay 5C099. Thereafter, line identification relays unique to the calling line and specifically relays 3LA11 and 3LB04 will be operated to identify the calling substation line.

The operating path for relay 3LA11 may be traced from ground, contacts of relay 2L99, winding of relay 3LA11, contacts of relays 3LA10, 3LA06, 3LA05, 3LA04, 3LA00, 4MK, 7RRA, resistance 31 to negative battery.

In accordance with the lockout features hereinafter described in further detail, relay 3LB04 does not operate until a path can be traced over the contacts of operated relay 3LA11. This path includes ground, contacts of relay 3LA11, resistance 35, contacts of relay 2L99, winding of relay 3LB04, contacts of relay 3LB04, contacts of relays 3LB08, 3LB04, 3LB00, resistance 33 to negative battery.

Relays 3LA11 and 3LB04 lock operated over their own contacts, for example in the case of relay 3LB04, over the contacts of relays 3LB04, 3LB00, resistance 33 to negative battery.

IIA-2. SIGNAL RELAYS—GROUP INFORMATION

Operation of relay 3LA11 causes operation of appropriate signal relays, specifically relay 7S3, and corresponding control unit relay 13S3. Auxiliary relays 7S3A and 12S3A are then operated over obvious paths.

More specifically, as a result of the operation of relay 3LA11, relay 7S3 is operated over a path which may be traced from ground, contacts of relays 3LA11, 7Z1, windings of relays 7S3, 7S4, conductor RSO, windings of relays 13S3, 13S4, contacts of relays 15Z1, 16G0, 10T1, 16DIS14, 15RR1, 15Z1, 13RK2, resistance 151 to negative battery.

IIA-3.—SEIZURE OF THE PREFERENCE CONTROL CIRCUIT

As explained previously on the origination of a call at station 2L99, the resistance ground on lead RSO through resistance 72 was changed to a solid ground at the contacts of relay 3LA11 and relays 7S3 and 13S3 were operated.

Assuming that relays 15RR1 and 16TGB1 are normal, relay 12S3A will close an operating path for relay 16SRP1 to indicate a service request call in group "1." An operating path may be traced from negative battery, resistance 162, contacts of relays 15Z1, 15RR1, 16TGB1, 12S3A, winding of relay 16SRP1, contacts of relays 16SRP0, 16DP1, 16DP0 to ground. This action identifies the calling line as being in group "1."

Operation of relay 16SRP1 closes a locking path for itself over its own contacts and also closes an operating path for relay 16SR1 which may be traced to ground, contacts of relays 10RL2, 15Z1, 16TP1, 16TP0, 16SRP1, winding of relay 16SR1 to negative battery.

Operation of relay 16SR1 causes the operation of group relay 16G1 over an obvious path. Operation of relay 16G1 closes an operating path for relay 15M over a path from ground, contacts of relays 16G0, 16G1, 10RL1, 13RK2, 15Z1, 16SR1, winding of relay 15M to negative battery. Operation of relay 15M at the control unit results in the operation of relay 7M at the remote unit over a path including ground, contacts of relays 15M, 10RL1, resistance TS1, conductor TS1, winding of relay 7M, winding of relay 7RLS to negative battery.

IIA-4. REMOTE UNIT—GROUP INFORMATION REGISTRATION

As explained above, relay 7M is operated over the signal lead TS1 and in turn results in the operation of relay 7W1 over a path from ground, contacts of relays 7RLS, 7M, 7Z1, 7W1, winding of relay 7W1 to negative battery. Relay 7Z1 locks operated over its own contacts. Relay 6CG1 in the register circuit now operates over a path which may be traced from negative battery, winding of relay 6CG1, contacts of relays 7Z1, 7S3A, 7S2, 7S1A, 7CK, 7Z1, 7W1, conductor 601, contacts of relays 7M, 7RLS to ground. Operation of relay 6CG1 results in the operation of relay 7CK over a path from ground, winding of relay 7CK, contacts of relays 6CG1, 7Z1, 7W1, resistance 71 to negative battery. Operation of relay 7CK opens the register circuit of FIG. 6 so that no false registration may occur, by opening the contacts of relay 7CK in FIG. 6.

Battery potential is now applied to signal lead RS1 over a path from negative battery, resistance 73, contacts of relay 7CK, diode CK to conductor RS1 to indicate that group registration of group "1" has been registered and completed in the remote unit.

IIA-5. CONTROL UNIT—GROUP INFORMATION REGISTRATION

Operation of relay 15M at the control unit causes the operation of relay 15W1 over a path which may be traced from ground, contacts of relays 15M, 15Z1, 15W1, winding of relay 15W1 to negative battery. Relay 15W1 locks operated over its own contacts.

Operation of the latter relay causes the group registration (group "1") in the register circuit at the control unit (FIG. 12) by the operation of relay 12CG1 over a path from negative battery, winding of relay 12CG1, contacts of relays 15Z1, 12S3A, 12S2A, 12S1A, 15M, 13RK2, 15Z1, 15W1 to ground. Relay 10CCK now operates over a path from ground, winding of relay 10CCK, contacts of relays 15Z1, 16DIS16, 12CG1, 12CG0, 12DIS06, 15W1, resistance 101 to negative battery. Operation of relay 12CG1 causes the operation of relay 16TST1 over a path from ground, winding of relay 16TST1, contacts of relay 16HS19, contacts of relays 16HS10, 12CG1, resistance 161 to negative battery.

Operation of relay 12CG1 also partially closes an operating path for relay 16HS10.

IIA-6. TRUNK SELECTION

Operation of relay 16TST1 closes a path to operate relay 16HS10 (assumed for illustrative purposes to be) associated with an idle trunk. Operation of relay 16HS10 may be traced from ground, winding of relay 16HS10, contacts of relays 16TST1, 12CG1, 8TB10, 14A10, resistance 164 to negative battery. Operation of relay 16HS10 results in the release of higher numbered relay 16HS– and locks operated over a path from contacts of relays 16HS10, 12CG1, resistance 161 to negative battery.

Relay 10HSK1 now operates over a path from negative battery, resistance 102, contacts of relay 16HS10, through the contacts of relays 16HS11 through 16HS19, winding of relay 10HSK1 to ground. Relay 8TB10 operates over a path from ground, contacts of relays 10HSK1, 12CG1, 16HS10, winding of relay 8TB10 to negative battery.

When the registration of the group is completed in the remote circuit, battery was placed on lead RS1 at the remote circuit (section IIA–4, supra) to operate relay 13RK1 over a path including ground, winding of relay 13RK1, contacts of relays 150TR, 16SR1, resistance RS1, conductor RS1, diode CK, contacts of relay 7CK, resistance 73 to negative battery. Relay 13RK2 now operates over an obvious path. The latter relay indicates that group registration of information in the remote circuit is complete and the sequence circuit should be advanced to permit handling of the "B" information. Operation of relay 13RK2 with relay 10CCK previously operated results in the release of relay 15M at the normally closed contacts of relay 13RK2. Release of relay 15M results in the operation of relay 15Z1 over a path from ground, contacts of relays 15M, 15Z1, 15W1, winding of relay 15Z1 to negative battery. Relay 10CCK now releases at the contacts of relay 15Z1 in series therewith. Release of relay 15M also removes the ground connection at the contacts of relay 15M from conductor TS1 which signals the remote circuit to likewise advance its own sequence circuit as described herein. Moreover, operation of relay 15Z1 also results in the release of signal relays 13S2, 13S3 and 13S4, 7S2, 7S3 and 7S4 and the corresponding auxiliary relays.

IIA-7. REMOTE UNIT—"B" INFORMATION

When relay 7M releases, relay 7Z1 operates over a path from ground, contacts of relays 7RLS, 7M, 7Z1, 7W1, winding of relay 7Z1 to negative battery. Operation of the latter relay results in the release of relay 7CK at the contacts of relay 7Z1. Release of relay 7CK opens a path from battery to signal lead RS1 to indicate to the control circuit to release relay 13RK1 which in turn releases relay 13RK2.

Release of relay 13RK2 results in the operation of relay 15SB2 over a path from ground, contacts of relays 16G0, 16G1, 10RL1, 13RK2, 10CCK, 15Z3, 15Z1, 16SR0, 16SR1, winding of relay 15SB2 to negative battery. Operation of relay 15SB2 results in the operation of relay 15SB1 over a path from negative battery, winding of relay 15SB1, contacts of relays 15SB2, 15Z1 and 15Z3 over the remainder of the path previously traced for the operation of relay 15SB2. At the control unit, operation of relay 15SB1 results in the application of battery potential to the signaling conductors. Specifically, potential is applied to the control trunk to charge the trunk's distributed capacity over a path from negative battery, resistance 151, contacts of relays 13RK2, 15Z3, 15SB2, additional contacts of relay 15SB2, contacts of relay 15SB1, resistance TSO to the control conductors TSO. A similar path may be traced for conductor RSO. Subsequent operation of relay 15SB1 now applies battery to the signal relays over a path from negative battery, resistance 151, contacts of relays 13RK2, 15SB1, 15Z3, 15SB2, winding of relay 13S2, winding of relay 13S1, resistance TSO, conductors TSO. Simultaneously, it is apparent that the contacts of relay 15SB1 in shunt with the windings of the signal relays are opened to remove the short circuit from across those windings.

The signal relays 7S2, 7S4, 13S2 and 13S4 are now operated over a path determined by the operated relay 3LB04. Thus a path may be traced from ground, resistance 72, contacts of relays 7Z1, 7Z2, 3LB04, 7Z2, 7Z1, winding of relays 7S3 and 7S4. A similar path may be traced over conductor TSO including relays 7S1 and 7S2.

It may be noted parenthetically that when signalling originates at the control unit direct ground is applied at the remote unit to the signal relays over the contacts of relay 7RRA. In view of the resistances 71 and 72 in series with the operating path, marginal relays 7S1 and 7S3 do not operate although sensitive relays 7S2 and 7S4 do operate. Similarly, relays 13S2 and 13S4 are also operated.

Operation of relay 15SB1 referred to above results in the operation of relay 15M over a path from negative battery, winding of relay 15M, contacts of relays 16SR1, 15Z1, 15SB1, additional contacts of relay 15SB1, contacts of relays 15SB2, 15Z1, 15Z3 over the path previously described for the operation of relay 15SB1. Operation of the signal relays results in the operation of the auxiliary signal relays over obvious paths. It will be noted that an additional path for the operation of relay 15M is available over the contacts of relays 16SR1, 15Z1, 15SB1, 13RK2, 10RL1, 16G1, 16G0 to ground.

IIA-8. CONTROL UNIT—"B" INFORMATION REGISTRATION

When relay 15M operates the sequence circuit is advanced by operating relay 15W2 from ground, contacts of relays 15M, 15Z1, 15Z2, 15W2, winding of relay 15W2 to negative battery. Operation of relay 15W2 results in the operation of register relay 12B4 from negative battery, winding of relay 12B4, contacts of relays 15Z2, 15Z1, 12S4A, 12S3A, 12S2A, 12S1A, 15M, 13RK2, 15Z2, 15W2 to ground.

Registration of "B" information in the control unit is now checked in the checking circuit of FIG. 10 over a path from negative battery, resistance 101, contacts of relays 15W1, 16DIS06, 12CG0, 12CG1, 16DIS16, 15Z1, 15W2, contacts of relays 12B0–12B3, contacts of relay 12B4, contacts of relays 12B5–12B8, 15Z2, winding of relay 10CCK to ground.

IIA-9. REMOTE UNIT—"B" INFORMATION REGISTRATION

When relay 15M operates at the control unit, a path is completed for the operation of relay 7M at the remote unit over conductor TS1 in the manner traced above. The sequence circuit in the remote unit is now activated through the operation of relay 7W2 over a path from ground, contacts of relays 7RLS, 7M, 7Z1, 7Z2, 7W2, winding of relay 7W2 to negative battery.

The "B" information is now registered in the remote unit by the operation of relay 6B4 over a path from negative battery, winding of relay 6B4, contacts of relays 7Z2, 7Z1, 7S4A, 7S3A, 7S2, 7S1A, 7CK, 7Z2, 7W2, conductor 601, contacts of relays 7M, 7RLS to ground. Relay 7CK now operates over a path from negative battery, resistance 71, contacts of relays 7W2, 7Z2, 6B4 (not shown), winding of relay 7CK to ground.

At this time select magnet 5SMB8 operates over a path including the contacts of relay 6B4.

In the control unit, relays 13RK1 and 13RK2 operate over paths similar to those described above for their previous operation.

As a result of the operation of relay 13RK2 and with relay 10CCK previously operated, battery potential is divorced from the signaling conductors causing the release of all of the signal relays previously operated.

Substantially simultaneously therewith, relays 15SB1, 15SB2 and 15M are all released at the contacts of relays 13RK2 and 10CCK in series therewith. Relay 15Z2 is now operated in the control unit to indicate the completion of the "B" information function and results in the release of relay 10CCK in view of the opening of the contacts of relay 15Z2 in series therewith. In the manner indicated above for the group information, relay 7M in the remote unit now releases over the path described above for its previous release.

IIA–10. "A" INFORMATION

At the remote unit, the sequence circuit is now advanced in response to the release of relay 7M by the operation of relay 7Z2 over a path from ground, contacts of relays 7RLS, 7M, 7Z2, 7W2, winding of relay 7Z2 to negative battery. Relay 7CK now releases as a result of the opening of the contacts of relay 7Z2 in series therewith. As a result of the release of relay 7CK, relays 13RK1 and 13RK2 are released due to the opening of the contacts of relay 7CK in series with the winding of relay 13RK1.

Relay 15SB2 now operates over the path described hereinabove for its operation with respect to the "B" information. Relay 15SB1 operates also in the manner described above for its operation. At this time battery is applied to the signal conductor TSO over the contacts of relay 15SB2 in the manner described above for processing the "B" information. Subsequent thereto the operation of relay 15SB1 applies signal potential to the signaling relays connected to conductor TSO and removes the shunt from the windings of those relays and relay 15M operates as a result of the operation of relay 15SB1 over paths traced above with respect to the "B" information.

At this time relays 7S1, 7S2, 13S1 and 13S2 are operated over a path from ground, contacts of relay 3LA11, contacts of relays 7Z2, 7Z1 to the control conductor TSO. Since direct ground is applied to the control conductor TSO both the marginal relay 7S1 and the sensitive relay 7S2 are operated.

As a result of the operation of relay 15M in the control unit, relay 7M is operated at the remote unit in the manner described above. Relay 15W3 operates over a path including ground, contacts of relays 15M, 15Z1, 15Z2, 15Z3, 15W3, winding of relay 15W3 to negative battery and relay 7W3 operates over a path from ground, contacts of relays 7M, 7Z1, 7Z2, 7Z3, 7W3, winding of relay 7W3 to negative battery.

IIA–11. REGISTRATION OF "A" INFORMATION AT THE REMOTE UNIT

At this time the "A" information is registered by the operation of relay 6A5 over a path from ground, contacts of relays 7RLS, 7M, conductor 601, contacts of relays 7W3, 7Z3, 7CK, 7S1A, 7S3A, 7S4A, 7Z1, 7Z2, 7Z3, winding of relay 6A5 to negative battery.

IIA–12. REGISTRATION OF "A" INFORMATION AT THE CONTROL UNIT

A similar path may be traced for the operation of relay 12A5 at the control unit to register the "A" information. This path extends from ground, contacts of relays 15W3, 13RK2, 15M, 12S1A, 12S3A, 12S4A, 15Z2, 15Z3, winding of relay 12A5 to negative battery. Although the operation of relays 6A5 and 12A5 have been shown as illustrative the specific relay operated depends on the particular 3LA– relays which have been operated in response to the identity of the line.

IIA–13. MATCH CHECK OPERATION

Operation of relay 6A5 results in the operation of match check relay 4MK over a path from ground, winding of relay 4MK, normal contacts of relays 6B8 through 6B5, contacts of relay 6B4, normal contacts of relays 6B3 through 6B0, contacts of relay 6A5, normal contacts of relays 6A4 through 6A0, normal contacts of relays 6DG1, 6CG0, contacts of relay 6CG1, normal contacts of relay 6DG0, conductor 42, contacts of relays 7Z3, 3LB4 (not shown), 6B4 (not shown), 6CG1, 6A5, 3LA11 through the normal contacts of relays 3LA10–3LA00, 4MK, 7RRA, resistance 31 to negative battery. This check vertifies that one and only one relay is operated for the group information, the "B" information and the "A" information.

In addition, this check also establishes the similarity between the information in the register circuit and the identification relays operated (e.g., 6A5 and 3LA11).

With respect to line lockout to prevent ambiguity of the identification in the event of simultaneous originating calls, it is noted that the contacts of relay 3LA11, for example, are in series with the line relay contacts, for example relay 2L99. This prevents any other relay 3LB– from operating other than a relay 3LB– associated with line relay 3LA11.

As an example, if relays 2L99 and 2L95 are simultaneously operated on originating calls, either one may be served as determined by the preference accorded the operated relay 3LB– but either one receiving service represents a legitimate rather than a spurious connection. To prevent ambiguous "B" identification for a particular "A" indication, for example in the case of relays 2L99, 2L95 and 2L86 being operated, series resistors are included, such as resistance 35, to offset the possibility of such a situation on the presumption that relays 3LB– are designed as low resistance operating relays. Thus in the instance referred to, relay 3LB00 will be favored since the operating path has a substantially lower resistance than that of relay 3LB04.

Further, with regard to the line lockout features, it may be noted that each of the relays 3LB– and 3LA– has a double lockout feature which works as follows: if relay 3LB04 is operated the normally closed contacts of relay 3LB04 shown in FIG. 3 prevent the operation of any higher numbered relay 3LB– and also prevent the operation of any lower numbered relay 3LB– thus providing positive lockout protection.

IIA–14. STEERING LEVEL SELECT MAGNET OPERATION

At the control unit the steering level select magnets and the control or line select magnets are now operated. For the illustrative telephone connection now being traced from substation 2L99, steering level select magnet 11SMC9 operates over a path from negative battery, resistance 115, contact of relays 12B4, 12A5, winding of relay 11SMC9 to ground. Moreover, line level select magnet 11SMC4 is now operated over a path from ground, winding of relay 11SMC4, contacts of relays 12B4, 12A5, 12CG1, resistance 116 to negative battery.

When the "A" information is registered as indicated in the preceding paragraph, relay 10CCK is operated over a path from ground, winding of relay 10CCK, contacts of relays 10MK, 15Z3, 12A5, normal contacts of relays 12A4 through 12A0, contacts of relays 15W3, 15Z2, normal contacts of relays 12B6 through 12B8, contacts of relay 12B5, normal contacts of relays 12B4 through 12B0, contacts of relays 15W2, 15Z1, 16DIS16, 12CG1, 12CG0, 16DIS06, 15W1, resistance 101 to negative battery.

At the remote unit, relay 7CK is operated as the result of the operation of relay 4MK over a path from ground, winding of relay 7CK, contacts of relay 6T0, 6T1, 4MK, 7Z3, 7W3, resistance 74 to negative battery. Operation of relay 7CK results in the operation of relays 13RK1 and 13RK2 in the manner described above. It will be noted that after the operation of relay 6A5, a line level select magnet in the remote unit is operated over a path from negative battery, winding of select magnet 5SMB6, contacts of relays 6A5, 6B4 to ground.

The registration of the "A" information having been completed, battery is now applied to the signal lead RS1 to operate relays 13RK1 and 13RK2 in the manner explained above. Joint operation of relays 13RK1 and 13RK2 as explained above results in the release of relay 15M at the control unit and the corresponding release of relay 7M at the remote unit in the manner described above. In addition, relays 15SB2 and 15SB1 are released in view of the opening of the contacts of relays 13RK2 and 10CCK in series therewith. Moreover, signal relays 7Z1, 7Z2, 13S1 and 13S2 are now released together with their auxiliary relays as a result of the opening of the contacts of relay 10CCK.

Release of relay 15M described above, removes ground from conductor TS1 which signals the sequence circuit to advance by operating relay 15Z3 over a path from ground, contacts of relays 15M, 15Z3, 15W3, winding of relay 15Z3 to negative battery. Operation of relay 15Z3 transfers the operating path of relay 10CCK to the contacts of relay 10SMK. Relay 10MK now releases at the contacts of relay 15Z3 in series therewith and relay 10CCK releases in view of the opening of the contacts of relay 15Z3 in series therewith.

At the remote unit, relay 7M releases as a result of the release of relay 15M in the manner described previously. Again this serves as a signal to the remote sequence circuit, this time to operate relay 7Z3, over a path from ground, contacts of relays 7RLS, 7M, 7Z3, 7W3, winding of relay 7Z3 to negative battery. Operation of relay 7Z3 results in the release of relay 7CK in view of the opening of contacts of relay 7Z3 in series therewith. This removes battery potential from signal lead RS1 and the contacts of relay 7CK at the remote unit cause the release of relays 13RK1 and 13RK2. In addition, relay 7Z3 causes the release of previously operated identification relays 3LA11 and 3LB04.

At the control unit operation of relay 10SMK results in the operation of cut-off relay 11C099 over a path from negative battery, resistance 117, contacts of relays 10SMK, 12CG1, 12A5, 12B04, winding of relay 11C099, contacts of relays 10HSK1, 16DIS14, winding of relay 11C0K1. This causes the operation of relay 11C0K1 and release of relay 11C099. Release of relay 11C099 prevents terminating calls to the line by opening the relay 8SL99 and the contacts of relay 11C099 in series therewith.

Parenthetically, it may be noted that the contacts of the cut-off relays are shown as normally open. This would indicate that during the normal or idle condition of the line, the cut-off relays are normally operated. In this case (idle line condition), they are magnetically latched in the closed condition, and are opened when a connection for a talking path exists.

Operation of relay 11C0K1 closes an obvious path for the operation of relay 11C0K2 and operation of the latter relay closes paths for operation of the hold magnets. The path for the operation of the hold magnets may be traced from negative battery to resistance 142, contacts of relays 10HSK1, 11C0K2, 12CG1, 16TB10, 16HS10, winding of hold magnet 14HMC10, contacts of relay 16DIS14 to ground. It will be noted that hold magnets 16HMA10 and 14HMB10 are likewise operated in parallel with hold magnet 14HMC10.

Operation of the hold magnet results in the operation of hold magnet check relay 14HMK from ground, winding of relay 14HMK, contacts of relays 14HMC10, 14HMB10, 14HMA10, 16HS10, 10HSK1, resistance 141 to negative battery. This serves to check that all the appropriate hold magnets have been operated.

IIA–15. TRANSMITTING TRUNK INFORMATION

When the remote circuit has advanced its sequence circuit as described above by the operation of relay 7Z3, and relays 13RK1 and 13RK2 are released, the release of relay 13RK2 with relay 14HMK operated, closes an operating path for relay 150TR if a trunk in the group "09" or "19" has been selected or causes the operation of relay 15SB2 if any other trunk has been selected. Since trunk 10 has illustratively been selected, relay 15SB2 is operated over a path similar to that described above. When relay 15SB2 operates, battery is applied to conductors TSO and RSO to charge the cable in the manner described above. Subsequent operation of relay 15SB1, also in the manner described above, causes connection of the battery potential to the signal relays and removes the shunt across the windings of these relays. The signal relays which are operated are dependent on the trunk information to be transmitted. For trunk 10, as illustrative, no signal relays will be operated. This is apparent from Table 3 appended hereto.

Therefore, when battery is connected to the signal relays, none of these relays operates and none of the signal relays at the remote unit is operated.

At this time, relay 15M operates over the contacts of relay 15SB1 in the manner described above for previous operations. Relay 15W4 operates over a path from ground, contacts of relays 15M, 15Z1, 15Z2, 15Z3, winding of relay 15W4 connected to battery.

Ground is applied at the contacts of relay 15M to conductor TS1 to advance the remote signal circuit through the operation of relay 7M and 7W4. The path of the operation of relay 7W4 may be traced from ground, contacts of relays 7RL1, 7M, 7Z1, 7Z2, 7Z3, winding of relay 7W4 to negative battery. Operation of relay 7W4 results in the operation of relay 6TK0 in the register circuit to indicate that trunk 10 has been selected over a path from negative battery, winding of relay 6TK0, contacts of relays 7TR, 7Z3, 7Z2, 7Z1, 7SRA, 7S3A, 7S2, 7S1A, 7CK, 7W4, conductor 601, contacts of relays 7M, 7RLS to ground.

If trunk 09 or 19 had been selected, a different operating sequence is required as will be explained hereinafter.

In the present illustration, operation of relay 6TK0 completes an operating path for relay 4SMK which may be traced from ground, winding of relay 4SMK, normal contacts of relays 6TK9 through 6TK0, contacts of select magnets 5SMB6, 5SMB8 (B0), resistance 45 to negative battery.

IIA–16. SELECTION OF TRUNK 09 OR 19

As indicated heretofore, the signal relay combinations for trunks 09 and 19 are the same. To distinguish between the two trunks in the same group, when trunk 09 or 19 is the selected trunk, the control circuit applies minus 48-volt battery in series with approximately minus 48 volts across capacitor 152 to lead RS1 of a polarity which causes relay 7RR to operate. This is followed by the operation of relay 7TR over a path including negative battery, winding of relay 7TR, contacts of relays, 7Z1, 7RR, 7RLS to ground. The minus 96 volt polarity to conductor RS1 results from the operation of contacts of relay 150TR connected between resistance 153 and conductor RS1 at the control unit. Since capacitor 152 was previously charged to minus 48 volts at the left-hand side thereof and since a minus 48-volt potential step is applied to the right-hand side, a composite voltage of 96 volts is developed across the capacitor. At approximately this time, the control circuit removes the battery potential from conductor RS1 at the contacts of relay 150TR. It is to be noted that the operation of relay 15M previously referred to results in the release of relay 150TR. Relay 7RR releases and in the register circuit the contacts of relay 7TR (the transfer relay) open the operating path over relay 6TK0 and permit only relay 6TK9 to operate when none of the signal relays is operated. Relay 4SMK now operates over a path similar to that traced above when relay 6TK0 is operated.

IIA–17. RELEASE OF LINE RELAY AT REMOTE UNIT

After the operation of relay 4SMK a path may be traced for the operation of relay 5C0K from ground, winding of relay 5C0K, contacts of relay 6DG1, winding of relay 5C099, contacts of relays 6B4, 6A5, 6CG1, 4SMK, resistance 55 to negative battery. The contacts of relay 5C0K complete an operating path for relay 5HMB10 from ground, contacts of relay 6DG1, winding of relay 5HMB10, contacts of relays 6TK0, 6CG1, 4SMK, 5COK, resistance 51 to negative battery. Relay 5HMA10 operates in parallel. When relay 5C099 releases, relay 2L99 is released at the opening of the contacts of relay 5C099 in series therewith.

The hold magnet having been operated, since it is magnetically latched, may not be released until a pulse of the appropriate polarity is applied during a disconnect operation. It will be noted that the control unit has previously operated its hold magnet in order that the line requesting service may be identified at the control unit, if any trouble arises during the connection.

IIA-18. HOLD MAGNET CHECK AT REMOTE UNIT

Relay 4HMK now operates over a path including negative battery, resistance 41, winding of relay 4HMK, contacts of relays 5HMB10, 5HMA10, 6TK0, 6CG1, 4SMK to ground. This verifies that the correct relays have been operated.

Relay 7CK now operates as a result of the operation of relay 4HMK over a path which may be traced from ground, winding of relay 7CK, contacts of relay 4HMK, resistance 74 to negative battery.

As usual, the contacts of relay 7CK apply battery to signal lead RS1 to indicate to the control unit that the circuit may be released. Relay 7CK opens the operating path to the register permitting relay 6TK0 to release. The latter relay causes the release of relay 4SMK at the contacts of relay 6TK0. Relay 5C0K releases at the contacts of relay 4SMK.

IIA-19. RELEASE OF CONTROL AND REMOTE UNITS

As indicated above, the application of battery potential to lead RS1 at the contacts of relay 7CK causes the operation of relays 13RK1 and 13RK2 in the usual manner. At this time, relay 10RL1 operates over a path from negative battery, winding of relay 10RL1, contacts of relays 13RK2, 15M, 10MK, 14HMK, 12CG1, 15Z3 to ground. Operation of relay 10RL1 causes the release of relay 15SB1. In addition, relay 15M is released at the contacts of relay 10RL1. Release of relay 15M causes the release of relay 10MK at the contacts of relay 15M and relay 15W4 is similarly released. This path may be traced over cable 10–12 to FIG. 12 and the contacts of relay 15M over conductor O. It will be noted that all of the signal relays previously operated would be released but since none of the signal relays was operated, none is released. Operation of relay 10RL1 supplies a 96-volt potential to conductor TS1 in a manner similar to that described above, when relay 150TR operates. This is accomplished by connecting charged capacitor 154 in series with the negative battery connected to resistance 153 to apply a signal pulse to the remote unit to operate relay 7RLS.

The contacts of relay 10RL1 in series with the contacts of relay 10M open the operating path for relay 7M which releases and in turn release 7W4. The relays which are released when relay 7RLS operates include relays 7TR, 7W1, 7W2, 7W3, 6CG1, 6B4 and 6A5.

Release of relays 7W1–7W3 cause release of relays 7Z1–7Z3, respectively. Release of relay 6B4 results in the release of steering level select magnet 5SMB8 and release of relays 6B4 and 6A5 result in the release of relay 4MK.

When each of the above relays has been released, relay 4HMK releases when all of the contacts in its locking path are released. Release of relay 4HMK causes the release of relay 7CK. The latter relay as usual removes battery from signal lead RS1 to the control circuit to indicate that the remote unit has released.

Release of relays 13RK1 and 13RK2 provide a path for the operation of relay 10RL2 which may be traced from negative battery, winding of relay 10RL2, contacts of relays 16DIS14, 16DIS04, 10RL1, 13RK2, 10HSK1 to ground. Operation of release relay 10RL2 results in the release of relays 15W1 through 15W3, 12CG1, 12A5, 12B4, 16SR1. Select magnets 11SMC4 and 11SMC9 are released in view of the opening of the contacts of relay 12CG1, or 12A5, or 12B4 in series therewith. Relays 15Z1 through 15Z3 are released at the contacts of the associated relays 15W1 through 15W3. Relay 10SMK releases after the release of relays 15W1 through 15W3, 12CG1 and the select magnets.

Relay 11C0K1 releases at the contacts of relay 10SMK. It will also be noted that relay 11C0K1 would also release at the opening of any of the contacts of relays 12A-, 12B-, etc. Relay 11C0K2 releases when relay 11C0K1 releases.

The release of relay 12CG1 releases relay 16HS10 which in turn opens the operating path of relays 14HMK and 10HSK1.

It will be noted that the shunting path of the diode shunting relay 8TB10 makes it slow to release so that relay 8TS10 is operated, thereby holding relay 8TB10 operated. The path for operating relay 8TS10 may be traced from negative battery on ring conductor R99, through the crosspoint normal contacts of relay 16HS10, winding of relay 8TS10, over the ring conductor of the trunk to the remote unit through the equivalent crosspoints in the remote unit, the subscriber's loop and subset, the tip conductor of the trunk over a similar path to ground in the central office. Release of relay 15Z1 permits connection of battery to the signal leads over a path which may be traced from negative battery, resistance 151, contacts of relays 15Z1, 15Z1, 15RR1, 16DIS04, 16G1, 15Z1 to the signal relays. A similar path may be traced for the signal relays on conductors RS1. This results in the operation of sensitive relays 13S2, 13S4, 7S2, 7S4 which is the normal signaling condition.

Relay 16SRP1 is now released at the contacts of relay 15Z1. When all relays are released and relays 13S2 and 13S4 are operated, the release relays themselves, 10RL1 and 10RL2, release.

Relay 7RLS in the remote unit releases when all of the remote unit relays are released, and relays 10RL1 and 10RL2 are released. This completes release of the common equipment on a service request call and the equipment in the concentrator is ready to serve another request.

It will be noted that although all of the concentrator common equipment has released, the magnetic latching properties of the hold magnets maintain the connection cut through the concentrator.

IIB. *Detailed description of terminating call*

IIB-1. SEIZURE OF CONTROL CIRCUIT

When a terminating call is originated at the central office ground is placed on the sleeve lead. Assuming relay 2L99 is associated with the called line (for illustrative purposes line 99 is the called line) sleeve relay 8SL99 will be operated. This results in the operation of relays 9LA11 and 9LB13. The path for the operation of relay 9LA11 may be traced from ground, contacts of relay 8SL99, winding of relay 9LA11, contacts of relays 9LA10, 9LA06, 16TER1, resistance 94 to negative battery. Relay 9LB13 operates over the contacts of relay 9LA11, resistance 93, contacts of relay 8SL99, winding of relay 9LB13, normal contacts of relays 9LB13, 9LB17, 9LB13, 9LB09, resistance 95 to negative battery.

Operation of relay 9LB13 closes an operating path for relay 16TP1 over the contact of relay 16TGB1 over a path from battery, resistance 94, contacts of relays 16TER1, 9LA06, 9LA10, 9LA11, conductor TP1, contacts of relay 16TGB1, winding of relay 16TP1, contacts of relays 16TP0, 16SRP1, 16SRP0, 16DP0 to ground. It will be noted that relay 16TGB1 will have operated if all trunks were busy in group "1". Relay 16TP1 closes a path for the operation of relay 16TER1 which may be traced from ground, contacts of relays 10RL2, 15Z1, 16TP1, winding of relay 16TER1 to negative battery. Relay 16G1 now operates over the contacts of relay 16TER1. Relay 15RR1 operates over a path from negative battery, winding of relay 15RR1, contacts of relays 16TER1, 16G1, 16G0 to ground. When relay 15RR1 operates a 96-volt potential is placed on lead RS1 at the contact of relay 15RR1 by putting capacitor 152 in series with the negative battery connected to resistance 153 to signal the remote circuit that a call is being initiated. This causes the remote circuit to change the resistance ground on the signal relays to a solid ground as explained herein. Specifically, at the remote unit, the application of the 96-volt potential results in the operation of relay 7RR over conductor RS1. Relay 7RRA operates over a path including the contacts of relays 7Z1, 7RR, 7RLS to ground.

The signal relays at the control unit are now released at the contacts of relay 15RR1. When relay 15RR2 operates as a result of the operation of relay 15RR1, battery is connected to the signal leads over a path including negative battery, resistance 151, contacts of relays 13RK2, 15Z1, 15RR2, resistance 155, contacts of relays 15Z1, 16DIS14, 16G1, 15Z1 to the windings of the signal relays. This results in the operation of relays 13S2 and 7S2 in view of resistance 155. A path for the operation of relay 13S4 may be traced similarly including the contacts of relays 16DIS14, 10T1, 16G0 and 15Z1.

It will be noted that the signal relays 7S2, 7S4, 13S2, 13S4 will all release at the contacts of relay 15RR1 before the new signal combination is applied to the signal relays.

A path is now closed for the operation of relay 15M from negative battery, winding of relay 15M, contacts of relays 15RR2, 15Z1, 13RK2, 10RL1, 16G1 16G0 to ground.

IIB–2. REGISTRATION OF GROUP INFORMATION AT THE CONTROL UNIT

Operation of relay 15M places ground potential in the usual manner on signal lead TS1 to signal the remote unit to advance the sequence circuit. In addition, relay 15W1 is operated at this time. Relay 7M operates as a result of the operation of relay 15M to operate relay 7W1. Operation of relay 15W1 causes the operation of relay 12CG1 in the register circuit over a path from negative battery, winding of relay 12CG1, contacts of relays 15Z1, 12S3A, 12S2A, 12S1A, 15M, 13RK2, 15Z1, 15W1 to ground. Relay 10CCK now operates to indicate the appropriate operation of relay 12CG1 over a path from ground, winding of relay 10CCK, contacts of relays 15Z1, 16DIS16, 12CG1, 12CG0, 16DIS06, 15W1, resistance 101 to negative battery. Relay 16TST1 operates over a path from ground, winding of relay 16TST1, contacts of relays 16HS19, 16HS10, 12CG1, resistance 161 to negative battery. In the interim, in the control unit, relay 7RR releases and relay 6CG1 operates over a path similar to that described above for an originating call. Relay 7CK operates to check the operation of relay 6CG1 over a path also similar to that for a service originating call. As usual, operation of relay 7CK causes the operation of relays 13RK1 and 13RK2 in the control unit.

IIB–3. TRUNK SELECTION AT CONTROL UNIT

The procedure in selecting a trunk is the same as that heretofore traced for an originating call and need not be repeated in detail. It is sufficient to indicate that relay 16HS10 is operated if it is assumed that trunk 10 is selected, this time over a path from ground, winding of relay 16HS10, contacts of relays 16TST1, 12CG1, 8TB10, 14HMA10, resistance 164 to negative battery. Also in the manner similar to that described above, relay 16TST1 now releases at the contacts of relay 16HS10 and relay 10HSK1 operates in the manner described above as does relay 8TB10.

Relay 15M as usual releases in view of the opening of contacts of relays 13RK2 and 10CCK, in turn causing the release of relay 7M at the remote unit. These operations result in the operation of relay 15Z1 at the control unit, and relay 7Z1 at the remote unit, respectively. Also the signal relays are released in view of the opening of the contacts of relay 15Z1 in series with battery connected to resistance 151 at the control unit. Relay 10CCK also releases at the contacts of relay 15Z1 and relay 7CK releases at the contacts of relay 7Z1. Again the contacts of relay 7CK in series with conductor RS1 result in the release of relays 13RK1 and 13RK2.

The remainder of a terminating call description including the transmission of the "B" information, the registration of the "B" information, transmission of "A" information and registration of "A" information are similar to that described above. The exception of course resides in the fact that the identification of the line—in this case the called line—emanates from the control unit in lieu of the remote unit.

The transmission of the trunk information is also similar to that described above for a service request call and the release of the concentrator equipment is similar to that described above with the exception that the operation of relay 10RL2 causes the release of relay 16TER1 in lieu of relay 16SR1. Release of relays 15RR1, 15RR2 is caused by the operation of relay 10RL1. Also the release of relay 16TER1 enables the operation of relays 9LA– and 9LB– if another request is made on a different line. Obviously relay 16SRP1 does not release as a result of the release of relay 15Z1 as shown for a service request call since relay 16SRP1 does not operate on a terminating call.

IIC. *Disconnect call*

When a subscriber disconnects, relay 8TS10 (again assuming a subscriber to be at substation 2L99 and the trunk to be trunk 10) releases and opens a holding path for slow release relay 8TB10 associated with the call. However, relay 8TB10 has another holding path from the sleeve of the line appearance through the normal contacts of relay 16HS10, resistance 83 and diode 84. Therefore relay 8TB10 remains operated until the central office disconnects and removes ground from the sleeve. When relay 8TB10 releases, a path is closed to operate relay 16DP1 from ground, contacts of relay 16DP0, winding of relay 16DP1, contacts of relays 15TLC1, 10TM3, diode 10, contacts of relays 8TB10, 14HMB10, resistance 164 to negative battery.

It will be noted that this operation can occur only if the trunk load control relay 15TLC1 is operated as explained herein. Otherwise the trunk is not released and the line remains cut through.

IIC–1. TRUNK HOLD CONTROL

It will be noted that relay 15TLC1 operates only after five hold magnets have been operated. This allows four lines to be connected to the central office at all times and disconnection occurs only when the fifth hold magnet is operated, resulting in the operation of relay 15TLC1. As shown herein the trunk to be disconnected is determined by the preference control circuit including relays 16HS–.

Relay 15TLC1 is back-biased by resistance 155 in series with the secondary winding. Each hold magnet cuts in a 12,000-ohm resistor in parallel with the primary winding. Therefore four hold magnets supply a total resistance of 3,000 ohms which just balance the current through the primary winding. The fifth hold magnet reduces the resistance sufficiently to cause relay 15TLC1 to operate.

IIC–2. IDENTIFICATION OF LINE ON DISCONNECT CALL

Operation of relay 16DP1 causes the operation of relay 16D1 over a path from negative battery, winding of relays 16D1, 16DP1, 16SRP0, 16SRP1, 16TP0, 16TP1, 15Z1, 10RL2. Operation of relay 16D1 causes the operation of relays 16DIS10 through 16DIS16. Relay 16G1 operates over the contacts of relay 16DIS15. Relay 16TST1 operates from ground, winding of relay 16TST1, contacts of relays 16HS19, 16HS10, 16DIS14, resistance 161 to negative battery.

When relay 16TST1 is operated, a path is closed from negative battery, resistance 164, contacts of relays 14HMB10, 8TB10, 16D1, 16TST1, windings of relay 16HS10 to ground. Corresponding paths may be traced for relays 16HS11–16HS19, although only the path for relay 16HS19 is shown. Thus, all relays 16HS10–16HS19 of trunks requiring disconnect will attempt to operate. However, the lowest numbered relay 16HS10 will operate as a result of the preference chain to cause release of relay 16TST1. Relay 10HSK1 operates only when one relay 16HS– has operated in a manner similar to that described above. Thus relay 10HSK1 has operated and test relay 16TST1 released. It now remains to operate the sleeve relay 8SL99 associated with the line connected to the trunk selected for release. This path may be traced from negative battery, winding of relay 8SL99, contacts of relay 16DIS14, sleeve lead S99 through the crosspoint contacts, and relays 16HS10, 10HSK1, 16DIS16 to ground. Operation of sleeve relay 8SL99 results in the operation of the associated lockout relays in a manner analogous to that on a terminating call. As a result, relays 9LA11 and 9LB13 are operated. It will be noted that the contacts of relay 16DIS14 prevent an extension of the ground condition to the sleeve lead of the central office to falsely operate the conventional sleeve relay thereat.

IIC–3. TRANSMITTING GROUP AND CLASS OF CALL INFORMATION

Relay 10HSK1 which was previously operated causes the operation of relay 14HMK over a path from ground, windings of relays 14HMK, 14HMC10, 16DIS15, 16HS10, 10HSK1, resistance 141 to negative battery. Relay 14HRK now operates from ground, contacts of relays 14HMK, 16DIS16, winding of relay 14HRK to negative battery. Relay 15RR1 now operates over a path from negative battery, winding of relay 15RR1, contacts of relays 10HSK1, 16DIS14, 10RL1, 16G1, 16G0 to ground. As a result of the operation of relay 15RR1, a minus 96-volt potential is applied to the conductor RS1 by placing capacitor 152 previously charged to minus 48 volts in series with a minus 48-volt source connected to resistor 153. This is a signal to the remote unit which results in the operation of relays 7RR and 7RRA in the manner described heretofore. Moreover, relay 15RR2 operates over an obvious path on the contacts of relay 15RR1.

At the same time, the contacts of relay 15RR1 remove battery from the signal conductors to release the signal relays and the auxiliary relays. Operation of relay 15RR2 results in the application of battery potential to the signal relays in the manner described heretofore. This results in the reoperation of the signal relays. The particular signal relays to be operated are, of course, dependent on the line identification. In this particular instance it will be seen that relay 13S4 operates at the control unit and relay 7S4 operates at the remote unit. The information indicating the particular signal relays operated is set forth in detail in Table 3 appended hereto. To enhance clarity the specific circuit path will not be repeated in detail.

The mark relay 15M at the control unit now operates over a path from negative battery, winding of relay 15M, contacts of relays 15RR2, 15Z1, 13RK2, 10RL1, 16G1, 16G0 to ground. In addition, operation of relay 15RR2 removes the minus 96-volt potential from conductor RS1. Relay 7M at the remote unit follows the operation of relay 15M at the control unit in the usual manner and the sequence relays 15W1 and 7W1 are operated. Relay 10CCK now operates over a path from ground, winding of relay 10CCK, contacts of relays 15Z1, 16DIS16, 12CG1, 12CG0, 16DIS06, 15W1, resistance 101 to negative battery. Relay 6DG1 at the remote unit now operates from negative battery, winding of relay 6DG1, contacts of relays 7Z1, 7S4A, 7S3A, 7S2, 7S1A, 7CK, 7Z1, 7W1, conductor 601, contacts of relays 7M, 7RLS to ground. Operation of relay 6DG1 causes operation of relay 7CK over a path similar to that traced above for relay 6CG1.

It will be noted that relay 7RR was released previously when the voltage supplied to lead RS1 was small enough or removed.

As usual, the operation of relay 7CK causes the operation of relays 13RK1 and 13RK2. The latter, in turn, causes the release of relay 15M which, in turn, causes the release of relay 7M at the remote unit and, again, both sequence circuits are advanced by the operation of relays 15Z1 and 7Z1. Relay 10CCK releases when relay 15Z1 operates and relay 7CK releases when relay 7Z1 operates. Release of relay 7CK, as usual, results in the release of relays 13RK1 and 13RK2 and all of the signal relays previously operated release at the contacts of relay 15Z1.

IIC–4. REGISTRATION OF "B" AND "A" INFORMATION

Release of relay 15M results in the operation of relay 15SB1 over a path from negative battery, winding of relays 15SB1, 16SR1, 16SR0, 15Z1, 15Z3, 10CCK, 13RK2, 10RL1, 16G1, 16G0 to ground. Operation of relay 15SB1 causes relay 15M to be re-operated over a path including negative battery, winding of relay 15M, contacts of relays 15RR2, 15Z1, 15SB1, 10CCK, 10RL1, 16G1, 16G0 to ground. Battery potential is applied to the signal leads at the contacts of relay 15SB1 as described above. This time the signal relays will be operated in accordance with the operated relays 9LB– at the control unit and 3LB– at the remote unit. Since relay 9LB13 was operated the particular signal relays which are operated are 13S2, 13S4, 7S2, 7S4 and the auxiliary relays therefor, as indicated in Table 3.

As indicated above, relay 15M operates when relay 15SB1 operates, causing the operation of relay 7M and the operation of relays 15W2 and 7W2. At the control unit, register relay 12B4 is now operated over a path similar to that described above for a terminating call. In a like manner relay 6B4 in the remote unit is operated to complete the registration of the "B" information and relays 10CCK and 7CK, the check relays, operate to check that one and only one "B" relay is operated. Again, relays 13RK1 and 13RK2 are operated at the contacts of relay 7CK, and relay 5SMB8 in the remote unit operates at the contacts of relay 6B4 in a manner described above for a service request call and also for a terminating call. The signal relays which were previously operated are now released by the removal of battery from those relays at the contacts of relay 13RK2. Relays 15M and 15SB1 are also released in consequence of the operation of relays 13RK2 and 10CCK in FIG. 15.

As usual, relay 7M follows the release of relay 15M and both sequence circuits are advanced by the operation of relays 15Z2 and 7Z2 in the usual manner. Again, relays 7CK and 10CCK release at the contacts of relays 15Z2 and 7Z2 and, in turn, cause the release of relays 13RK1 and 13RK2.

Operation of relay 15Z2 results in the operation of relay 10TM3 over a path from ground, resistance 105, condenser 106, contacts of relay 15Z2, winding of relay 10TM3 to negative battery. Relay 16DP1 now releases at the contacts of relay 10TM3 and relay 16TP1 operates over the contacts of relay 16DP1. This includes a path from ground, contacts of relays 16DP0, 16DP1, 16SRP0, 16SRP1, 16TP0, winding of relay 16TP1, contacts of relay 16TGB1, conductor TP1, contacts of relays 9LA11, 9LA10, 9LA06, 15Z3, resistance 94 to negative battery.

Relays 15SB1 now re-operates over the contacts of relays 13RK2 and 10CCK and, in turn, causes relay 15M to operate and battery is again applied to the signal relays, this time in accordance with the specific relay 9LA–, since, in this case, relay 9LA11 has been operated. The particular signal relays which are operated are 13S1, 13S2, 7S1 and 7S2. The signal relays are operated in the manner similar to the paths traced heretofore.

Also, in accordance with previous operation, relay 7M operates at the remote unit following relay 15M and both sequence circuits are advanced this time by the actuation of relays 15W3 and 7W3.

Now register circuit relay 12A5 operates at the control unit and relay 6A5 at the remote unit in the manner described heretofore on an originating call and a terminating call. Relay 4MK operates to check the operation of the "B" relay, "A" relay and the group relay in the manner described heretofore. Similarly, relay 10MK operates at the control unit to verify the accuracy of registration in the manner described heretofore for an originating call. At the control unit, select magnet 11SMCM operates, although this function is not essential to this particular aspect of the concentrator operation since a disconnect call is involved.

It will be noted that at the remote unit, select magnet 5SM6 is also operated although this operation is also not essential.

At the remote unit, relay 7CK operates over a path from ground, winding of relay 7CK, contacts of relay 4HMK, resistance 74 to negative battery. As usual, relay 7CK causes the operation of relays 13RK1 and 13RK2. Operation of the latter relay results in the release of relays 15M, 15SB1 and the signal relays in view of the removal of battery from the signal relays at the contacts of relays 13RK2 and 10CCK.

Again, relay 7M releases at the control unit in view of the release of relay 15M and the sequence circuits at both units are advanced by the operation of relays 15Z3 and 7Z3. Operation of the latter relay causes the release of relay 7CK and, therefore, the release of relays 13RK1 and 13RK2 and the operation of relay 15Z3 causes the release of relays 10MK and 10CCK. Relay 10SMK is now operated over a path similar to that described above for checking on a service request and terminating call with the exception that the path is now continued over the contacts of relays 16DIS15, 10RL1, winding of relay 10SMK to ground.

Again, it will be assumed that trunk 10 is the trunk illustratively chosen for disconnect. At the control unit relay 15SB1 is operated in the manner described heretofore over the contact of relay 10CCK. Relay 15M now is operated at the contacts of relay 15SB1 and, as usual, relay 7M operates at the remote unit. The signal relays are now operated—this time to reflect the appropriate trunk information and, since it has been assumed that trunk 10 is the selected trunk, none of the signal relays is operated as demonstrated in the table appended hereto.

Operation of relay 15M causes the operation of relay 7M in the usual manner which causes the advance of the sequence circuits, this time relays 15W4 and 7W4.

It will be noted that if trunk 09 or 19 was selected, a different procedure would be required as indicated heretofore with respect to an originating and terminating call. At the remote unit the operation of relay 7W4 causes the operation of relay 6TK0 in the manner described heretofore and relay 4SMK is now operated. The path for the operation of the latter relay is similar to that described above with the variation that contacts of relay 6DG1 are included in the operating path in lieu of the contacts of relay 6CG1.

At this time, relay 5C099 is operated at the remote unit, also in the manner described heretofore, with the variation that the relay 6CG1 is normal and relay 6DG1 is operated. This interaction of the two relays at this time causes a reversal of potential to the magnetically latched cut-off relays to operate the relays. Relay 5C0K now operates in series with the winding of relay 5C099. Operation of relay 5C0K causes the release of the remote unit hold magnets 5HMA10, 5HMB10.

When relay 5C0K operates at the remote unit the pulse applied to the hold magnet is opposite in polarity to that during a service request or terminating call and causes the release of those magnets.

Release of the hold magnets removes the shunt from relay 4HMK which allows that relay to operate over a path from negative battery, resistance 41, winding of relay 4HMK, contacts of relays 5HMB10, 5HMA10, 6TK0, 6DG1, 4SMK to ground. At this time, relay 7CK operates to apply battery to the signal lead RS1 in the usual manner.

IIC–5. RELEASE

Relay 6TK0 now releases at the contacts of relay 7CK and relay 4SMK releases at the contacts of 6TK0, in turn, releasing relay 5C0K. In the interim, relays 13RK1 and 13RK2 release at the contacts of relay 7CK in the usual manner. At this time hold magnets 14HMA10, 14HMB10 and 14HMC10 release in view of the operation of the contacts of relays 13RK2 and 10MK. The path for the release of the hold magnets may be traced from negative battery, resistance 142, contacts of relays 10HSK1, 15W4, 13RK2, 14HRK, resistance 143, contacts of relay 16DIS14 to apply a potential opposite to that previously applied to the windings of magnets 14HMA10, 14HMB10 and 14HMC10. The path is completed over the contacts of relays 16HS10 and 8TB10 to ground.

Parenthetically, it may be noted at this juncture, that the magnitude of resistance 143 is designed to permit sufficient reverse current flow to release the magnets but not sufficient to re-operate the magnets in the opposite direction.

Relay 14HMK now releases at the contacts of magnets 14HMA10, 14HMB10 and 14HMC10. Significantly, it will be seen that the contacts of relay 16DIS15 shunting the above-referred-to contact paths insure that all of the three magnets, 14HMA10, 14HMB10 and 14HMC10, release.

Sleeve relay 8SL99 now releases in view of the opening of the crosspoint contacts in series therewith and, in turn, causes the lockout relays 9LA11 and 9LB13 to release.

The cut-off relay in the control unit 11C099 is now operated at the contacts of relay 14HMK over a path described heretofore with the exception that relay 12CG1 is normal and relay 16DIS14 is operated.

Relay 11C0K1 now operates over a path including windings of relays 11C0K1, 12CG1, 12A5, 12B4, winding of relay 11C099, contacts of relays 10HSK1, 16DIS14, 14HMK, 14HRK, 10SMK, resistance 117 to negative battery. Relay 11C0K2 now operates over an obvious path.

Relay 16TP1 now releases at the contacts of the register relays and relay 10RL1 operates over a path similar to that given above with the variation that the contacts of relay 16DIS14 are now included in the circuit.

After the operation of relay 10RL1 the release of the circuitry is similar to that described above with respect to a service request call with the exception that relays 12CG1 and 16SR1 were, of course, not operated. Instead, relay 10RL2 releases relay 16D1 which, in turn, causes the release of relays 16DIS10 through 16DIS16. Release of the latter relays opens the operating paths of relays 16G1 and 16HS10. Relay 14HRK releases when relay 10RL2 operates and either relay 16DIS14 or relay 14HMK releases.

The remote circuit also releases in a manner similar to that described above for a service request call, but releases relay 6DG1 in lieu of relay 6CG1.

IIC–6. TIMING CIRCUIT 10TM3

This timing circuit is used on disconnect calls to obtain a six-second interval between calls. This reduces the rate at which the remote unit battery will be discharged during a trouble condition. In addition, it permits other calls to be served during the trouble period.

More specifically, when relay 15Z2 operates, a path is closed for the operation of relay 10TM3 over the contacts of relay 16DIS14, contacts of relays 15Z2, 15Z2, winding of relay 10TM3 to negative battery. This also charges capacitor 106. Relay 10TM3 in operating partially closes an operating path for relay 10RL2. This insures that relay 10TM3 operates on disconnect calls. When relay 10RL2 operates, a holding path is closed through the contacts of relay 10TM3 to maintain relay 10TM3 operated until the call is disconnected. Since the normally closed contacts of relay 10TM3 are now open in the operating path of relay 16DP1, disconnect calls are prevented from starting until relay 10TM3 again releases. The relay does not release until the capacitor 106 discharges—a period of illustratively six seconds.

IID. *Service denial call*

IID–1. SEIZURUE OF CONTROL UNIT

When it is determined necessary to deny service to a line or to "lockout" the line as a result of a permanent line or fault condition, conductor TSL (FIG. 14) is cross-connected to the sleeve appearance of the line to be isolated. It will be assumed, again for illustrative purposes, that substation 2L99 is the station to be denied service. Initially, key 10T1 is operated to cause the operation of relay 10T1 which, in turn, places a ground potential on conductor TSL. This results in the operation of sleeve relay 8SL99 associated with the line (to be isolated) over a path from negative battery, winding of relay 8SL99, contacts of relay 11C099, sleeve conductor S99, contacts of relay 16DIS14 to the central office line termination. The call now proceeds as a terminating call with the exception that the signal relays which are operated are determined by relay 10T1 to inform the remote unit that a service denial call is being made when the group information is sent. Thus, relays 9LA11 and 9LB13 are operated in the manner described heretofore, for a terminating call, as are relays 16TP1, 16TER1 and 16G1. Relay 15RR1 operates at the contacts of relay 16G1 and causes the operation of relay 15RR2 at the control unit and relay 7RR at the remote unit. Still following the sequence for a terminating call, signal relays 7S2, 7S4, 13S2 and 13S4 along with the auxiliary relays are released. Relay 15M operates at the control unit as does relay 7M at the remote unit and both sequence circuits are advanced by the operation of relays 15W1 and 7W1.

The signal relays which are operated as detailed by the appended Table 3 are 13S2, 13S4, 7S2 and 7S4 together with the auxiliary relays. Relay 12CG1 operates after the operation of the signal relays in the usual manner. Relay 16TST1 operates in the manner described heretofore for a terminating call and causes the operation of relay 16HS10 followed by the release of relay 16TST1 and the operation of relay 10HSK1. The latter relay causes the operation of relay 8TB10 as described above.

Relay 10CCK operates at the contacts of relay 12CG1 and causes the release of the contacts of relay 15M as well as relay 7M at the remote unit.

In the interim, it will be noted that relay 6T1 operated at the remote unit over a path including negative battery, winding of relays 6T1, 7Z1, 7S4A, 7S3A, 7S2, 7S1A, 7CK, 7Z1, 7W1, conductor 601, contacts of relays 7M, 7RLS to ground. Relay 6CG1 thereafter operates over the contacts of relay 6T1 and a similar path.

Relay 7CK now operates over a path similar to that described above and causes the operation of relays 13RK1 and 13RK2 in view of the release of relays 15M and 7M at the contacts of relays 13RK2 and 10CCK. Relay 15Z1 is operated as is relay 7Z1 thereby releasing relays 10CCK and 7CK. As usual, all of the signal relays are released at the contacts of relay 15Z1, and relays 13RK1 and 13RK2 are released at the contacts of relay 7CK.

Thereafter it is noted that the trunk selection "B" information and the "A" information is transmitted in a similar manner to a terminating call.

After the select magnets have operated, relay 10CCK operates as explained heretofore for a terminating call. However, when relay 13RK2 operates to indicate the "A" information has been registered and relay 5C099 is released at the remote unit thereby denying service, a path is closed through the operated contacts of relay 10T1 to operate relay 10RL1. This path extends from ground, contacts of relays 10T1, 15W3, 13RK2, winding of relay 10RL1 to negative battery to cause the release of the control and remote unit concentrator equipment. Operation of relay 10RL1 causes the release of relay 15M to advance the sequence circuit by the operation of relay 15Z3. However, at this time relay 10SMK does not operate since its operating path includes the normally closed contacts of relay 10T1. This prevents the control circuit from operating the hold magnets which would allow a disconnect call to start thereby operating relay 5C099 and restoring service.

IID–2. RELEASE OF A SERVICE DENIAL CALL

Release of the relays used in establishing a call is similar to that described heretofore for the other calls with the exception that when relay 10RL2 operates an indication is given on lamp 10C0K over the contacts of relays 10RL2 and 10T1. Key 10T1 is then released to open the operating path of relay 10T1. Release of the latter relay causes ground to be removed from the lamp 10C0K and also causes a hold path for relay 10RL2 to be opened.

The leads from the control circuit to the line appearance must be opened or the line appearance made busy to prevent terminating calls as explained herein.

When the service denied condition is to be removed the leads to the line appearance are re-connected and a terminating call is made to the subscriber's line. When an on-hook condition exists during the terminating call a disconnect call will be made if relay 15TLC1 is operated. If the latter relay is normal the subscriber will remain connected to the central office. Either condition will allow a subscriber to originate service request calls.

IIE. *Preference control*

Two lockout chains are used to allow a call to complete if another call requests service. The first chain in the order of preference includes relays 16DP0/16DP1, 16SRP0/16SRP1, 16TP0/16TP1, when relay 10TM3 is normal. If relay 10TM3 is operated, relay 16SRP0/16SRP1 is preferred since relay 16DP0/16DP1 cannot operate.

This first chain prevents a call associated with a less preferred relay from operating its preference relay. A call associated with a higher preferred relay can operate its preference relay but the second chain prevents the preferred preference relay from starting the call. The second chain in the order of preference includes relays 16TERI/16TER0, 16SRI/16SR0, 16D1/16D0. The second chain is the reverse of the preference in the first chain. As a result, even though a higher preferred relay was operated in the first chain while a call was in progress, the call will be completed before the preferred relay can operate its associated relay to the second chain to start a call.

IIF. *Alarm circuit*

The alarm circuit is controlled by slow release relay 15TM1 and the associated capacitor 156. When the circuit is normal, relay 16G1/16G0 is normal and ground is connected to relay 15TM1 and capacitor 156. Relay 15TM1 is held operated and capacitor 156 is charged by the potential source 157 through resistance 158 and diode 159. When relay 16G0/16G1 operates and removes the ground, relay 15TM1 releases after capacitor 156 discharges sufficiently to reduce the current in the circuit below the hold current providing relay 16G0/16G1 has not released. Release of relay 15TM1 causes relay 10RL1 to operate and a path to be closed for operating relay 10TM3 and charging capacitor 106 on a disconnect call. When relay 15TM1 releases a number of other relays (not shown) may be operated and locked in the operated condition to indicate the state of the call when the alarm condition occurred. The locked relays may be subsequently released by a key or other appropriate means.

For a fuller description of the operation of time delay relay 15TM1, reference may be made to Patent 2,636,931 of M. E. Krom of April 28, 1953.

IIG. *Line lockout circuit operation on simultaneous calls*

It will be assumed for illustrative purposes that simultaneous terminating calls have been made to the concentrator subscribers having substations 99 and 86. As a result, sleeve relays 8SL86 (not shown) and 8SL99 will be simultaneously operated. Relay 9LA10 operates over a path from ground, contacts of relay 8SL86, winding of relay 9LA10, contacts of relays 9LA10, 9LA11, 9LA10, 9LA06, 16TER1, resistance 94 to negative battery. Relays 9LA11 operates over a path including contacts of relay 8SL99 and a similar circuit. Assuming the relatively rare situation in which both relays operate precisely simultaneously, relay 9LA11 will ultimately release in favor of the relay 9LA10 in view of the contacts of relay 9LA10 opening in series with the path for relay 9LA11.

It will be noted that the operating path for relay 9LB09 is completed from ground, contacts of relays 9LA10, resistance 96, contacts of relays 8SL86, winding of relay 9LB09, contacts of relays 9LB09, 9LB17, 9LB13, 9LB09, resistance 95 to negative battery.

Moreover, relay 9LB13 associated with line 99 cannot operate since it was indicated that relay 9LA11 released and therefore opened the contacts of relay 9LA11 in series with relay 9LB13. This avoids the possibility of an ambiguous or invalid identification.

It will be noted that if two sleeve relays representing lines in the same LA group, for example relays 8SL86 and 8SL90, associated with relay 9LA10, are simultaneously operated, relay 9LA10 will be operated. However, in this event, either relay 9LB09 or 9LB13 will represent a valid identification. Either relay will lock out the other, but since both of these combinations with relay 9LA10 is a valid one the circuit function is legitimate.

It will now be assumed that relays 8SL86, 8SL95 and 8SL99 are simultaneously operated. Under these circumstances the preferred "LA" relay as indicated above is relay 9LA10. As a result, relay 9LB09 should operate (along with relay 9LA10) to give the coded identification for line 86. However, when relay 9LA10 operates a path now exists from ground, contacts of relay 9LA10, resistance 96, contacts of relays 8SL86, 8SL95, resistance 97, resistance 93, contacts of relay 8SL99, winding of relay 9LB13 over the path previously traced including the normal contacts of the "LB" relays and resistance 95 to negative battery. However, resistances 97, 96, 93, etc. are designed to be sufficiently high in magnitude relative to the usual impedance in the relay operating path to prevent relay 9LB13 from operating over this undesired path.

IIH. *Trunk overflow indication*

When all hold magnets are busy in group 0 or group 1, a path is closed to operate the corresponding relay 16TGB0/16TGB1 over an obvious circuit. The operated relay places ground on start lead ST to the ringing circuit 168 of FIG. 16 to initiate the operation thereof.

On a terminating call, assuming that line 00 is the called line, relay 8SL00 operates, followed by relays 9LA00 and 9LB00, as described for a terminating call previously. However, relay 16TP0 cannot operate when relay 16TGB0 is operated. A path is therefore available through lead OFT and capacitor TGBO, contacts of relays 16TGB0 and 9LB00 to apply overflow tone to the ring conductor through the contacts of relay 8SL00. Moreover, the tip and ring leads of the line appearance are connected to tube 16TGB0 to trip ringing. When the central office equipment releases, ground is removed from the sleeve link, causing the release of relay 8SL00, followed by release of relays 9LA00 and 9LB00.

It is understood that the above embodiments are merely illustrative and that various modifications may be made by those skilled in the art without departing from the scope of the invention.

What is claimed is:

1. An automatic telephone line concentrator system including a plurality of substation lines, a plurality of trunks fewer in number than said lines, a telephone central office connected to said trunks, remote switching means for connecting said lines to said trunks, and means in said central office responsive to a permanent condition on one of said lines for actuating said remote switching means to isolate said line and deny service thereto.

2. A universal line concentrator system including a plurality of lines, a central office, a lesser plurality of trunks connected to said office, remote switching means for connecting said lines to said trunks, a plurality of line terminations at said office individual to said lines, a plurality of sensory devices connected to said line terminations, and means for operating a particular sensory device preparatory to actuating said remote switching means for denying service to the line associated with said device.

3. A line concentrator system in accordance with claim 2 including in addition line identifying means responsive to the operation of said particular sensory device, signaling means responsive to said identifying means for transmitting said line identification to said remote switching means, and additional means for actuating said signaling means to transmit a signal to said remote switching means indicative of a service denial call.

4. An automatic telephone line concentrator system including a plurality of substation lines, a telephone central office, a plurality of trunks fewer in number than said lines, a remote switching unit for connecting said lines to said trunks under control of said central office, sensory means at said remote unit for observing the service condition of said lines, cut-off means at said remote unit for disabling said sensory means, means at said central office for transmitting signal information to said remote unit indicative of a particular line to be denied service, and means at said remote unit responsive to said signal information for actuating said cut-off means to isolate said sensory means associated with said particular line.

5. A universal telephone line concentrator including a plurality of telephone lines, a lesser plurality of trunks, a telephone central office, a remote switching unit for connecting said lines to said trunks, a control switching unit for connecting said trunks to said central office, means in said control switching unit responsive to a permanent condition on one of said lines for transmitting signal information to said remote switching unit indicative thereof, means at said remote unit responsive to said signal information to deny service access to said line, and additional means in said control switching unit effective when a predetermined number of connections are made between said lines and trunks to transmit signal information to said remote switching unit to restore service access to said line.

6. A remote line concentrator system including a plurality of telephone lines, a lesser plurality of trunks, a telephone central office, remote switching means for connecting said lines to said trunks, control switching means for connecting said trunks to said central office, means in said control switching means effective when a permanent condition appears on one of said lines for isolating said line at said remote means and denying service thereto, and manual switching means at said control switching means for subsequently restoring service to said line.

7. A remote line concentrator system including a plurality of lines, a lesser plurality of trunks, a telephone central office, a plurality of line terminations at said office individual to said lines, remote switching means for connecting said lines to said trunks, control switching means at said office for connecting said trunks to said line terminations, said remote switching means including crossbar networks having a plurality of horizontal and vertical conductive paths, crosspoint contacts at the intersections of said paths, operating means for operating particular contacts to connect one of said lines to one of said trunks under control of said office, said operating means including magnetic latching means for maintaining said apparatus in the operated or released condition indefinitely without additional power supply, means at said control switching means responsive to a permanent condition on one of said lines for transmitting signal information to said remote switching means indicative thereof, and means at said remote switching means responsive to said signal information to deny service access to said line.

8. An automatic telephone line concentrator system including a plurality of substation lines, a central office, a lesser plurality of trunks connecting said lines to said office, remote switching means for connecting said lines to said trunks, signaling means at said remote switching means and at said office for transmission of information between said office and said switching means, said signaling means including means for applying signals to said trunks on a ternary amplitude combination basis, means at said central office responsive to a permanent condition on one of said lines for energizing said signaling means to transmit signal information to said remote switching means indicative of the identity of said one line, and means at said remote switching means responsive to said signal information for isolating said line and denying service thereto.

9. A universal telephone line concentrator system including a plurality of lines, a smaller plurality of trunks, a telephone central office, remote switching means for connecting said lines to said trunks, a plurality of line terminations at said office individual to said lines, control switching means at said office for connecting said trunks to said line terminations, means at said remote switching means responsive to a calling condition on one of said lines to transmit the identification of said line to said control switching means, means at said control switching means for connecting said calling line to one of said trunks, additional means in said control switching means for verifying the connection of said line to said trunk at said remote switching means, and means in said control switching means responsive to a permanent condition on said calling line for transmitting signal information to said remote switching means for disestablishing said connection from said line to said trunk and denying service to said line.

References Cited by the Examiner

UNITED STATES PATENTS

| | | | |
|---|---|---|---|
| 2,183,656 | 12/39 | Ostline | 179—27 |
| 2,580,757 | 1/52 | Germanton | 179—27 |
| 2,591,579 | 4/52 | Michal | 179—27 |
| 2,635,148 | 4/53 | Shepherd | 179—27 |
| 2,712,101 | 6/55 | Salati | 317—137 |
| 2,841,748 | 7/58 | Reynolds | 317—137 |
| 2,916,557 | 12/59 | Fleckenstein | 179—18 |
| 2,921,139 | 6/60 | Krom | 179—18 |
| 2,944,115 | 7/60 | Henquet et al. | 179—18 |
| 2,959,642 | 11/60 | Dubar | 179—27 |

ROBERT H. ROSE, *Primary Examiner.*

L. MILLER ANDRUS, *Examiner.*